United States Patent
Pohlert et al.

(10) Patent No.: US 7,604,361 B2
(45) Date of Patent: Oct. 20, 2009

(54) VERSATILE LIGHTING APPARATUS AND ASSOCIATED KIT

(75) Inventors: Rudy G. Pohlert, Calabasas, CA (US); Pat Grosswendt, Agoura, CA (US); Kevin Baxter, Saugus, CA (US); Ken S. Fisher, Los Angeles, CA (US)

(73) Assignee: Litepanels LLC, North Hollywood, CA (US)

( * ) Notice: Subject to any disclaimer, the term of this patent is extended or adjusted under 35 U.S.C. 154(b) by 0 days.

(21) Appl. No.: 11/005,564

(22) Filed: Dec. 4, 2004

(65) Prior Publication Data

US 2005/0225959 A1    Oct. 13, 2005

Related U.S. Application Data

(63) Continuation-in-part of application No. 10/238,973, filed on Sep. 9, 2002, now Pat. No. 6,948,823, which is a continuation-in-part of application No. 09/949,206, filed on Sep. 7, 2001, now Pat. No. 6,749,310.

(51) Int. Cl.
    *G03B 15/02* (2006.01)
(52) U.S. Cl. .............. 362/9; 362/6; 362/11; 362/17; 362/800; 396/199
(58) Field of Classification Search ............ 362/9, 362/3, 8, 11, 16, 17, 18, 6; 396/199, 431, 396/155, 182; 348/370, 371
See application file for complete search history.

(56) References Cited

U.S. PATENT DOCUMENTS

| 1,991,814 | A | 2/1935 | Mitchell ..................... 88/1 |
| 2,682,603 | A | 6/1954 | Dine et al. ................ 240/1.3 |
| 3,794,828 | A | 2/1974 | Arpino ..................... 240/4.2 |

(Continued)

FOREIGN PATENT DOCUMENTS

CA    2385646    3/2003

(Continued)

OTHER PUBLICATIONS

*Litepanels, LLC and Litepanels, Inc. v. VF Gadgets Inc. and Gekko Technology Ltd.*, Civil Action No. 2-06cv-167.

(Continued)

*Primary Examiner*—Jong-Suk (James) Lee
*Assistant Examiner*—Leah S Lovell
(74) *Attorney, Agent, or Firm*—Irell & Manella LLP

(57) ABSTRACT

A lighting apparatus comprises a light panel having a panel frame, and a plurality of LEDs or other light elements secured to the panel frame. A self-contained battery unit securably attaches to the outside of the panel frame. The light panel may have a dimmer switch, and may also be capable of receiving power from a source other than the self-contained battery unit. The lighting apparatus can be mounted to a camera or a stand through adapters. Diffusion lenses or color gels can be integrated with or detachable from the light panel. The lighting apparatus may conveniently be provided in the form of a kit, with one or more of a light panel, self-contained battery unit, compact stand, connecting cable(s), adapter(s), lenses or color gels, and so on, provided in a single package.

39 Claims, 37 Drawing Sheets

U.S. PATENT DOCUMENTS

| | | | |
|---|---|---|---|
| 3,827,071 A | 7/1974 | Turpin | 95/1 R |
| 4,019,042 A | 4/1977 | Baliozian | 240/1.3 |
| 4,043,662 A * | 8/1977 | Garfall | 355/71 |
| 4,085,436 A | 4/1978 | Weiss | 362/16 |
| 4,351,584 A | 9/1982 | Chandesais | 350/89 |
| 4,469,418 A | 9/1984 | Stevens et al. | 354/63 |
| 4,485,336 A | 11/1984 | Yoshiyama et al. | 315/241 |
| 4,618,812 A | 10/1986 | Kawakami | 323/224 |
| 4,687,312 A | 8/1987 | Navarro | 396/544 |
| 4,729,070 A | 3/1988 | Chiu | 362/33 |
| 4,777,566 A * | 10/1988 | Lowell et al. | 362/3 |
| 4,816,854 A * | 3/1989 | Tsuji et al. | 396/106 |
| 4,866,285 A | 9/1989 | Simms | 250/495.1 |
| 4,893,223 A | 1/1990 | Arnold | 362/252 |
| 4,931,866 A | 6/1990 | Charlesworth et al. | 358/93 |
| 5,010,412 A * | 4/1991 | Garriss | 348/371 |
| 5,038,258 A | 8/1991 | Koch et al. | 362/237 |
| 5,083,253 A | 1/1992 | Hahnel | 362/306 |
| 5,095,408 A | 3/1992 | Chen | 362/9 |
| 5,143,436 A | 9/1992 | Baylor et al. | 362/32 |
| 5,164,755 A | 11/1992 | King | 396/544 |
| 5,187,611 A | 2/1993 | White et al. | 359/599 |
| 5,213,404 A | 5/1993 | Chen | 362/9 |
| 5,226,708 A * | 7/1993 | Katahira et al. | 362/9 |
| 5,235,497 A | 8/1993 | Costa | 362/224 |
| 5,301,402 A | 4/1994 | Noel et al. | 29/4 |
| 5,311,409 A * | 5/1994 | King | 362/17 |
| 5,312,393 A | 5/1994 | Mastel | 606/4 |
| 5,345,284 A | 9/1994 | Tsuruta | 354/132 |
| 5,440,385 A * | 8/1995 | Fein et al. | 356/239.1 |
| 5,450,291 A * | 9/1995 | Kumagai | 362/3 |
| 5,461,417 A | 10/1995 | White et al. | 348/131 |
| 5,515,119 A | 5/1996 | Murdock et al. | 352/131 |
| 5,539,485 A | 7/1996 | White | 354/76 |
| 5,569,983 A | 10/1996 | McGuire et al. | 315/297 |
| 5,580,163 A * | 12/1996 | Johnson, II | 362/285 |
| 5,588,732 A | 12/1996 | Sasaki et al. | 362/10 |
| 5,598,068 A | 1/1997 | Shirai | 315/185 R |
| 5,604,550 A | 2/1997 | White | 396/429 |
| 5,661,645 A | 8/1997 | Hochstein | 262/89 |
| 5,684,530 A | 11/1997 | White | 348/130 |
| 5,690,417 A | 11/1997 | Polidor et al. | 362/244 |
| 5,713,661 A * | 2/1998 | White | 362/355 |
| 5,714,413 A | 2/1998 | Brigham et al. | 438/301 |
| 5,758,942 A | 6/1998 | Fogal et al. | 362/12 |
| 5,783,909 A | 7/1998 | Hochstein | 315/159 |
| 5,808,295 A | 9/1998 | Takeda et al. | 250/216 |
| 5,820,250 A | 10/1998 | Betts et al. | 362/216 |
| 5,897,195 A | 4/1999 | Choate | 362/33 |
| 5,997,164 A | 12/1999 | Betts et al. | 362/575 |
| 6,016,038 A | 1/2000 | Mueller et al. | 315/291 |
| 6,066,861 A | 5/2000 | Hohn et al. | 257/99 |
| 6,095,661 A * | 8/2000 | Lebens et al. | 362/184 |
| 6,106,125 A | 8/2000 | Finn et al. | 362/11 |
| 6,109,757 A | 8/2000 | Stephens | 362/11 |
| 6,149,283 A | 11/2000 | Conway | 362/236 |
| 6,150,774 A | 11/2000 | Mueller et al. | 315/291 |
| 6,161,910 A | 12/2000 | Reisenauer et al. | 315/309 |
| 6,166,496 A | 12/2000 | Lys et al. | 315/316 |
| 6,211,626 B1 | 4/2001 | Lys et al. | 315/291 |
| 6,238,060 B1 * | 5/2001 | Bourn et al. | 362/216 |
| 6,252,254 B1 | 6/2001 | Soules et al. | 257/89 |
| 6,254,262 B1 | 7/2001 | Crunk et al. | 362/544 |
| 6,260,994 B1 | 7/2001 | Matsumoto et al. | 362/574 |
| 6,290,368 B1 | 9/2001 | Lehrer | 362/187 |
| 6,292,901 B1 | 9/2001 | Lys et al. | 713/300 |
| 6,305,818 B1 | 10/2001 | Lebens et al. | 362/184 |
| 6,340,868 B1 | 1/2002 | Lys et al. | 315/185 |
| 6,357,893 B1 | 3/2002 | Belliveau | 362/285 |
| 6,390,647 B1 | 5/2002 | Shaefer | 362/276 |
| 6,454,437 B1 * | 9/2002 | Kelly | 362/246 |
| 6,474,837 B1 | 11/2002 | Belliveau | 362/231 |
| 6,554,452 B1 * | 4/2003 | Bourn et al. | 362/247 |
| 6,577,080 B2 | 6/2003 | Lys et al. | 315/362 |
| 6,719,434 B1 | 4/2004 | Finn et al. | 362/11 |
| 6,749,310 B2 | 6/2004 | Pohlert et al. | 362/11 |
| 6,791,283 B2 | 9/2004 | Bowman et al. | 315/291 |
| 6,806,659 B1 | 10/2004 | Mueller et al. | 315/295 |
| 6,824,283 B2 | 11/2004 | Pohlert et al. | 362/11 |
| 6,826,059 B2 | 11/2004 | Bockle et al. | 363/17 |
| 6,864,641 B2 | 3/2005 | Dygert | 315/216 |
| 6,909,377 B2 | 6/2005 | Eberl | 340/815.4 |
| 6,948,823 B2 | 9/2005 | Pohlert et al. | 362/11 |
| 6,963,175 B2 | 11/2005 | Archenhold et al. | 315/291 |
| 6,982,518 B2 | 1/2006 | Chou et al. | 313/46 |
| 7,126,387 B2 | 10/2006 | Nair | 327/108 |
| 2001/0010760 A1 | 8/2001 | Saito | 396/16 |
| 2002/0003602 A1 | 1/2002 | Burckhardt | 351/57 |
| 2002/0048169 A1 | 4/2002 | Dowling et al. | 362/234 |
| 2002/0048177 A1 | 4/2002 | Rahm et al. | 362/555 |
| 2002/0057061 A1 | 5/2002 | Mueller et al. | 315/291 |
| 2002/0084952 A1 | 7/2002 | Morley et al. | 345/32 |
| 2002/0110000 A1 | 8/2002 | Marcus | 362/555 |
| 2003/0160889 A1 | 8/2003 | Angeli | 348/362 |
| 2003/0180037 A1 | 9/2003 | Sommers | 396/155 |
| 2005/0040772 A1 | 2/2005 | Guzman et al. | 315/291 |
| 2005/0083704 A1 | 4/2005 | Pohlert et al. | 362/494 |
| 2005/0122705 A1 | 6/2005 | Pohlert et al. | 362/11 |
| 2005/0207196 A1 | 9/2005 | Holmes et al. | 363/126 |
| 2005/0225977 A1 | 10/2005 | Amphlett | 362/230 |
| 2005/0225980 A1 | 10/2005 | Amphlett | 362/244 |
| 2005/0231948 A1 | 10/2005 | Pohlert et al. | 362/237 |
| 2005/0243198 A1 | 11/2005 | Pardikes | 348/370 |
| 2005/0259409 A1 | 11/2005 | Pohlert et al. | 362/11 |
| 2006/0126319 A1 | 6/2006 | Pohlert et al. | 362/11 |

FOREIGN PATENT DOCUMENTS

| | | |
|---|---|---|
| DE | 200 08 703 U1 | 9/2000 |
| DE | 199 42 177 A1 | 3/2001 |
| DE | 100313003 A1 | 1/2002 |
| EP | 1 072 884 | 1/2001 |
| EP | 1 594 310 B1 | 11/2005 |
| EP | 1 291 708 | 8/2006 |
| GB | 2 087 592 A | 5/1982 |
| GB | 2 321 565 A | 7/1998 |
| GB | 2 412 960 A | 10/2005 |
| GB | 2 412 961 A | 10/2005 |
| JP | 05-067553 | 3/1993 |
| JP | 05-089276 | 4/1993 |
| JP | 08-171803 | 7/1996 |
| JP | 09033445 | 2/1997 |
| JP | 11-220177 | 8/1999 |
| JP | 2001-112715 | 4/2001 |
| WO | WO 98/49872 | 11/1998 |
| WO | WO 99/30537 | 6/1999 |
| WO | WO 99/31560 | 6/1999 |
| WO | WO 99/57945 | 11/1999 |
| WO | WO00/36336 | 6/2000 |
| WO | WO 02/01921 | 1/2002 |
| WO | WO 03/023512 A2 | 3/2003 |
| WO | WO 03/023512 A3 | 3/2003 |

OTHER PUBLICATIONS

"The Video Battery Handbook," Anton/Bauer, Inc., Undated, pp. 1-64.

"Thermal Management Design of LED's," Nichia Application Note, Oct. 31, 2003, pp. 1-7.

"Cree XLamp LED Thermal Management," Cree LED Light, Cree, Inc., pp. 1-6.

Gekko Technology Ltd. Kisslite product information, printed from http://web.archive.org/web/20040422044254/www.gekkotechnology.com/menu.html, http://web.archive.org/web/20040423041645/ www.gekkotechnology.com/products.html and http://web.archive.org/web/*/www.gekkotechnology.com, dated Apr. 19, 2004, 8 pages.
U.S. Appl. No. 11/307,098, filed Jan. 23, 2006, Pohlert et al.
"Photographic Projects..Gene F. Rhodes..Feb. 6,2002," website printout from www.photoprojects.net/ (Jan. 14, 2001).
"Special Lighting Nov. 13, 2001 . . . home," website printout from www.photoprojects.net/index8.html (Nov. 13, 2001).
"NERLITE Ring Illuminators," website printout from www.nerlite.com/products/ring.html (undated, printed out on Feb. 6, 2002).
NERLITE R-100 Series product information sheet (Jan. 30, 2002).
NERLITE R-70 plus Series Ring Illuminators product information sheet (Nov. 9, 2001).
NERLITE AR-100 Series Area Array Illuminators product information sheet (Nov. 15, 2001).
Edmund Industrial Optics, website printout from www.edmundoptics.com/IOD/DisplayProduct.cf?productid=1538 (undated, printed out Feb. 6, 2002).
"Ringlichtsystem für Fotografie und Mikroskopie," website printout from www.dentic.de/lite.ledlite.htm (in German) (undated, printed out Feb. 7, 2002).
"Makroaufnahmen so leicht wie noch nie," website printout from www.digitalkamera.de/info/News/09/51-de.htm (in German) (Jul. 25, 2001).
"Imaging One bringt Makroblitz-Adapter für Nixon Coolpix 950/990," website printout from www.digitalkamera.de/info/news/08/22-de.htm (in German) (Apr. 9, 2001).
Nikon TTL Macro Speedlight SB-29 product sheet (undated).
"Luminaries" catalog excerpt, website printout from http://www.artisticlicence.com/catl_1.htm (undated).
"Water-Fill WF 250 (WF250N)" brochure, Artistic Licence(UK) Ltd. (undated).
"Color-Fill Technology" press release, Artistic License (UK) Ltd. (undated).
"MultiMedia Quick Views," Color Kinetics Inc., 2002.
"Chromacore: in the beginning . . . ," Color Kinetics Inc., 2002.
"Chromacore: under the hood," Color Kinetics Inc., 2002.
"Chromacore: the digital lighting fixture," Color Kinetics Inc., 2002.
"Chromacore: puttin' it all together," Color Kinetics Inc., 2002.
"Chromacore: a more colorful world," Color Kinetics Inc., 2002.
"Products: beauty, brains, and sensibility to boot!," website printout from http://pro.colorkinetics.com/products/, Color Kinetics Inc., 2002.
"ChromaRange," website printout from http://www.pulsarlight.com/ChromaRange.htm, Pulsar Light of Cambridge Ltd., 2000.
"White LED Clusters or Arrays, 12VDC Dimmers and 5mm LED Reflectors," website printout from http://www.theledlight.com/led-assemblies.html, AmericaWorks/The LED Light 1997-2000.
Millerson, Gerald, Lighting For Television And Film, Chapter 5, "Lighting people," pp. 96-139 (1991).
Millerson, Gerald, Lighting For Television And Film, Chapter 10, "Lighting equipment" pp. 295-350 (1991).
Carlson, Vern et al., Professional Lighting Handbook, pp. 15-40 (Focal Press, 1982).
"LED There Be Light," 4 pages, printed on Aug. 8, 2002.
"Kamio Ring Light," product brochure from www.kinoflo.com, printed on Aug. 9, 2002.
"LED There Be Light!" 5 pages (undated, printed out on Aug. 8, 2002).
TMB Featured Products, ProXS Professional Fixture Accessories from the Industry Leader, Aug. 8, 2002.
Cognex Machine Vision Illumination, printout from www.cognex.com/insight/In-Sight_Lighting.pdf, 2002 (printed out on Aug. 8, 2002).
In-Sight Machine Vision Sensor, dated Summer 2002.
Filmcrew, The Art & Craft of Production, Issue 27, 1999, cover page, pp. 4, 40.
"Spect-Light II, The LED Light by Concept," webpage printout from www.conceptlight.com/led.html, 2004, 2 pages.
Webpage printout from www.reflecmedia.com, 2002, printed on Oct. 26, 2005, 2 pages.
Webpage printout from www.bbc.co.uk.rd/projects/virtual/truematte/index.shtml, undated (printed on Oct. 26, 2005), 2 pages.
Grau, et al., "Use of 3-D Techniques for Virtual Production," Invited paper presented at SPIE conference on 'Videometrics and Optical Methods for 3D Shape Measurement', Jan. 22-23, 2001, San Jose, USA, 11 pages.
Kino Flo Fluorescent light photographs, unpublished.
Ringlite product, sold by Contrast Lighting Services, Inc. circa Sep. 21, 2001, described at www.fisherlight.com/level2/ringlite.html.
"LED Darkfield Ringlights suit industrial OEM applications," Archived news story dated Jan. 7, 2002, printed from http://news.thomasnet.com/fullstory/5851 on Jul. 27, 2006.
"Intelligent LED Darkfield Ringlights from Schott-Fostec, LLC," Archived news story dated Jun. 5, 2001, printed from http://news.thomasnet.com/fullstory/5851 on Jul. 27, 2006.
"LED there be light (Aug. 2003), A D.I.Y. Bright White LED Ringlight," dated Aug. 2003, printed from http://users.pandora.be/cisken/LED_ringlight/LED_ringlight.html on Jul. 27, 2006.
"LED Ringlight," dated May 20, 2001, printed from http://us.schott.com/fiberoptics/English/download/20.05.01ringlight_us.pdf on Jul. 27, 2006.
"ILP LED Ringlight" dated 2001, printed from http://www.volpiusa.com/images/uploads/ILPLEDRinglight.pdf on Jul. 27, 2006.
"Modern Classic SLRs Series: Additional info on Nikon Speedlights SB-1 to SB-21A/B," dated 1999, printed from http://www.mir.com./rb/photography/hardwares/classics/nikonf3ver2/flash/sb1tosb21/index7.htm on Jul. 26, 2006.
Litepanels, LLC and Litepanels, Inc. v. Frezzolini Energy Systems Corp, Civil Action No. 2-06cv-143, filed Apr. 6, 2006.
Complaint in *SWIT Electronics Co., Ltd v. Litepanels LLC*, Civil Action No. C07 02645 JCS, filed May 17, 2007 in United States District Court, Northern District of California.
Complaint in *Litepanels, LLC and Litepanels, Inc. v. Thomas McKay d/b/a Varizoom Lens Controls, and SWIT Electronics Co., Ltd..*, Civil Action No. 6:07-cv-239-LED, filed May 29, 2007 in United States District Court for the Eastern District of Texas.
Docket Sheet for *SWIT Electronics Co., Ltd. v. Litepanels LLC*, Civil Action No. 6:07-cv-00480-LED [transferred case from C07 02645 JCS].
Transfer order for *SWIT Electronics Co., Ltd. v. Litepanels LLC*, Civil Action No. C07 02645 JCS.
American Cinematographer magazine, pp. 63 and 66, Sep. 1991, vol. 72, No. 9, 4 pages.
Complaint in *Litepanels, LLC and Litepanels, Inc. v. Sony Electronics, Inc., Sony Corporation of America. Inc., and Sony corporation*, Civil Action No. 2:07-cv-508 (DF), filed Nov. 19, 2007 in United States District Court, Eastern District of Texas, Marshall Division.
Patent Rule 4-3 Joint Claim Construction And Prehearing Statement, Sep. 19, 2007. 1) TABLE A: Claim Terms, Phrases, and Clauses Common to the '823 and '302 Patents; 2) Declaration of Professor Tracy Trotter, Sep. 19, 2007; 3) Expert Declaration Of John Fagan, PhD In Support Of Litepanels' Joint Claim Construction Statement, Sep. 19, 2007; 4) Exhibit "C" To Joint Claim Construction And Prehearing Statement.
Litepanels, LLC and Litepanels, Inc. Opening Claim Construction Brief [P.R. 4-5(a)] Regarding U.S. Patents Nos. '823, '310 and '302, Oct. 4, 2007; 1) Declaration of Joshua A. Burt in Support of Litepanels, LLC and Litepanels, Inc. Opening Claim Construction Brief, Oct. 4, 2007; A) Exhibit A: U.S. Patent 6,948,823; B) Exhibit B: U.S. Patent 6,749,310; C) Exhibit C: U.S. Patent 7,163,302; D) Exhibit D: U.S. Appl. No. 11/100,023; E) Exhibit E: Merriam-Webster Online Dictionary definition for "illuminate." Merriam-Webster Online Dictionary, Entry for Illuminate, http://www.m-w.com.dictionary/illuminate; F) Exhibit F: Chart created to aid the Court in reviewing Litepanels' proposed claim construction.
2) Expert Declaration Of John Fagan, PhD In Support Of Litepanels' Joint Claim Construction Statement, Oct. 3, 2007; A) Exhibit A: Curriculum Vitae of John E. Fagan, Ph.D.; B) Exhibit B: The Wiley Electrical and Electronics Engineering Dictionary (2004); C) Exhibit C: PC Magazine's Encyclopedia (2007).
3) Expert Declaration Of Professor Tracy Trotter, Oct. 3, 2007; A) Exhibit A: Curriculum Vitae of Tracy Trotter; B) Exhibit B: copy of Hands-On Manual for Cinematographers; cover pages and page 14.4.
Defendant Gekko Technology Ltd.'s Brief in Support of its Claim Construction [P.R. 4-5(a)], Oct. 15, 2007: A) Expert Declaration Of David Amphlett In Support of Gekko Technology, Ltd.'s Brief In Support of Its Claim Construction, Oct. 15, 2007; 1) Curriculam Vitae of David Richard Amphlett; B) Declaration Of William G. Shaw, Jr. in Support of Defendant Gekko Technology Ltd.'s Brief in Support of its Claim Construction [P.R. 4-5(a)], Oct. 15, 2007; 1) Exhibit B-1: copy of an Amendment and Response to Office Action dated Oct. 31, 2003, taken from the prosecution history of the United States Patent and Trademark Office for U.S. Patent No. 6,749,310; 2) Exhibit B-2: copy of an Office Action Communication dated Jul. 7, 2003, taken from the prosecution history of the United States Patent and Trademark Office for U.S. Patent No. 6,749,310; 3) Exhibit B-3: copy of the original claims of the patent applicant taken from the prosecution history of the United States Patent and Trademark Office for U.S. No. 6,749,310.

Litepanels, LLC and Litepanels, Inc. Reply Claim Construction Brief Regarding U.S. Patent Nos. '823, '310 and '302, Oct. 25, 2007: A) Attachment A to Litepanels' Claim Construction Reply Brief; B) Declaration of Joshua A. Burt in Support of Litepanels, LLC and Litepanels, Inc. Reply Claim Construction Brief, Oct. 25, 2007; a) Exhibit A: Videotaped Deposition of David Richard Amphlett, Thursday, Oct. 18, 2007; b) Exhibit B: Videotaped Deposition of David Richard Amphlett, Wednesday, Oct. 24, 2007; c) Exhibit C: Definition for "fisheye" found in Merriam-Webster's Online Dictionary, http://www.merriam-webster.com/dictionary/fisheye; d) Exhibit D: Oct. 11, 2007 letter sent by Litepanels' counsel to Gekko's counsel proposing compromises pursuant to the Court's Oct. 2, 2007 Order; C) Supplemental Expert Declaration Of Professor Tracy Trotter.

Memorandum Opinion, Dec. 6, 2007.

Defendant Gekko Technology Ltd. Renewed Disclosure of Invalidity Contentions, Aug. 2, 2007: Appendix "A" Contentions/Indefiniteness—Patent 310; Appendix "B" Contentions/Novelty — Patent 310; Appendix "C" Contetions/Obviousness—Patent 310; Appendix "D" Contentions/Indefiniteness—Patent 823; Appendix "E" Contentions/Novelty —Patent 823; Appendix "F" Contentions/Obviousness—Patent 823; Appendix "G" Contentions/Indefiniteness—Patent 302; Appendix "H" Contentions/Novelty—Patent 302; Appendix "I" Contentions/Obviousness—Patent 302.

Sched.s A-C, "Schedules A, B and C, Invalidity Contentions" filed by Defendant Gekko Technology Ltd. on Dec. 19, 2006 in, Litepanels, LLC and Litepanels, Inc. v. VFGadgets Inc. and Gekko Technology Ltd, U.S. District Court, Eastern District of Texas, Marshall Division, Case No. 2:06 CV 167, 368 pages, Dec. 19, 2006.

App i, Ex 2, 1 page document, title unreadable, provenance unknown, said to be Play Catalogue date 1999, describing Holoset technology said to be developed by "Play" in cooperation with BBC, said to be available Fall 1999, Said to be 1999.

App i, Ex 3, 3 page document entitled "Virtual Production", with BBC logo, said to be pp. 2, 3, 4, Said to be May 1999.

App i, Ex 4, 1 page document, said to be "BBC r&d annual review Apr. 1999-Mar. 2000, p. 18," Said to be Mar. 2000.

App i, Ex 8, "BBC Research, Production Magic" 2 pages, Dec. 20, 2006.

App i, Ex 9, "viewercom" website, 2 pages, 2001.

App iii, Ex 2,3,7, Untitled, discusses photographing The Wiz, said to be "American Cinematographer Nov. 1978, pp. 1071, 1072, 1072", 3 pages, Said to be Nov. 1978.

App iii, Ex 4, "Lightflex congratulate The Wiz", said to be "American Cinematographer Nov. 1978, p. 1085", 1 page, Said to be Nov. 1978.

App iii, Ex 5,6, "Lightflex: A Whole New World of Color on the Screen", Gerry Turpin, said to be "American Cinematographer Nov. 1978, pp. 1086, 1087", 2 pages, Said to be Nov. 1978.

App iii, Ex 8, "The New Lightflex a tool for Cinematography", said to be Eyepiece magazine Jan./Feb. 1986, Said to be Feb. 1986.

App iv, "Lumileds Releases Luxeon® K2 LEDs, Offering Industry-Leading Light Output, Thermal and Electrical Properties", press release for Luxeon® by Lumineds, 3 pages, Jan. 30, 2006.

App vi, Ex 6, "Aspect Ratio", www.schumachercamera.com, 1 page, 2005.

App viii, "Crime-Lite® 4×4, LED ring light for forensic photography", www.fosterfreeman.co.uk, 1 page, Aug. 12, 2006.

App x, "Philips Lumileds Luxeon® I 20mm range" www.carclo-optics.com, 1 page, Nov. 21, 2006.

App xii, "Ringlite Resource Links", www.ringlite.com, 1 page, Sep. 12, 2006.

App xviii, Ex G "Diopter Holder", American Cinematographer, www.theasc.com/magazine/feb99/PRODUCTS/index2.htm, Feb. 1999.

App xviii, Ex H, a-1, Untitled, No. provenance, said to be production stills showing evidence of accessory bars that aren't supporting either the matte box or the follow focus but still in place for other devices, 12 pages, said to be: a) "Brown on Resolution", May 1933; b) "Madness of the Heart", 1948; c) "Outcast of the Islands", 1957; d) "Romanoff and Juliet" (supporting mattebox), 1959; e) "Lawrence of Arabia" (supporting matte box), 1960; f) "Lord Jim" (supporting Panavision Panazoom), 1964; g) "On Her Majesty's Secret Service" (supporting zoom lens, rangefinder sight and other gadgetry), 1969; h) "Performance" (Supporting zoom motor on Panavision camera), 1970; i) "The Godfather 3" (Light and mattebox mounted on Panavision camera, 1989; j) Otto Heller BSC, died 1970 (with a light mounted on the camera with bracketry), 1970 or earlier; k) "Courage Under Fire" (supporting zoom motor gears and operator's handle on Moviecam, 1996; l) "The Hurricane" 1999.

Clifford Coffin, Photographs from Vogue 1945 to 1955, ISBN: 15556706545, published by Stewart, Tabori & Chang 1997, p. 23 & 25.

Arri News Jun. 1997, p. 26.

Reflecmedia website printout, dated: Jan. 5, 2007, 2 pages.

Arri News Dec. 1997, p. 28, 1 page.

Arri News Jun. 1998, p. 30, 1 page.

www.bbc.co.uk/rd/awards/ibc1998-1shtml webpage announcing 1998 IBC Awards, 1 page.

* cited by examiner

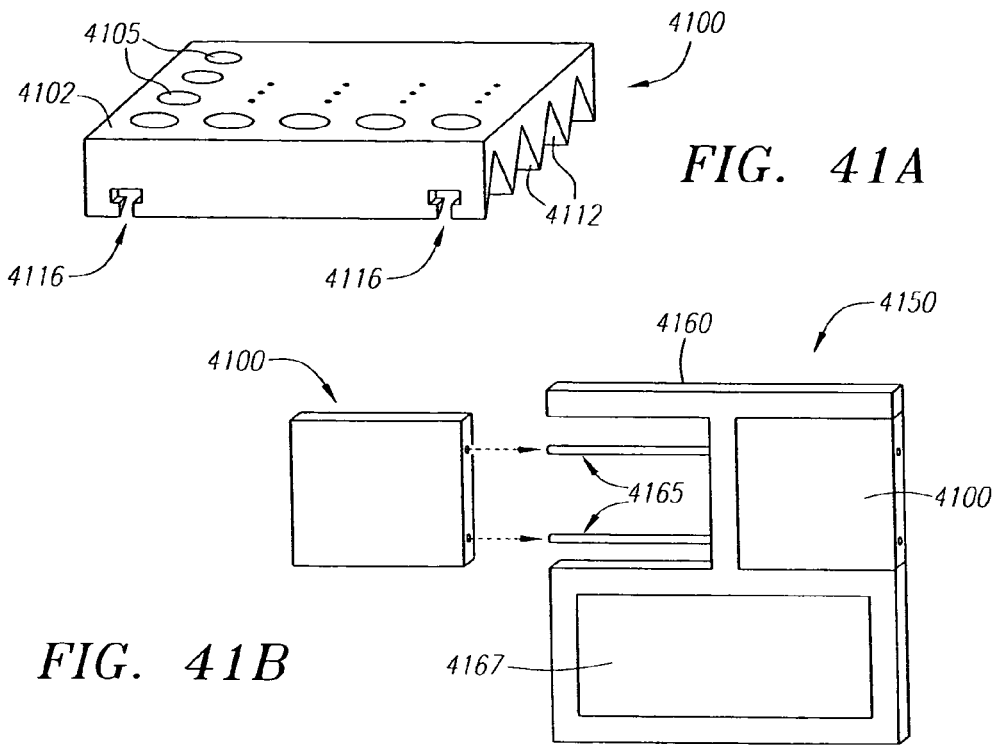
FIG. 41A
FIG. 41B
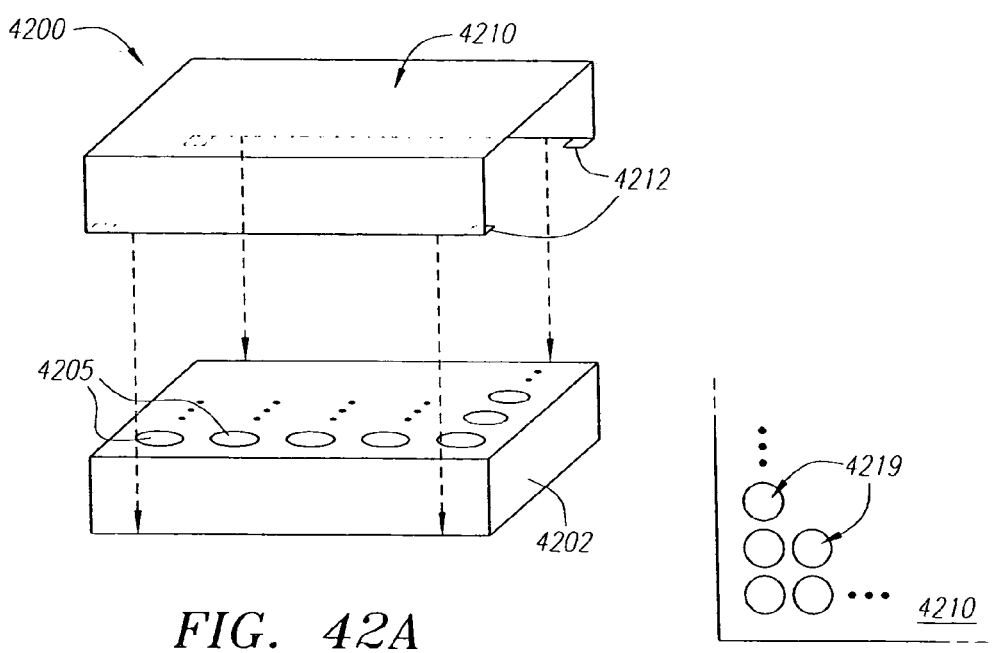
FIG. 42A
FIG. 42B

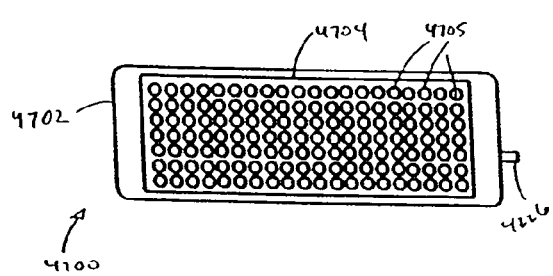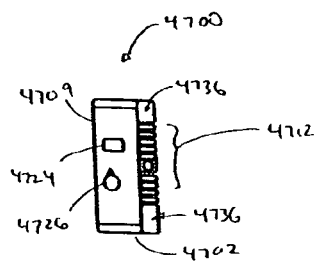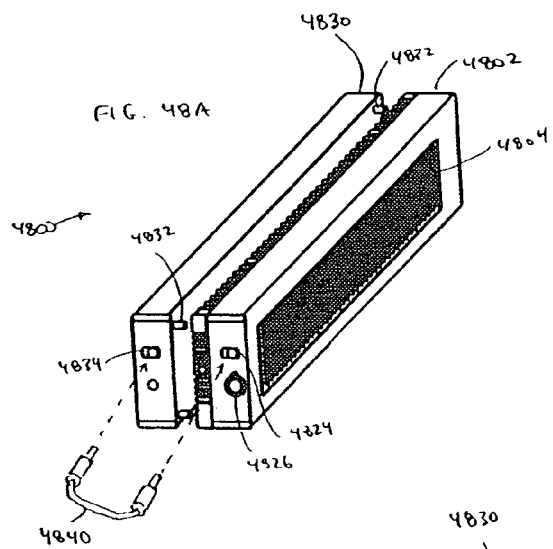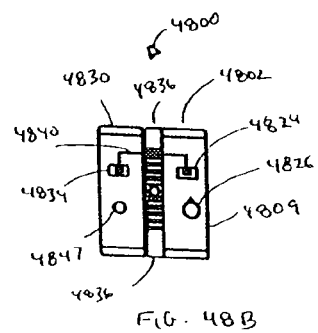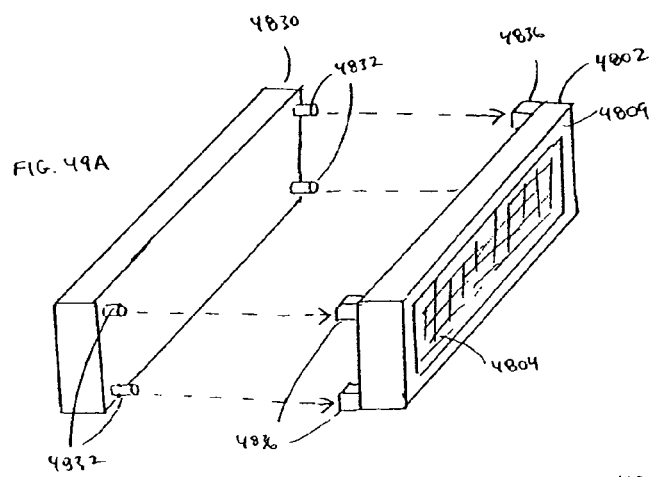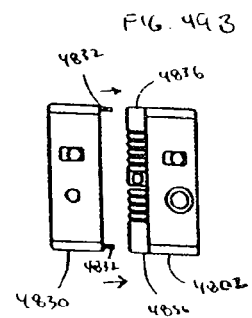

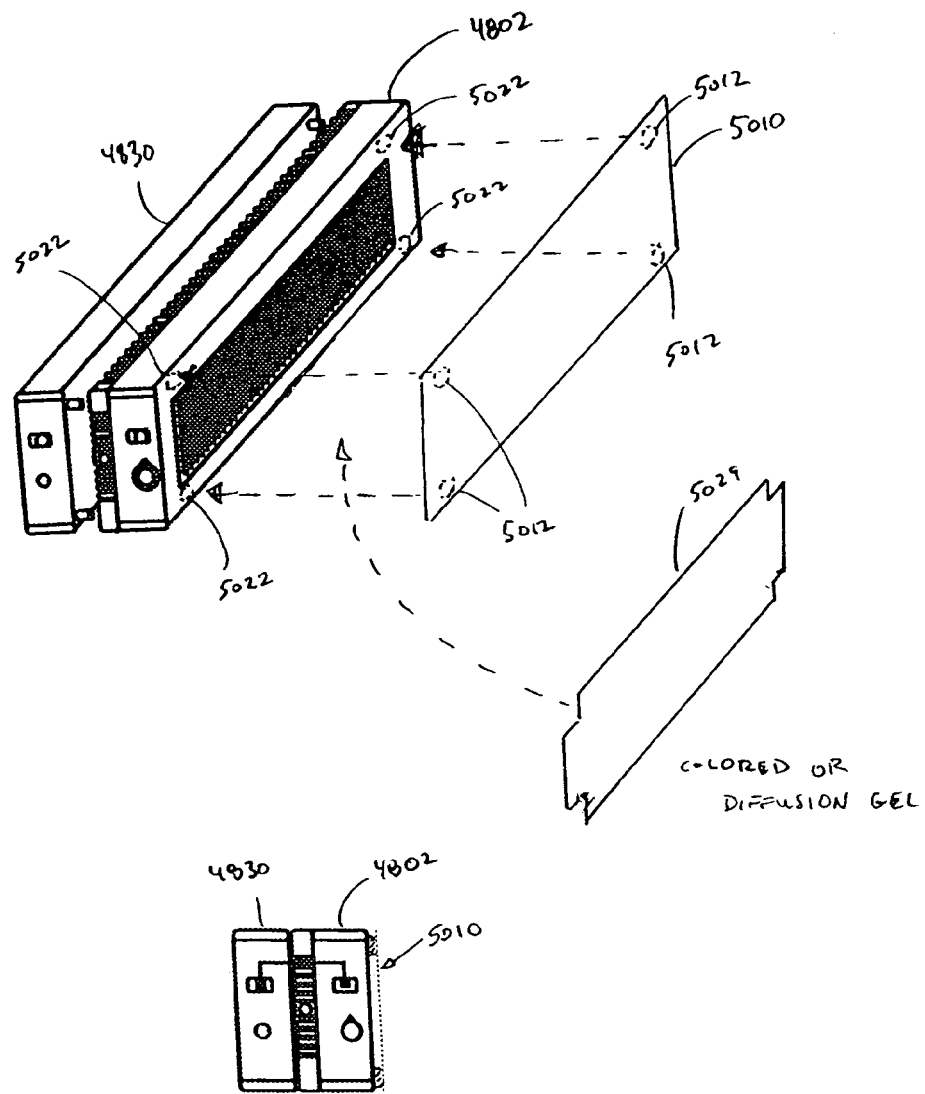

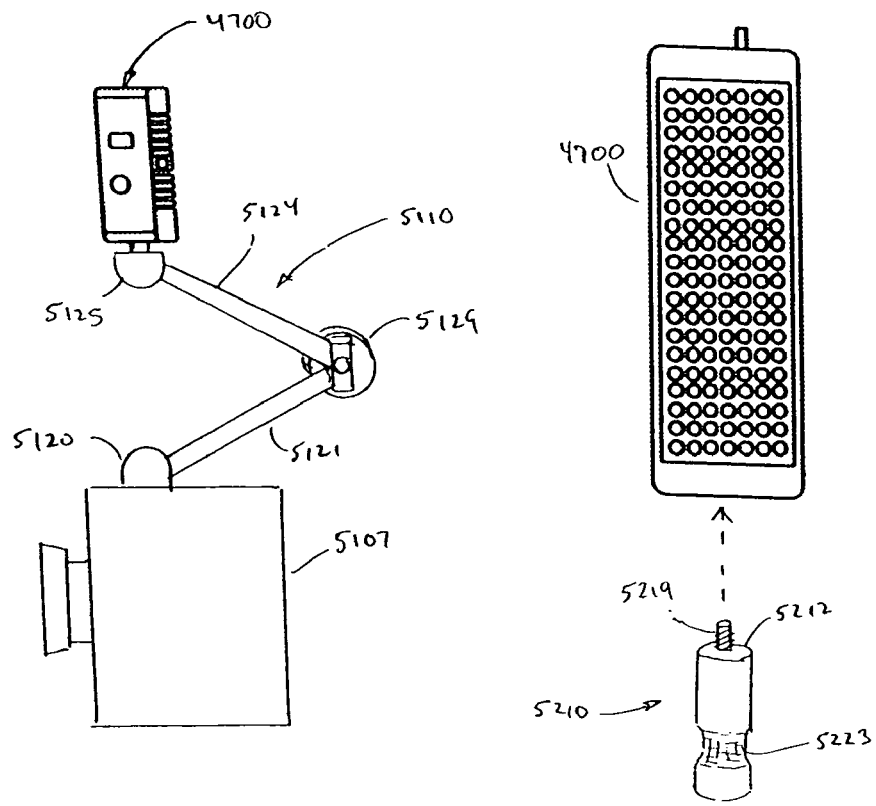
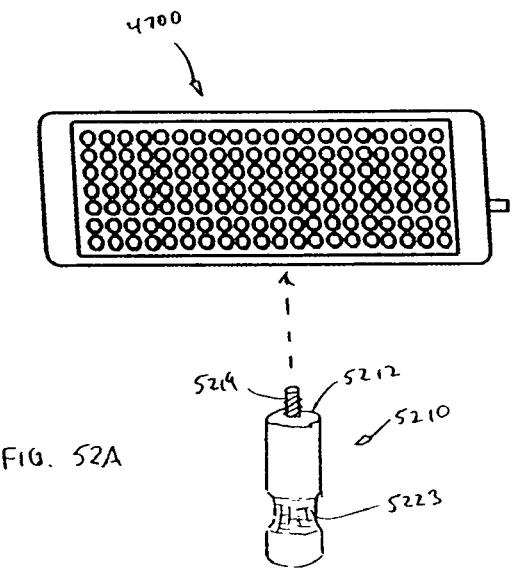
FIG. 51
FIG. 52C
FIG. 52A
FIG. 52B

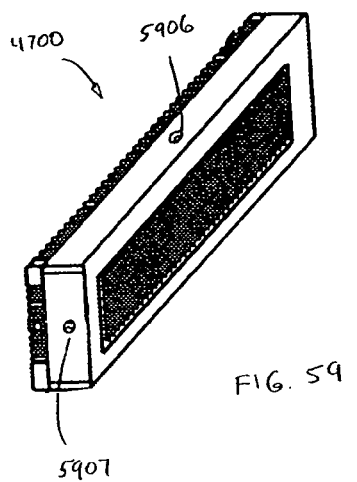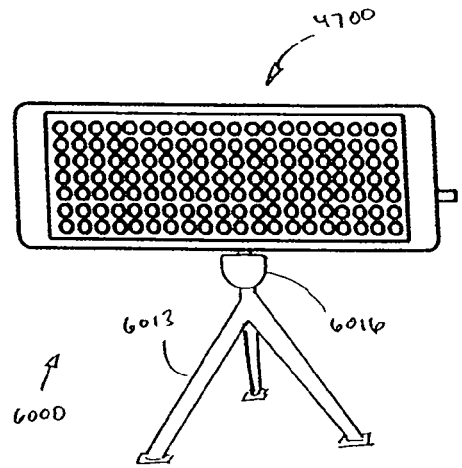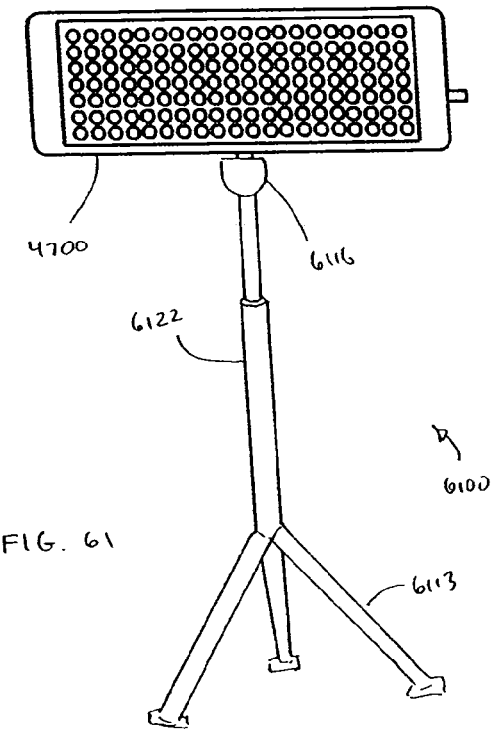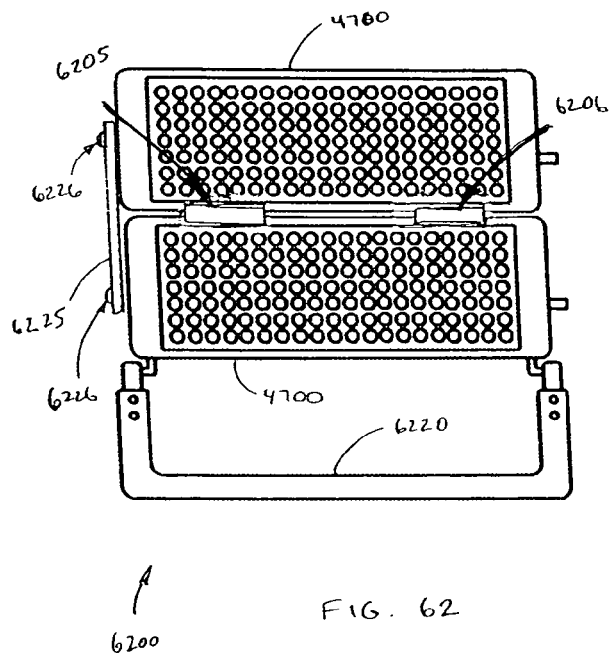

VERSATILE LIGHTING APPARATUS AND ASSOCIATED KIT

RELATED APPLICATION INFORMATION

This application is a continuation-in-part of U.S. application Ser. No. 10/238,973 filed Sep. 9, 2002 now U.S. Pat. No. 6,948,823, which in turn is a continuation-in-part of U.S. application Ser. No. 09/949,206 filed Sep. 7, 2001 now U.S. Pat. No. 6,749,310, hereby incorporated by reference as if set forth fully herein.

BACKGROUND OF THE INVENTION

1) Field of the Invention

The field of the present invention relates to lighting apparatus and systems as may be used in film, television, photography, and other applications.

2) Background

Lighting systems are an integral part of the film and photography industries. Proper illumination is necessary when filming movies, television shows, or commercials, when shooting video clips, or when taking still photographs, whether such activities are carried out indoors or outdoors. A desired illumination effect may also be desired for live performances on stage or in any other type of setting.

A primary purpose of a lighting system is to illuminate a subject to allow proper image capture or achieve a desired effect. Often it is desirable to obtain even lighting that minimizes shadows on or across the subject. It may be necessary or desired to obtain lighting that has a certain tone, warmth, or intensity. It may also be necessary or desired to have certain lighting effects, such as colorized lighting, strobed lighting, gradually brightening or dimming illumination, or different intensity illumination in different fields of view.

Various conventional techniques for lighting in the film and television industries, and various illustrations of lighting equipment, are described, for example, in *Lighting for Television and Film* by Gerald Millerson (3*rd* ed. 1991), hereby incorporated herein by reference in its entirety, including pages 96-131 and 295-349 thereof, and in *Professional Lighting Handbook* by Verne Carlson (2*nd* ed. 1991), also hereby incorporated herein by reference in its entirety, including pages 15-40 thereof.

As one example illustrating a need for an improved lighting effects system, it can be quite challenging to provide proper illumination for the lighting of faces in television and film, especially for situations where close-ups are required. Often, certain parts of the face must be seen clearly. The eyes, in particular, can provide a challenge for proper lighting. Light reflected in the eyes is known as "eye lights" or "catch lights." Without enough reflected light, the eyes may seem dull. A substantial amount of effort has been expended in constructing lighting systems that have the proper directivity, intensity, tone, and other characteristics to result in aesthetically pleasing "eye lights" while also meeting other lighting requirements, and without adversely impacting lighting of other features.

Because of the varied settings in which lighting systems are used, the conventional practice in the film, commercial, and related industries is for a lighting system, when needed, to be custom designed for each shoot. This practice allows the director or photographer to have available a lighting system that is of the necessary size, and that provides the desired intensity, warmth, tone and effects. Designing and building customized lighting systems, however, is often an expensive and time-consuming process.

The most common lighting systems in film, commercial, and photographic settings use either incandescent or fluorescent light elements. However, conventional lighting systems have drawbacks or limitations which can limit their flexibility or effectiveness. For example, incandescent lights have been employed in lighting systems in which they have been arranged in various configurations, including on ring-shaped mounting frames. However, the mounting frames used in incandescent lighting systems are often large and ponderous, making them difficult to move around and otherwise work with. A major drawback of incandescent lighting systems is the amount of heat generating by the incandescent bulbs. Because of the heat intensity, subjects cannot be approached too closely without causing discomfort to the subject and possibly affecting the subject's make-up or appearance. Also, the heat from the incandescent bulbs can heat the air in the proximity of the camera; cause a "wavering" effect to appear on the film or captured image. Incandescent lighting may cause undesired side effects when filming, particularly where the intensity level is adjusted. As the intensity level of incandescent lights change, their hue changes as well. Film is especially sensitive to these changes in hue, significantly more so than the human eye.

In addition to these problems or drawbacks, incandescent lighting systems typically draw quite a bit of power, especially for larger lighting systems which may be needed to provide significant wide area illumination. Incandescent lighting systems also generally require a wall outlet or similar standard source of alternating current (AC) power.

Fluorescent lighting systems generate much less heat than incandescent lighting systems, but nevertheless have their own drawbacks or limitations. For example, fluorescent lighting systems, like incandescent lighting systems, are often large and cumbersome. Fluorescent bulbs are generally tube-shaped, which can limit the lighting configuration or mounting options. Circular fluorescent bulbs are also commercially available, and have been used in the past for motion picture lighting.

A major drawback with fluorescent lighting systems is that the low lighting levels can be difficult or impossible to achieve due to the nature of fluorescent lights. When fluorescent lights are dimmed, they eventually begin to flicker or go out as the supplied energy reaches the excitation threshold of the gases in the fluorescent tubes. Consequently, fluorescent lights cannot be dimmed beyond a certain level, greatly limiting their flexibility. In addition, fluorescent lights suffer from the same problem as incandescent lights when their intensity level is changed; that is, they tend to change in hue as the intensity changes, and film is very sensitive to alterations in lighting hue.

Typically, incandescent or fluorescent lighting systems are designed to be placed off to the side of the camera, or above or below the camera. Because of such positioning, lighting systems may provide uneven or off-center lighting, which can be undesirable in many circumstances.

Because of their custom nature, both incandescent lighting systems and fluorescent lighting systems can be difficult to adapt to different or changing needs of a particular film project or shoot. For example, if the director or photographer decides that a different lighting configuration should be used, or wants to experiment with different types of lighting, it can be difficult, time-consuming, and inconvenient to re-work or modify the customized lighting setups to provide the desired effects. Furthermore, both incandescent lighting systems and fluorescent lighting systems are generally designed for placement off to the side of the camera, which can result in shadowing or uneven lighting.

A variety of lighting apparatus have been proposed for the purpose of inspecting objects in connection with various applications, but these lighting apparatus are generally not suitable for the movie, film or photographic industries. For example, U.S. Pat. No. 5,690,417, hereby incorporated herein by reference in its entirety, describes a surface illuminator for directing illumination on an object (i.e., a single focal point). The surface illuminator has a number of light-emitting diodes (LEDs) arranged in concentric circles on a lamp-supporting housing having a circular bore through which a microscope or other similar instrument can be positioned. The light from the LEDs is directed to a single focal point by either of two methods. According to one technique disclosed in the patent, a collimating lens is used to angle the light from each ring of LEDs towards the single focal point. According to another technique disclosed in the patent, each ring of LEDs is angled so as to direct the light from each ring on the single focal point.

Other examples of lighting apparatus used for the purpose of inspecting objects are shown in U.S. Pat. Nos. 4,893,223 and 5,038,258, both of which are hereby incorporated herein by reference in their entirety. In both of these patents, LEDs are placed on the interior of a spherical surface, so that their optical axes intersect at a desired focal point.

Lighting apparatus specially adapted for illumination of objects to be inspected are generally not suitable for the special needs of the film, commercial, or photographic industries, or with live stage performances, because the lighting needs in these fields differs substantially from what is offered by object inspection lighting apparatus. For example, movies and commercials often require illumination of a much larger area that what object inspection lighting systems typically provide, and even still photography often requires that a relatively large subject be illuminated. In contrast, narrow-focus lighting apparatuses are generally designed for an optimum working distance of only a few inches (e.g., 3 to 4 inches) with a relatively small illumination diameter.

Still other LED-based lighting apparatus have been developed for various live entertainment applications, such as theaters and clubs. These lighting apparatus typically include a variety of colorized LEDs in hues such as red, green, and blue (i.e., an "RGB" combination), and sometimes include other intermixed bright colors as well. These types of apparatus are not well suited for applications requiring more precision lighting, such as film, television, and so on. Among other things, the combination of red, green, and blue (or other) colors creates an uneven lighting effect that would generally be unsuitable for most film, television, or photographic applications. Moreover, most of these LED-based lighting apparatus suffer from a number of other drawbacks, such as requiring expensive and/or inefficient power supplies, incompatibility with traditional AC dimmers, lack of ripple protection (when connected directly to an AC power supply), and lack of thermal dissipation.

In the context of film and television, various attempts have been made to develop camera-mounted lighting fixtures; however, prior attempts to provide a suitable camera-mounted lighting fixture suffer from a variety of potential drawbacks. For example, conventional camera-mounted lighting fixtures using incandescent or fluorescent lighting elements suffer from the same drawbacks as described above, and can cause undesirable shadowing or other side effects. Also, camera-mounted lighting fixtures which are designed to connect to the camera's battery can cause premature depletion of the battery. Other lighting fixtures are designed to be powered by a battery pack which is worn, typically on a belt, by the camera operator. Such battery belts are often heavy and cumbersome, and may require lengthy power cords that can interfere with camera maneuverability.

It would therefore be advantageous to provide a lighting apparatus or lighting effects system that is versatile and portable, and may find use in a variety of applications. It would further be advantageous to provide a lighting apparatus or lighting effects system that is well suited for use in the film, commercial, and/or photographic industries, and/or with live stage performances, that overcomes one or more of the foregoing disadvantages, drawbacks, or limitations.

SUMMARY OF THE INVENTION

The invention is generally directed in one aspect to a novel and versatile lighting apparatus. According to one embodiment as disclosed herein, a lighting apparatus comprises a light panel having a panel frame, with a plurality of semiconductor light elements, such as LEDs, secured to the panel frame. A self-contained battery unit securably attaches to the outside of the panel frame. When attached together, the light panel and self-contained battery unit function as an integrated lighting apparatus. Optionally, the light panel may have an integrated dimmer switch, and may also be capable of receiving power from a source other than the self-contained battery unit.

In various forms and embodiments, the lighting apparatus may be adapted for being mounted to a camera or a stand, and may include adapters for such a purpose. The lighting apparatus may also be provided with a diffusion lens or color gels, which may be integrated with or detachable from the light panel. The lighting apparatus may conveniently be provided in the form of a kit, with one or more of a light panel, self-contained battery unit, compact stand, connecting cable(s), adapter(s), lenses or color gels, and so on, being provided in a single package to allow flexibility and versatility to users in the field.

Further embodiments, variations and enhancements are also disclosed herein.

BRIEF DESCRIPTION OF THE DRAWINGS

FIGS. 16A and 16B are diagrams showing an oblique view and a top view, respectively, of the backside of the lighting assembly frame portion illustrated in FIGS. 15A and 15B, while

FIG. 41A is an oblique view diagram of a panel light illustrating backside fins and a groove for attachment to a multi-panel lighting assembly, and FIG. 41B is a diagram of a multi-panel lighting assembly illustrating attachment of the panel light shown in FIG. 41A.

FIG. 42A is a diagram of a detachable integrated lens sheet for a panel light, and FIGS. 42B-42D are more detailed diagrams of portions of the integrated lens sheet.

FIGS. 47A and 47B are diagrams of a lighting apparatus in accordance with one embodiment as disclosed herein.

FIGS. 48A and 48B are diagrams of the lighting apparatus in FIGS. 47A-B together with an attachable battery unit.

FIGS. 49A and 49B are diagrams showing attachment of the lighting apparatus in FIGS. 47A-B and 48A-B to the attachable battery unit of FIGS. 48A-B.

FIG. 50A is a diagram illustrating placement of a lens and optional color gel on the integrated light panel and battery apparatus of FIGS. 48A-B, and FIG. 50B is a side view diagram illustrating the lens in place.

FIG. 51 is a diagram showing one possible means for mounting an LED light panel to a camera.

FIGS. 52A, 52B and 52C are diagrams illustrating attachment of various mounting pins to the lighting apparatus shown in FIGS. 47A-B.

FIG. 59 is a diagram illustrating a panel light with one or more adapters for mounting or affixing the panel light.

FIGS. 60 and 61 are diagrams of a panel light mounted to different types of tripods.

FIG. 62 is a diagram of a stackable panel light, shown mounted on a stand.

DETAILED DESCRIPTION OF PREFERRED EMBODIMENT(S)

Figure 1:
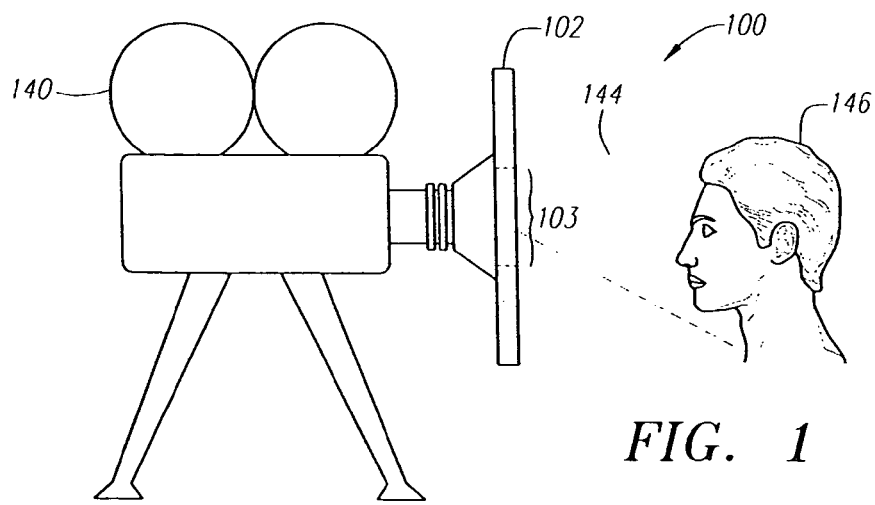
FIG. 1 is a diagram of an example of a lighting effects system in accordance with one embodiment as disclosed herein, illustrating placement of a camera relative to a lighting frame.

Before describing preferred embodiment(s) of the present invention, an explanation is provided of several terms used herein.

The term "lamp element" is intended to refer to any controllable luminescent device, whether it be a light-emitting diode ("LED"), light-emitting electrochemical cell ("LEC"), a fluorescent lamp, an incandescent lamp, or any other type of artificial light source. The term "semiconductor light element" or "semiconductor light emitter" refers to any lamp element that is manufactured in whole or part using semiconductor techniques, and is intended to encompass at least light-emitting diodes (LEDs) and light-emitting electrochemical cell (LECs).

The term "light-emitting diode" or "LED" refers to a particular class of semiconductor devices that emit visible light when electric current passes through them, and includes both traditional low power versions (operating in, e.g., the 20 mW range) as well as high output versions such as those operating in the range of 3 to 5 Watts, which is still substantially lower in wattage than a typical incandescent bulb. Many different chemistries and techniques are used in the construction of LEDs. Aluminum indium gallium phosphide and other similar materials have been used, for example, to make warm colors such as red, orange, and amber. A few other examples are: indium gallium nitride (InGaN) for blue, InGaN with a phosphor coating for white, and Indium gallium arsenide with Indium phosphide for certain infrared colors. A relatively recent LED composition uses Indium gallium nitride (InGaN) with a phosphor coating. It should be understood that the foregoing LED material compositions are mentioned not by way of limitation, but merely as examples.

The term "light-emitting electrochemical cell" or "LED" refers to any of a class of light emitting optoelectronic devices comprising a polymer blend embedded between two electrodes, at least one of the two electrodes being transparent in nature. The polymeric blend may be made from a luminescent polymer, a sale, and an ion-conducting polymer, and various different colors are available. Further background regarding LECs may be found, for example, in the technical references D. H. Hwang et al, "New Luminescent Polymers for LEDs and LECs," Macromolecular Symposia 125, 111 (1998), M. Gritsch et al, "Investigation of Local Ions Distributions in Polymer Based Light Emitting Cells," Proc. Current Developments of Microelectronics, Bad Hofgastein (March 1999), and J. C. deMello et al, "The Electric Field Distribution in Polymer LECs," Phys. Rev. Lett. 85(2), 421 (2000), all of which are hereby incorporated by reference as if set forth fully herein.

The term "color temperature" refers to the temperature at which a blackbody would need to emit radiant energy in order to produce a color that is generated by the radiant energy of a given source, such as a lamp or other light source. A few color temperatures are of particular note because they relate to the film and photographic arts. A color temperature in the range of 3200° Kelvin (or 3200° K) is sometimes referred to as "tungsten" or "tungsten balanced." A color temperature of "tungsten" as used herein means a color temperature suitable for use with tungsten film, and, depending upon the particulars of the light source and the film in question, may generally cover the color temperature range anywhere from about 1000° Kelvin to about 4200° Kelvin. A color temperature in the range of 5500° Kelvin (or 5500° K) is sometimes referred to as "daylight" or "daylight balanced." Because the color of daylight changes with season, as well as changes in altitude and atmosphere, among other things, the color temperature of "daylight" is a relative description and varies depending upon the conditions. A color temperature of "daylight" as used herein means a color temperature suitable for use with daylight film, and, depending upon the particulars of the light source and the film in question, may generally cover the color temperature range anywhere from about 4200° Kelvin to about 9500° Kelvin.

In one embodiment, a lighting effects system comprises an arrangement of lamp elements on a panel or frame. The lamp elements may be embodied as low power lights such as light-emitting diodes (LEDs) or light emitting electrochemical cells (LECs), for example, and may be arranged on the panel or frame in a pattern so as to provide relatively even, dispersive light. The panel or frame may be relatively lightweight, and may include one or more circuit boards for direct mounting of the lamp elements. A power supply and various control circuitry may be provided for controlling the intensities of the various lamp elements, either collectively, individually, or in designated groups, and, in some embodiments, through pre-programmed patterns.

In another embodiment, a lighting effects system comprises an arrangement of low power lights mounted on a frame having an opening through which a camera can view. The low power lights may be embodied as LEDs or LECs, for example, arranged on the frame in a pattern of concentric circles or other uniform or non-uniform pattern. The frame preferably has a circular opening through which a camera can view, and one or more mounting brackets for attaching the frame to a camera. The low power lights may be electronically controllable so as to provide differing intensity levels, either collectively, individually, or in designated groups, and, in some embodiments, may be controlled through pre-programmed patterns.

FIG. 1 is a diagram of an example of a preferred lighting effects system 100 in accordance with one embodiment as disclosed herein, illustrating placement of a camera 140 relative to a lighting frame 102. The lighting frame 102 shown in FIG. 1 may be generally ring-shaped (as shown in, for example, FIGS. 3 and 4, and later described herein), and may define a central hole 103 through which the camera 140 can view. The camera 140 itself, while illustrated in FIG. 1 as a motion picture type camera, may be embodied as any type of image capture or optical viewing device, whether analog or digital in nature. For example, the camera 140 may use film or solid state image capture circuitry (e.g., CCDs), and may be a still photography camera or a motion picture camera. In a preferred embodiment, the lighting frame 102 is physically attached to the camera 140 using a camera mounting, as further described herein.

Figure 2:
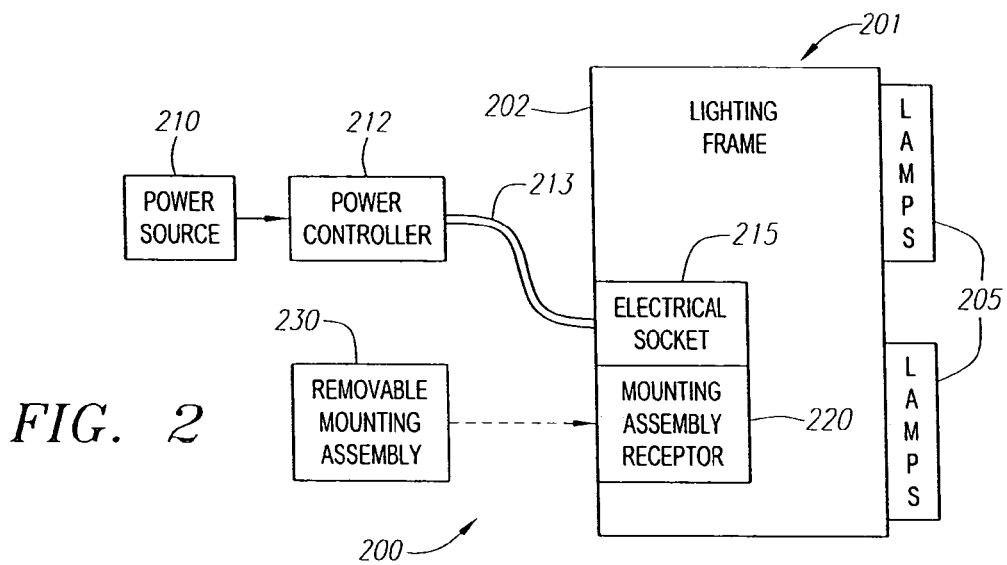
FIG. 2 is a block diagram of a lighting effects system showing various components of a preferred system.

FIG. 2 is a block diagram of a lighting effects system 200 that may, if desired, be constructed in accordance with various principles illustrated in or described with respect to FIG. 1. As illustrated in FIG. 2, the lighting effects system 200 comprises a lighting frame 202 upon which are mounted or otherwise affixed a plurality of lamps 205. Preferred arrangements of the lamps 205 are described further herein. The lighting frame 202 may include a mounting assembly receptor 220 for receiving a mounting assembly 230 (preferably removable in nature), and an electrical socket 215 for receiving a cable 213 providing electrical power to the lamps 205 from a power source 210, although in alternative embodiments battery power may be used. A power controller 212 is preferably interposed between the power source 210 and the electrical socket 215, for providing various lighting effect functions described in more detail hereinafter, such as, for example, dimming, strobing, selective activation, pulsation, and so on, or combinations thereof.

In a preferred embodiment, the lighting frame 202 is ring-shaped, and the lamps 205 are arranged in a pattern around the center hole of the lighting frame 202 so as to provide the desired lighting condition—typically, the lamps 205 will be arranged in a symmetrical, regular pattern so as to provide relatively even lighting over the area of interest. The lighting frame 202 is preferably comprised of a lightweight, durable material, such as thermoplastic and/or aluminum, with a flat black finish (either paint, coating or material) so as to eliminate any reflections from the front of the lighting frame 202 that might cause ghosts to the final image.

Figure 3:
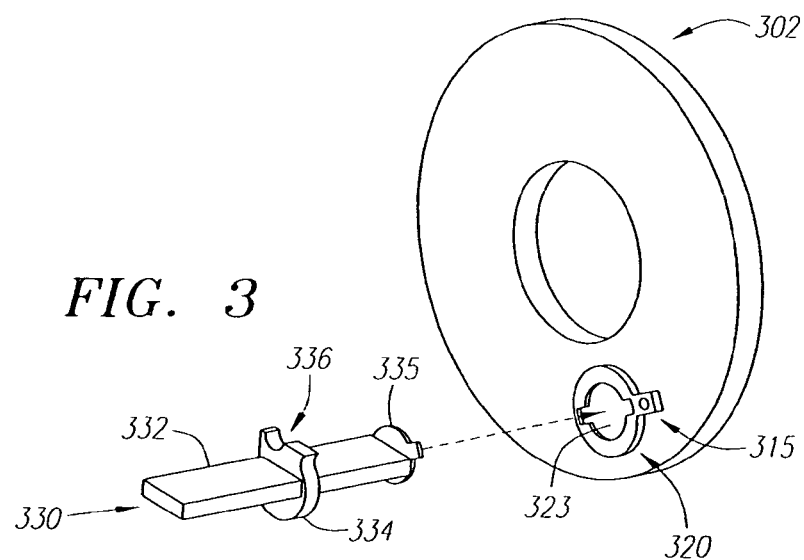
FIG. 3 is an oblique view diagram illustrating an example of attachment of one type of camera mounting assembly to a particular type of lighting assembly frame.
Figure 4:
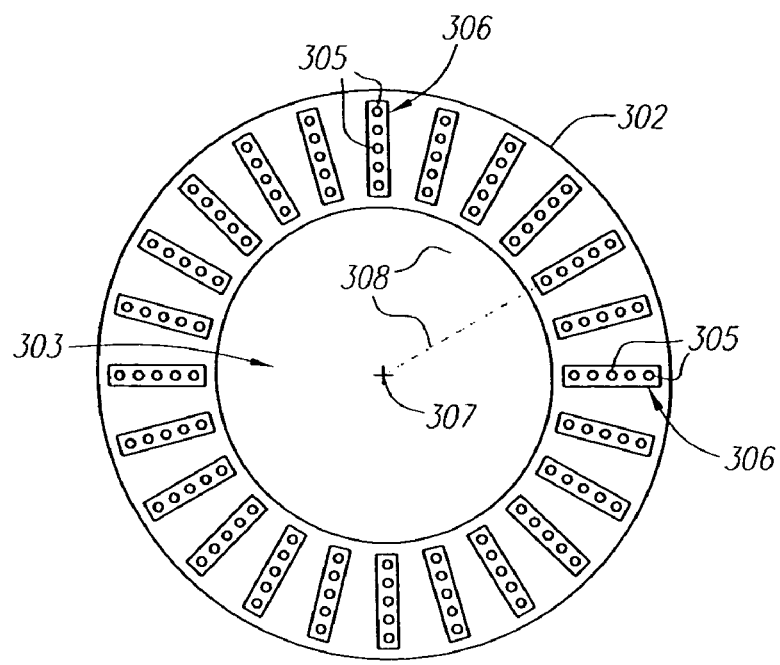
FIG. 4 is a front view diagram of a lighting assembly frame with small, low-power lamps to provide illumination arranged in a preferred pattern.

An example of a preferred lighting frame 302 is depicted from various angles in FIGS. 3 and 4. FIG. 4 shows a front view of a lighting frame 302, illustrating the preferred ring-shaped nature thereof. In the embodiment shown in FIG. 4, a number of lamp segments 306 are arranged in a radial or arrayed pattern around the center hole 303 of the lighting frame 302. The lamp segments 306 are positioned along rays 308 emanating from a center point 307 of the lighting frame 302, and are preferably equidistant from one another (i.e., the rays 308 are preferably defined such that all of the angles between neighboring rays 308 are equal). The equidistant placement of the lamp segments 306 results in a symmetrical, even pattern that advantageously provides even lighting over an area of interest.

Figure 30A:
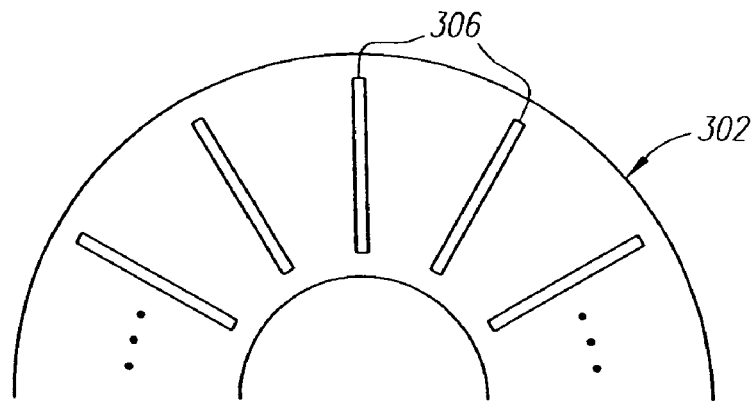
FIGS. 30A, 30B and 30C are diagrams illustrating various alternative lamp patterns.
Figure 30B:
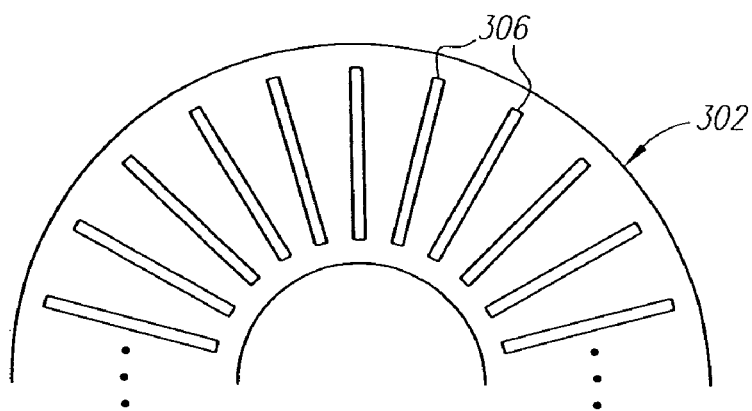
Figure 30C:
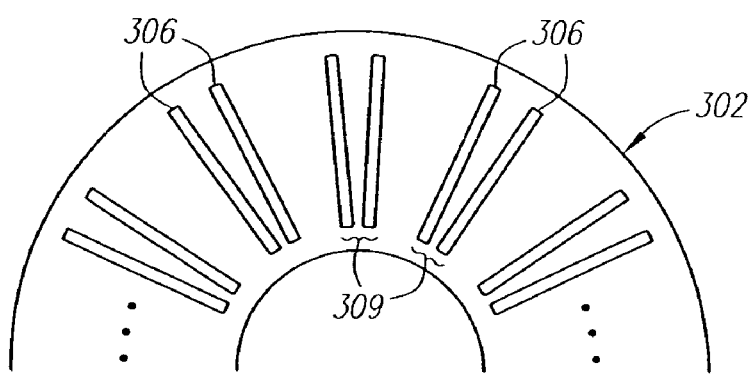

The density of the lamp pattern may vary, and is dictated in part by the particular lighting needs. Examples of alternative lamp arrangement patterns are shown in FIGS. 30A-30C. FIGS. 30A and 30B show the lighting frame 302 with different pattern densities of lamp segments 306. FIG. 30C illustrates a lamp pattern in which pairs 309 of lamp segments 306 are arranged near adjacent to one another, while each pair 309 of lamp segments 306 is positioned further away from its neighboring pair 309 than from the other lamp segment 306 that is part of the lamp segment pair 309. The lamp patterns shown in FIGS. 30A, 30B and 30C are meant to be merely illustrative and not exhaustive. Other lamp patterns might involve, for example, triplets of lamp segments (rather than pairs or singles), or alternating single lamps with pairs and/or triplets, or lamp segments which have gradually increasing or decreasing spacing between them, or lamp segment clusters having the same or different numbers of lamp segments in each cluster, to name a few. The lamp pattern can thus be varied to suit the particular lighting needs, but is preferably symmetric at least in those situations calling for even lighting over the area of interest.

Each of the lamp segments 306 preferably comprises a plurality of low power lamps 305, such as illustrated, for example, in FIG. 4. The low power lamps are preferably solid state in nature and may comprise, for example, light-emitting diodes (LEDs), light-emitting crystals (LECs), or other low power, versatile light sources. Alternatively, fluorescent lamps may be used instead of lamp segments, as described later herein, for example, with respect to, e.g., FIG. 13. Fluorescent lights are power efficient and tend to have high concentrations or spikes of blue, green, and ultraviolet wavelength light. Most white LEDs have color spikes as well. These spikes of color combined with improper proportions of other wavelengths can render the colors of objects seen or photographed as incorrect or odd in hue. Slight color variations may be added relatively easily to the lenses of LEDs to compensate for these deficiencies without significantly impacting the overall light output. Colored LED lenses may also be used to generate a desired color (such as red, green, etc.), but, since colored lenses are subtractive in nature, the stronger the color, generally the more the output of the LED will be dimmed. White LEDs typically utilize clear or nearly clear lenses; however, in any of the embodiments described herein, a clear LED lens may be manufactured with slight subtractive characteristics in order to minimize any color spikes and/or non-linearities in the output of an LED.

The number of low power lamps 305 in each lamp segment 306 may be the same or may vary among lamp segments 306. If the number of low power lamps 305 is the same in each lamp segment 306 and are spaced the same (for example, equidistant from one another) within each lamp segment 306, then the resulting pattern will be a plurality of concentric circles of low power lamps 305 radiating outward from the inner circular portion to the outer circular portion of the lighting frame 302. It will be appreciated, however, that the low power lamps 305 need not be arranged in segments 306 as illustrated in FIG. 4, but may be arranged in clusters or other patterns, whether uniform or non-uniform, over the lighting frame 302. However, a symmetrical, regular pattern of low power lamps 305 is preferred, at least where uniform lighting is desired over an area of interest.

Figure 5:
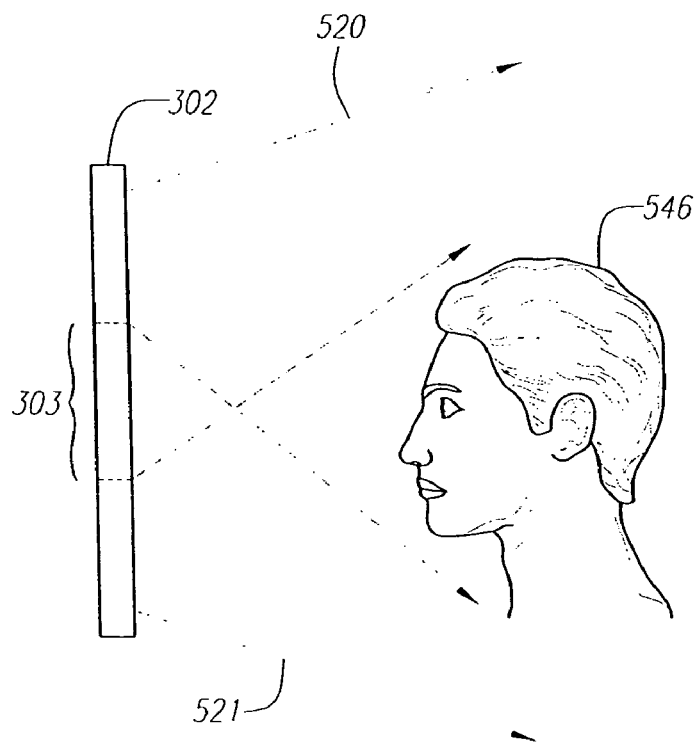
FIG. 5 is a diagram illustrating aspects of the lighting effect provided by a lighting assembly such as, for example, shown in FIG. 4.

FIG. 5 illustrates the effect of a lighting frame assembly such as light frame 302 with low power lamps 305 arranged as shown in FIG. 4, in illuminating a subject 646. As shown in FIG. 5, radiating light regions 620, 621 from lamps arranged on the front surface of the lighting frame 302 (as illustrated in FIG. 4, for example) overlap one another in a manner so as to provide lighting from multiple angles. With a radial or arrayed pattern of lamp segments 306 as shown in FIG. 4, a subject 646 may be relatively evenly illuminated from every angle. FIG. 1 illustrates a preferred placement of a camera 140 (including any type of image capture device, whether film based, solid state/CCD, or otherwise) with respect to a lighting frame 102 (which may be embodied, for example, as lighting frame 302). As illustrated in FIG. 1, the camera 140 may be positioned so that its lens or optical front-end peers through the central hole 103 of the lighting frame 102, thus allowing the lighting to be presented from the same angle and direction as the camera viewpoint.

Figure 6:
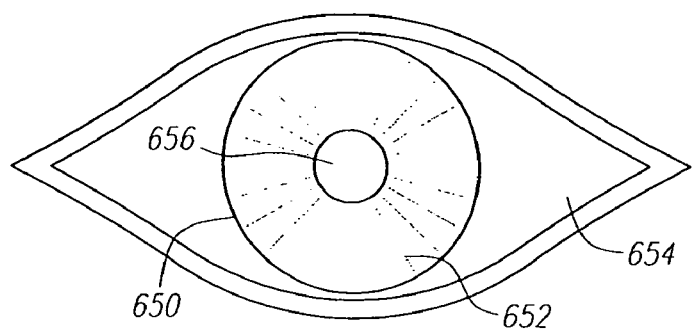
FIG. 6 is a diagram illustrating various human eye features that may be of interest in providing illumination for films, commercials or photography.

FIG. 6 illustrates how the lighting frame assembly with the pattern of lamp segments 306 as shown in FIG. 4 may advantageously illuminate a human subject's eyes. In FIG. 6, the iris 650 of the subject's eye 654 is illustrated showing a circular pattern of reflected light segments 652 around the iris 650. A lighting pattern of a lighting system such as illustrated in FIG. 4 can illuminate the iris 650 of the subject's eye 654 from multiple angles, thus helping provide desirable "eye lights" or "catch lights" with respect to a human subject 546, as well as providing uniform, even lighting over the area of interest.

Turning once again to FIG. 3, an oblique view of the lighting frame 302 is shown illustrating an example of attachment of one type of camera mounting assembly 330 to the lighting frame 302. In the particular embodiment illustrated in FIG. 3, a mounting assembly receptor 320 is affixed to, molded as part of, or otherwise attached to the lighting frame 302. The camera mounting assembly 330 is preferably configured so as to attach securely to the mounting assembly receptor 320. The mounting assembly receptor 320 may, for example, include a socket 323 or similar indentation adapted to receive a corresponding member 335 on the camera mounting assembly 330. The member 335 may be attached to an elongated rod or arm 332, along which a camera clamp 334 may be slidably engaged. The camera clamp 334 preferably includes a generally U-shaped clamping portion 336 which may be securely attached along the housing of a camera, and may advantageously be moved along the elongated rod or arm 332 and clamped into a suitable position using a clamping screw or other fastening mechanism.

Figure 15A:
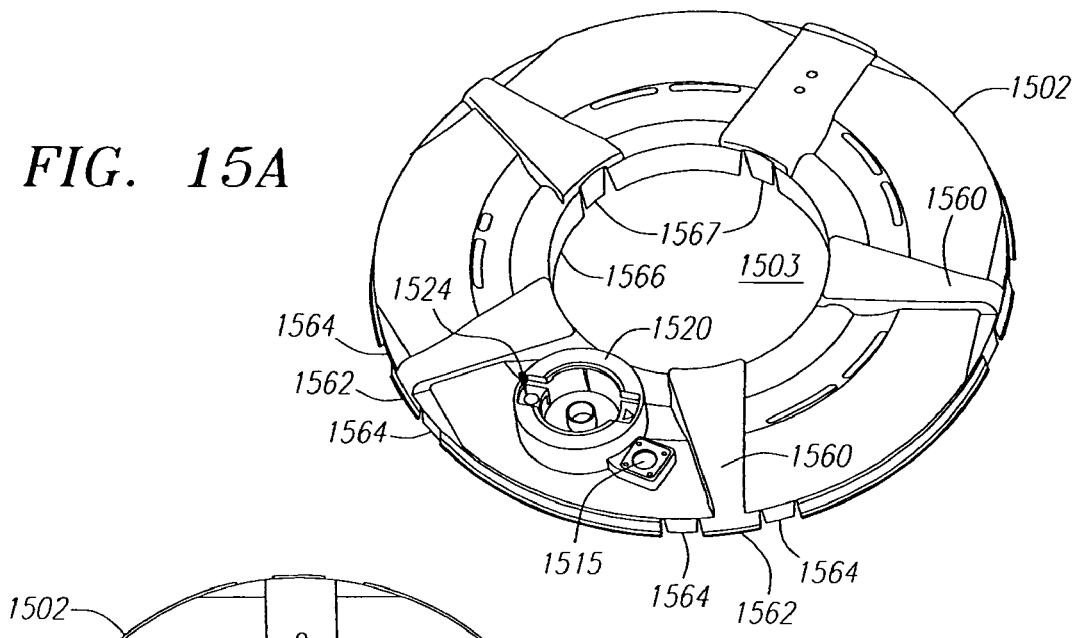
FIGS. 15A and 15B are diagrams showing an oblique view and a top view, respectively, of a portion of a lighting assembly frame.
Figure 15B:
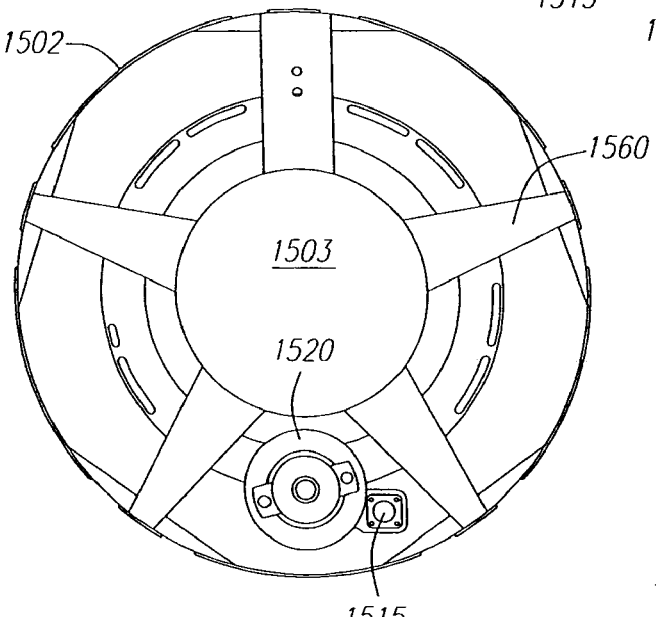

FIGS. 15A and 15B are diagrams showing an oblique view and a frontal view, respectively, of one portion of a lighting assembly frame 1502 in accordance with one or more of the concepts or principles explained with respect to the embodiment shown in FIG. 3. As illustrated in FIGS. 15A and 15B, the lighting assembly frame portion 1502 is generally ring-shaped in nature, having a central hole 1503 for allowing a camera or other image capture device to view through the lighting assembly frame. The lighting assembly frame portion 1502 may be reinforced, if desired, with ribs 1560, and may include, as noted with respect to FIG. 3, a mounting assembly receptor 1520 for receiving a camera mounting assembly (not shown in FIG. 15A), and an electrical socket 1515 for receiving a cable or wires for providing power to the lamps of the lighting assembly.

Figure 15C:
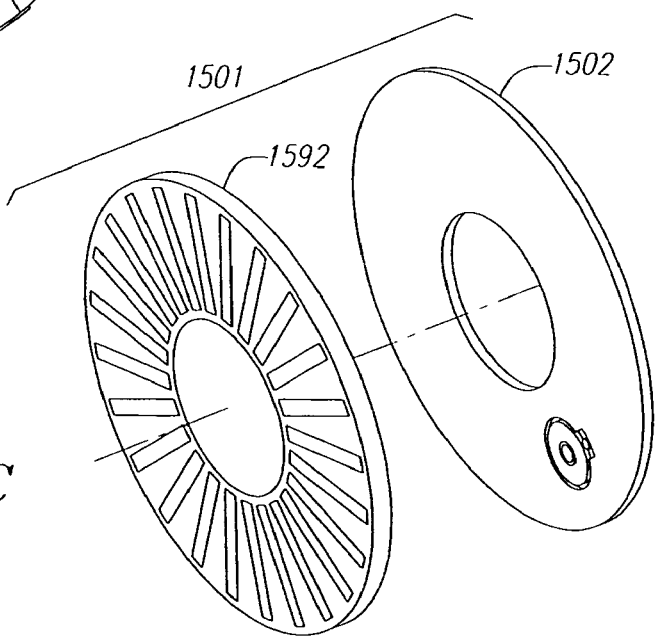
FIG. 15C is a diagram illustrating assembly of a lighting assembly frame from two halves thereof.

The lighting frame portion 1502 illustrated in FIG. 15A comprises one half (specifically, the backside half) of a complete lighting frame assembly. A corresponding lighting frame portion 1592 (e.g., printed circuit board), as shown in FIG. 15C, may be adapted to fit securely to the lighting frame portion 1502 (e.g., injected molded poly-carbonate), and may attach thereto by, for example, exterior locking tabs 1564 and/or interior locking tabs 1567, which are shown in FIGS. 15A and 15B. Alternatively, other means for fastening together the lighting frame assembly 1501 may be used, such as screws, glue, etc.

Figure 18:
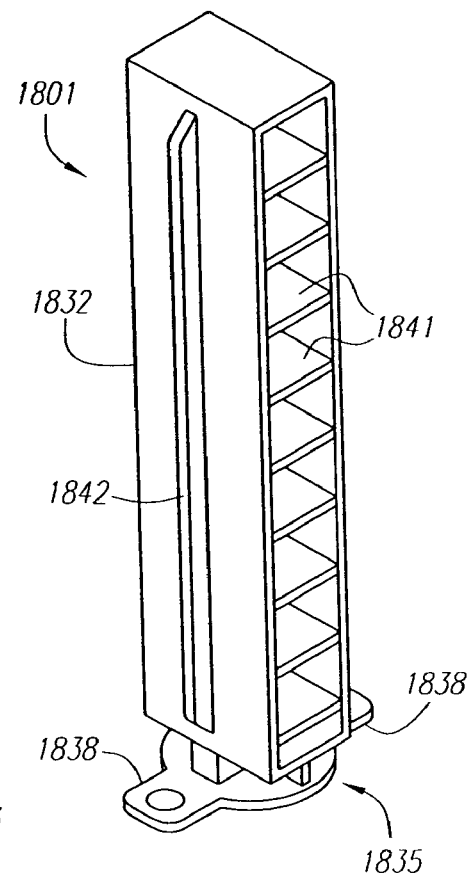
FIG. 18 is a diagram of a portion of a preferred camera mounting assembly.

Likewise, the mounting assembly receptor 1520 may comprise any suitable mechanism for securing a camera mounting assembly to the lighting frame portion 1502 of the lighting frame assembly 1501. In the example illustrated in FIGS. 15A and 15B, the mounting assembly receptor 1520 may comprise a raised, slightly tapered cylindrical housing, defining a hollow cylindrical chamber in which the camera mounting assembly may be fitted. If the lighting frame portion 1502 is formed of plastic, for example, then the mounting assembly receptor 1520 may be formed through an injection molding process. FIG. 18 depicts an example of a portion of a camera mounting assembly 1801 as may be affixed to the lighting frame portion 1502 using the mounting assembly receptor 1520. The camera mounting assembly 1801 in FIG. 18 comprises an elongated rod or arm 1832, at the end of which is affixed an attachment member 1835 having a generally circular body portion with two wing-like protruding tabs 1838. The tabs 1838 may be fitted into two corresponding indentations 1524 in the ring-shaped top surface of the cylindrical housing of the mounting assembly receptor 1520. The camera mounting assembly 1801 may then be twisted in a clockwise direction to cause the tabs 1838 to slide through the slits adjacent to the indentations 1524 in the mounting assembly receptor 1520, allowing the camera mounting assembly 1801 to be slid downward, then twisted in a counter-clockwise direction and locked into place in the mounting assembly receptor 1520. The camera mounting assembly 1801 may be disengaged from the lighting frame portion 1501 by manually applying pressure to release the locking tabs and twisting the camera mounting assembly 1801 in the opposite (i.e., clockwise in this example) direction from that originally used to bring it into a locking position. The camera mounting assembly 1801 may then be raised upwards and twisted in a counter-clockwise direction to cause the tabs 1838 to slide back through the slits adjacent to the indentations 1524 in the mounting assembly receptor 1520, thereby completely releasing the camera mounting assembly 1801.

A variety of other means may alternatively be used to affix a camera mounting assembly to the lighting frame portion 1502, but the mechanism used in the embodiment depicted in FIGS. 15A and 15B has the advantage of not requiring additional pieces (such as screws), and being relatively simple and quick to use.

Figure 19A:
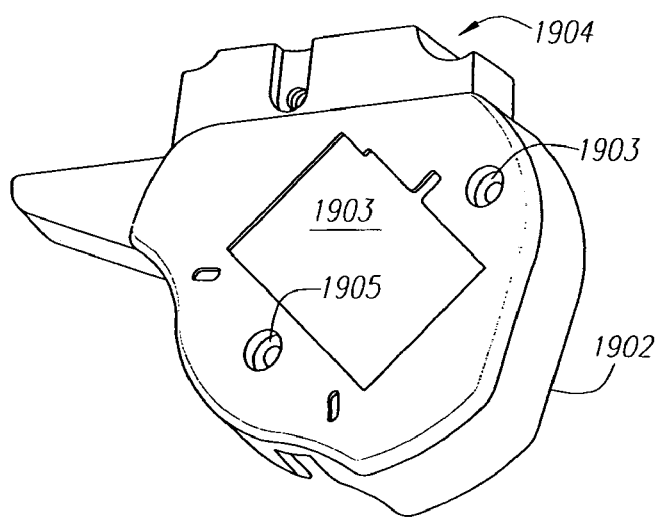
FIGS. 19A and 19B are diagrams collectively illustrating another portion of a preferred camera mounting assembly.
Figure 19B:
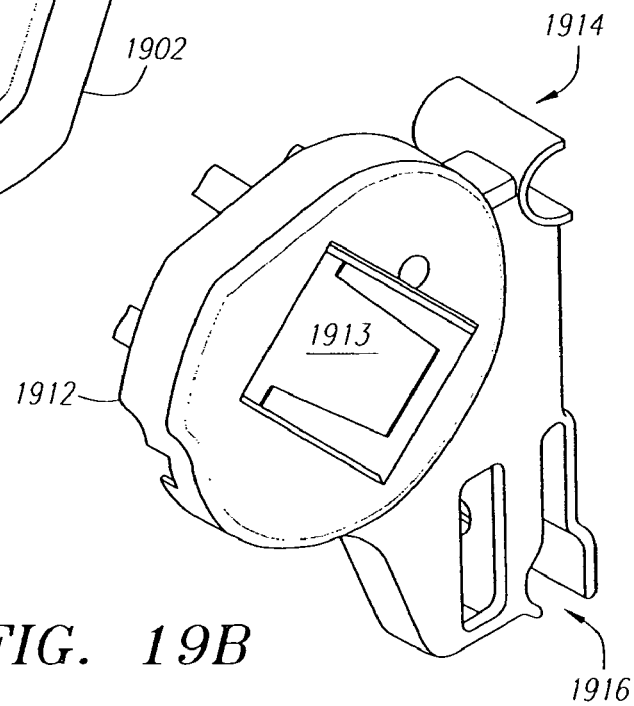
Figure 20:
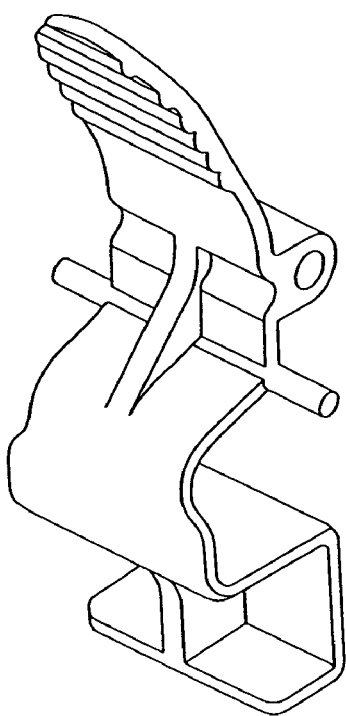
FIG. 20 is a diagram of a retention clip for a camera mounting assembly.
Figure 22:
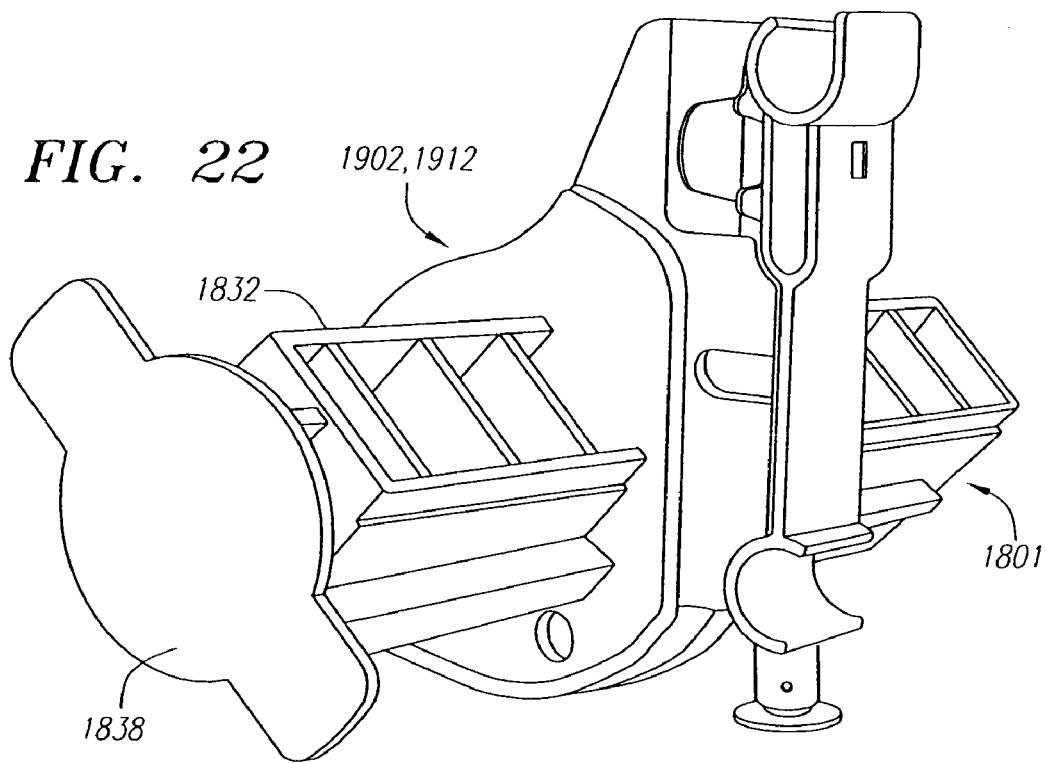
FIG. 22 is a diagram of a mounting assembly with components from FIGS. 18 and 19 shown assembled.

A main purpose of the camera mounting assembly 1801 is to allow the lighting frame assembly to be secured to a camera or other image capture device, thus providing even lighting from all directions surrounding the camera or other image capture device, and allowing, for example, the lighting frame assembly to follow the motion of the camera or other image capture device as it is moved. An example of additional components allowing the camera mounting assembly 1801 to be secured to a camera are shown in FIGS. 19A and 19B. In particular, FIGS. 19A and 19B depict two halves 1902, 1912 of a camera clamp which may be joined together and attached to the elongated rod or arm 1832 of the camera mounting assembly 1801, arriving at a complete camera mounting assembly such as illustrated in FIG. 3 (i.e., camera mounting assembly 330) or, in more detail, in FIG. 22. The rectangular openings 1903, 1913 in the two halves 1902 and 1912, respectively, of the camera clamp allow it to be slid onto the elongated rod or arm 1832. A spring-loaded retention clip, as shown in FIG. 20, may be used to help secure the camera clamp to the elongated rod or arm 1832. In alternative embodiments, the camera clamp (comprising the combination of two halves 1902, 1912) may be permanently affixed and/or integrally formed with the elongated rod or arm 1832.

An attachment member, such as pre-molded clamping member 1916 shown in FIG. 19B, may be used to slide onto an appropriate feature of the camera (such as a Panavision® type motion picture camera), e.g., a rod or other feature of the camera. Other types of attachment members may be used, depending upon the particular nature of the camera or other image capture device. The camera mounting assembly 1801, in conjunction with the preferred camera clamp illustrated in FIGS. 19A and 19B, thereby allow a lighting frame assembly to be secured to a camera or other image capture device.

Figure 21:
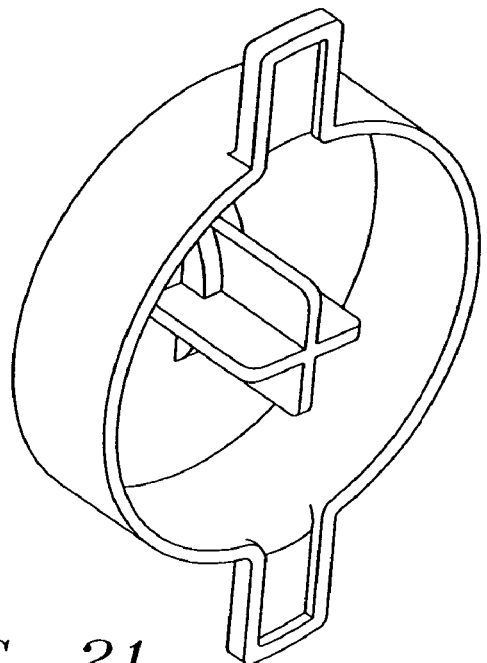
FIG. 21 is a diagram of a plunger used in connection with attaching a mounting assembly to a lighting frame, in accordance with one technique as disclosed herein.
Figure 23:
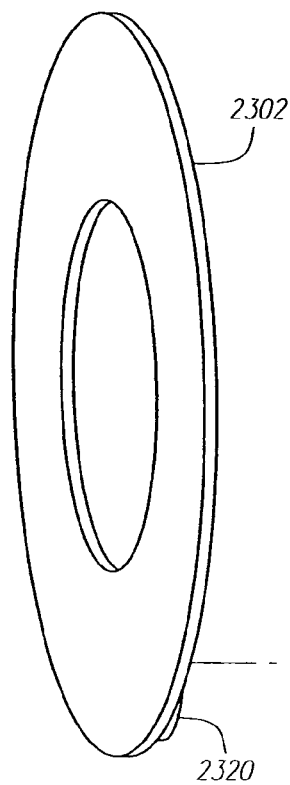
FIG. 23 is a diagram illustrating one technique for attaching a camera mounting assembly to a lighting frame.

FIG. 23 is a diagram illustrating one technique for attaching a camera mounting assembly to a lighting frame. As shown in FIG. 23, a lighting frame 1302 may comprise a mounting assembly receptor 1320, similar to as described with respect to FIG. 3 and FIGS. 15A-15B, for example. In connection with attaching a camera mounting assembly 2328, a spring 2305 is first positioned in the mounting assembly receptor 2320, atop of which is then placed a plunger 2308 (such as illustrated in FIG. 21). Then, the camera mounting assembly 2328 is attached, by, e.g., inserting the attachment member into the mounting assembly receptor 2320. In essence, the application of the attachment member to the mounting assembly receptor 2320 may be viewed analogously to inserting and twisting a "key" in a keyhole. The spring 2305 effectively locks the camera mounting assembly 2328 in place against the back "keyplate" surrounding the keyhole, thus allowing the camera mounting assembly 2328 to be "twist-locked" into place. The assembly structure shown in FIG. 23 allows relatively easy attachment and detachment of the camera mounting assembly 2328. Other attachment techniques may also be used.

Figure 24:
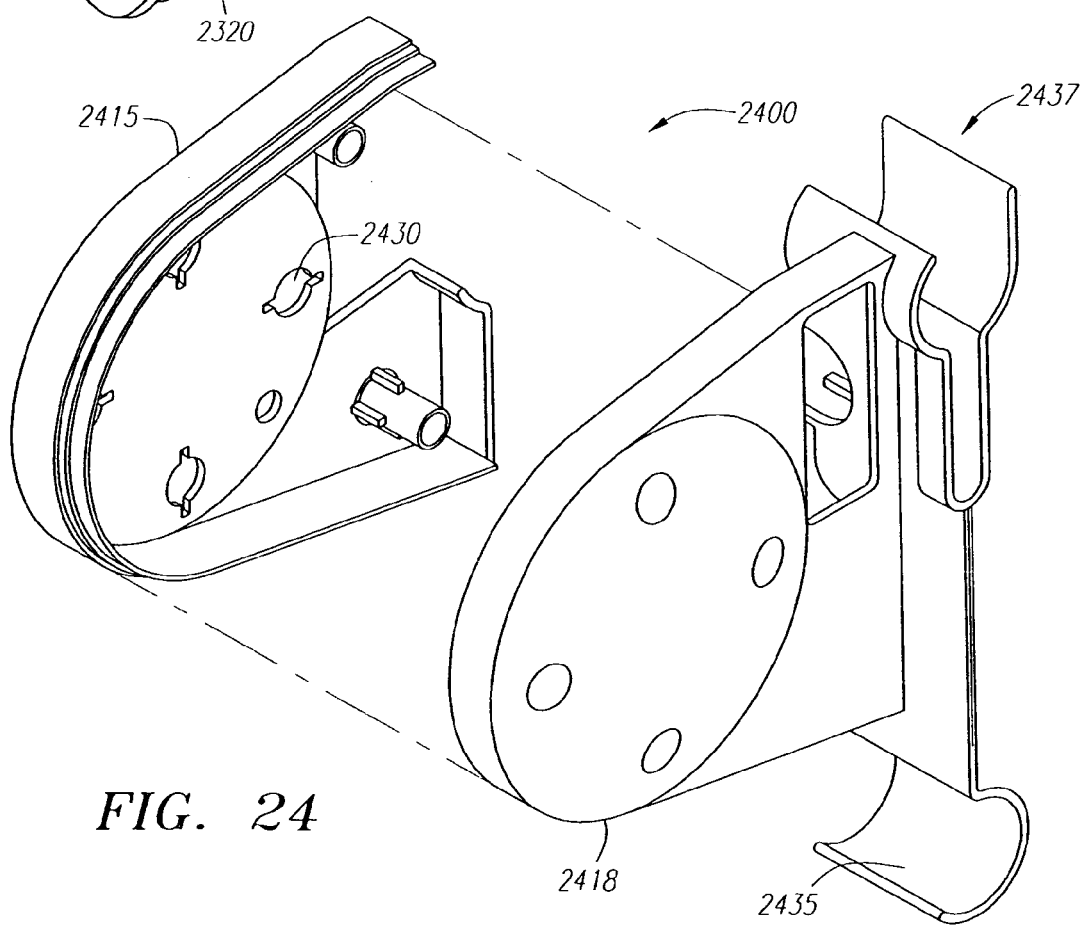
FIGS. 24, 25 and 26 are diagram of components relating to another type of camera mounting assembly.
Figure 25:
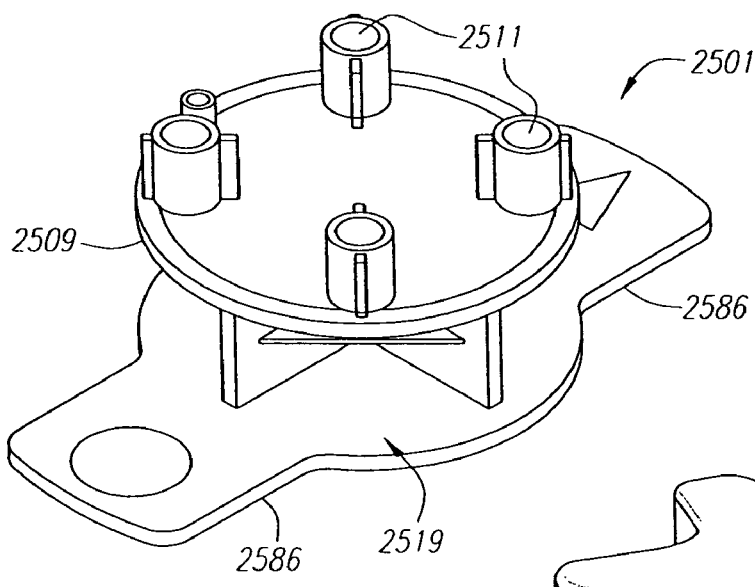
Figure 26:
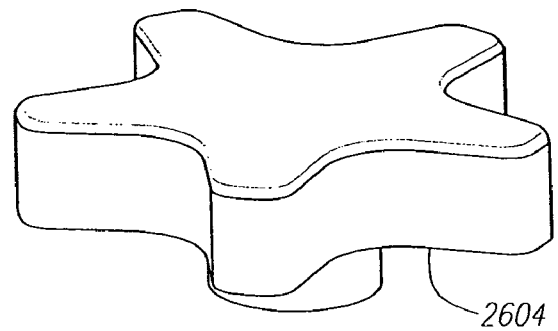
Figure 27:
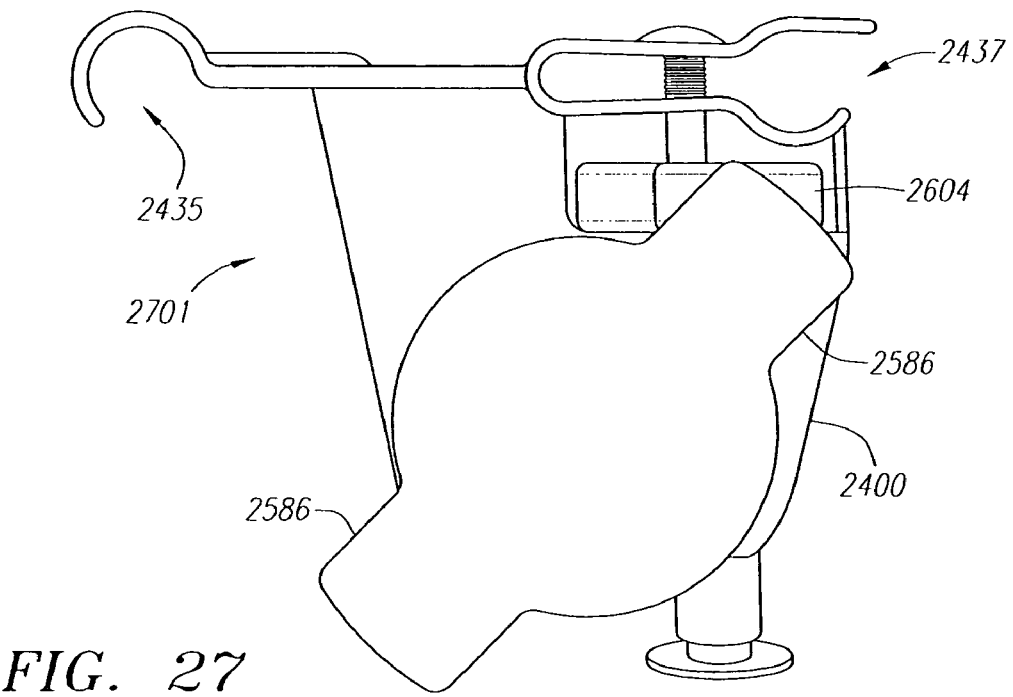
FIG. 27 is a diagram showing components of FIGS. 24, 25 and 26 assembled together.

Another embodiment of a camera mounting assembly, as may be used to attach a lighting frame to a camera or other image capture device, is illustrated in FIG. 27, and various components thereof are illustrated individually in FIGS. 24, 25 and 26. With reference first to FIG. 24, two halves 2415, 2418 of a camera clamp may be joined together to form a main camera clamp body the two halves 2415, 2418 may be secured together by screws or any other suitable fastening means. A slot in the camera clamp body may be provided to allow placement of a thumbwheel 2604 (illustrated in FIG. 26) which allows tightening of a clamping member 2437. Several holes 2430 are provided in camera clamp portion 2415, which receive corresponding protrusions 2511 from an attachment member 2501, illustrated in FIG. 25, which has a generally circular body portion 2519 with two wing-like protruding tabs 2586. The completed camera mounting assembly 2701 appears as in FIG. 27.

The tabs 2586 of the camera mounting assembly 2701 shown in FIG. 27 may be fitted into the two corresponding indentations 1524 in the ring-shaped top surface of the cylindrical housing of the mounting assembly receptor 1520 shown in FIG. 15, as described previously with respect to the FIG. 22 camera mounting assembly. As before, the camera mounting assembly may be twisted in a clockwise direction to cause the tabs 2586 to slide through the slits adjacent to the indentations 1524 in the mounting assembly receptor 1520, allowing the camera mounting assembly 2701 to be slid downward, then twisted in a counter-clockwise direction and locked into place in the mounting assembly receptor 1520. The camera mounting assembly 2701 may be disengaged from the lighting frame portion 1501 by manually applying pressure to release the locking tabs and twisting the camera mounting assembly 2701 in the opposite (i.e., clockwise in this example) direction from that originally used to bring it into a locking position. The camera mounting assembly 2701 may then be raised upwards and twisted in a counter-clockwise direction to cause the tabs 2586 to slide back through the slits adjacent to the indentations 1524 in the mounting assembly receptor 1520, thereby completely releasing the camera mounting assembly 2701.

As noted previously, a variety of other means may alternatively be used to affix a camera mounting assembly 2701 of FIG. 27 to the lighting frame portion 1502.

As with the camera mounting assembly 1801 shown in FIG. 18, the camera mounting assembly of FIG. 27 functions to allow a lighting frame assembly to be secured to a camera or other image capture device, thus allowing, for example, the lighting frame assembly to follow the motion of the camera or other image capture device as it is moved. An attachment member, such as pre-molded clamping member 2437 shown in FIG. 24, may be used to slide onto an appropriate feature, such as a rod or other feature, of the camera (for example, an Arri® type motion picture camera).

Figure 28:
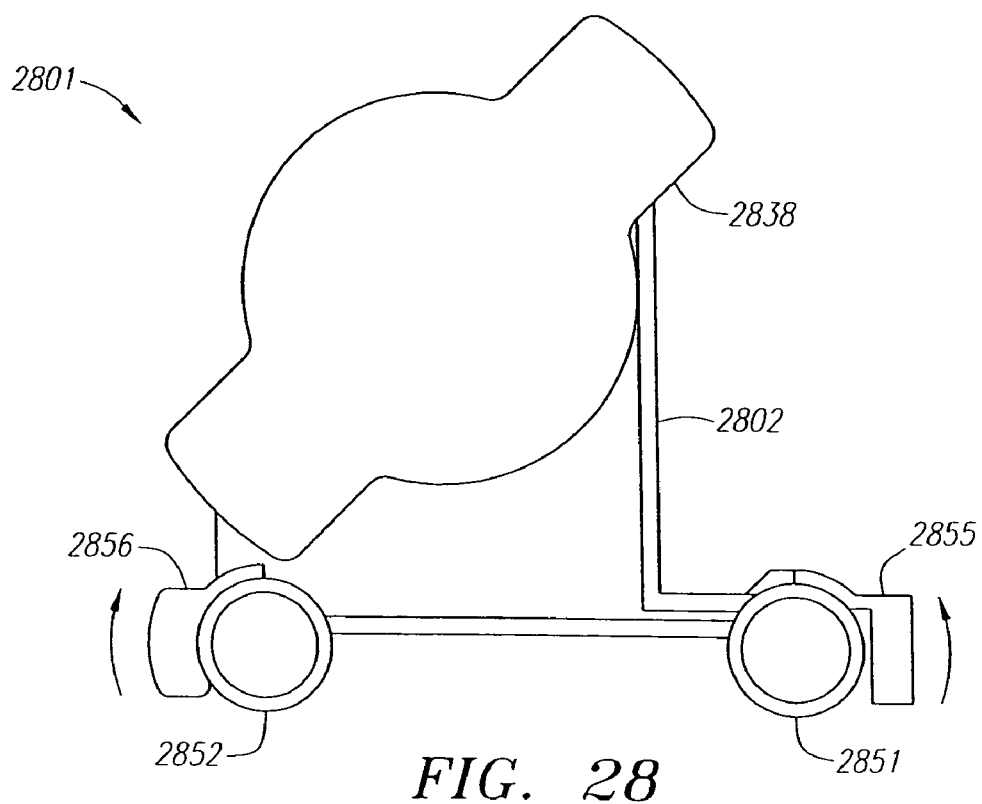
FIGS. 28 and 29 are diagrams of alternative embodiments of integral or semi-integral camera mounting assemblies.
Figure 29:
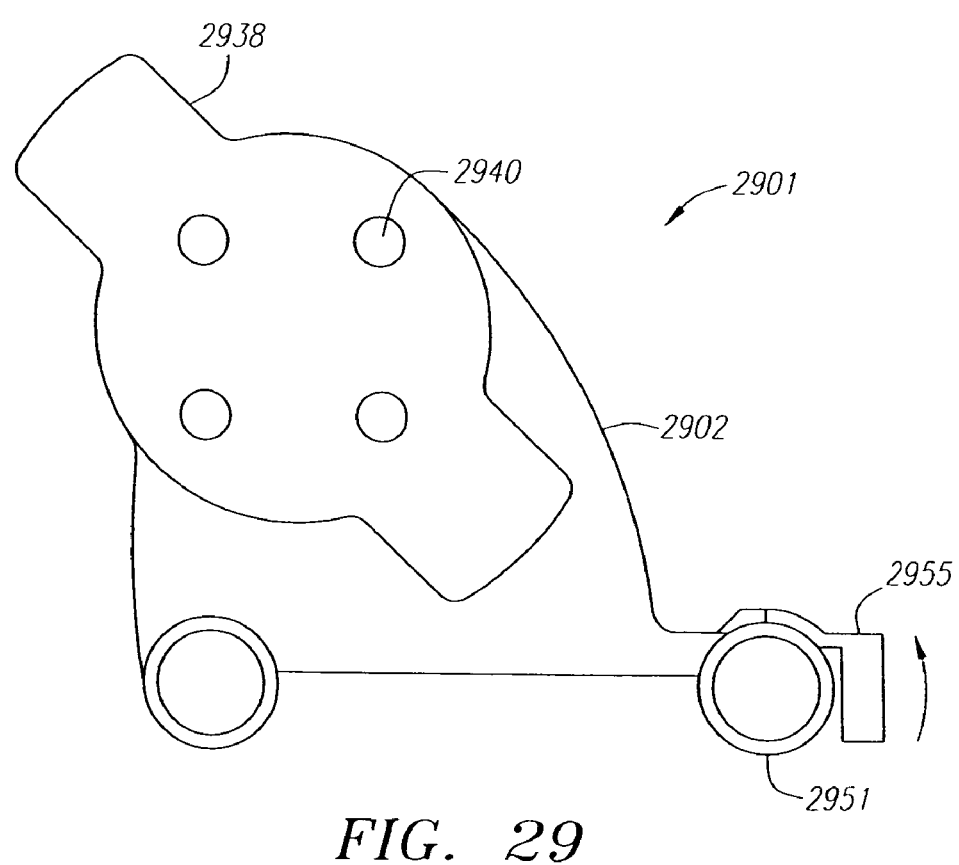

FIGS. 28 and 29 are diagrams of alternative embodiments of camera mounting assemblies having certain integral components. FIG. 28 illustrates a camera mounting assembly 2801 as may be used, for example, to secure a lighting frame to a Panavision® type camera. As shown in FIG. 28, an attachment member 2838 (or "key") connects with, and integrally attaches to, a camera clamp plate 2802, in a manner similar to that shown in FIG. 18, but eliminating the elongated rod or arm shown therein. A pair of cylindrically-shaped lock lever "screws" 2851, 2852 enable the camera mounting assembly 2801 to attach to an appropriate feature of the camera. Lock levers 2855, 2856 connected to each of the lock lever screws 2851, 2852 can be flipped (e.g., a quarter turn) in order to lock the screws 2851, 2852 into place, thus securing the camera mounting assembly 2801 to the camera. The lock lever screws 2851, 2852 can be flipped the opposite direction to unlock the screws 2851, 2852 and thereby release the camera mounting assembly 2801 from the camera.

FIG. 29 illustrates a camera mounting assembly 2901 as may be used, for example, to secure a lighting frame to an Arri® type camera. As shown in FIG. 29, an attachment member 2938 (or "key") connects with, and attaches to, a camera clamp plate 2902, by way of, e.g., screws 2940. A cylindrically-shaped lock lever screw 2951 enables the camera mounting assembly 2901 to attach to an appropriate feature of the camera. A lock lever 2855 connected to the lock lever screw 2851 can be flipped (e.g., a quarter turn) in order to lock the screw 2851 into place, thus securing the camera mounting assembly 2901 to the camera. The lock lever screw 2851 can be flipped the opposite direction to unlock the screw 2851 and thereby release the camera mounting assembly 2901 from the camera.

Figure 16A:
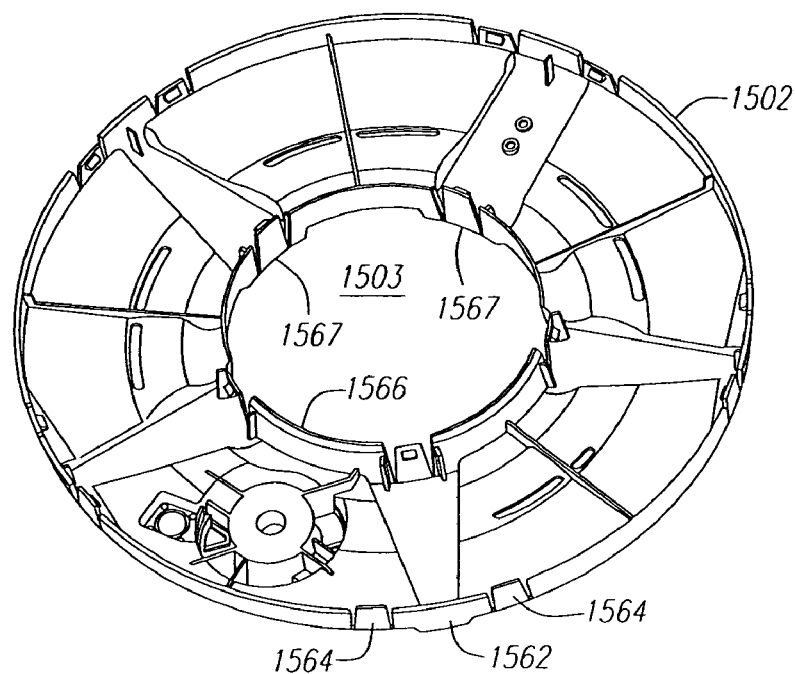
Figure 16B:
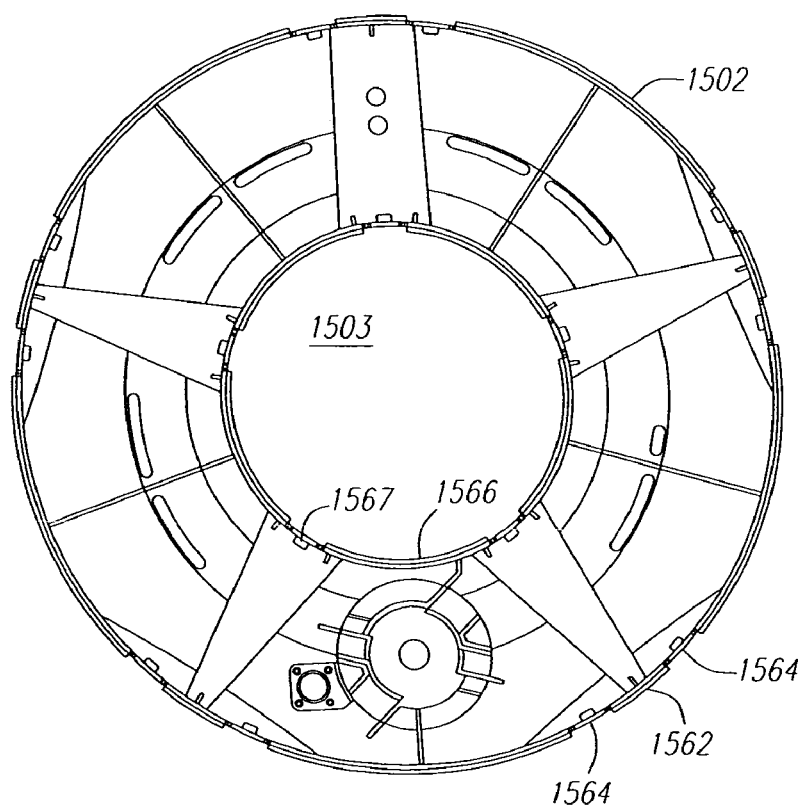
Figure 16C:
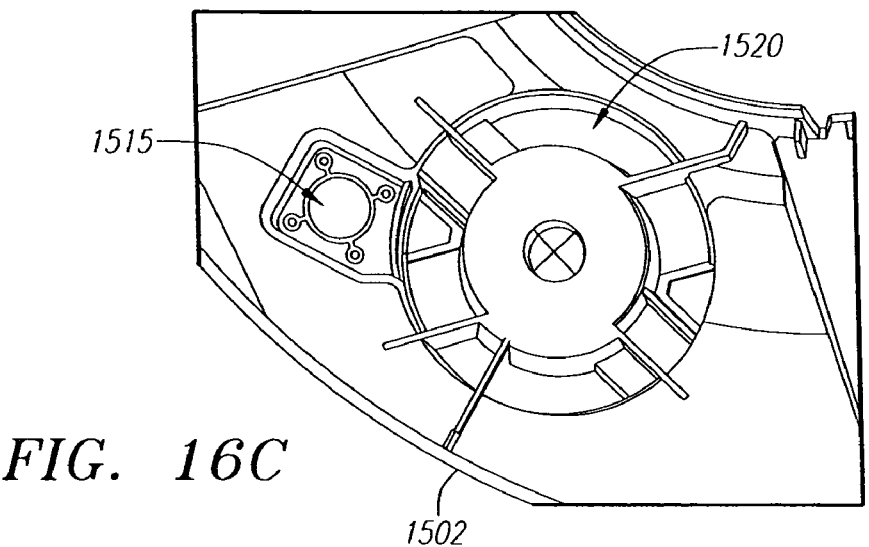
FIGS. 16C, 16D and 16E are diagrams showing details of the lighting assembly frame portion shown in FIGS. 16A and 16B.
Figure 16D:
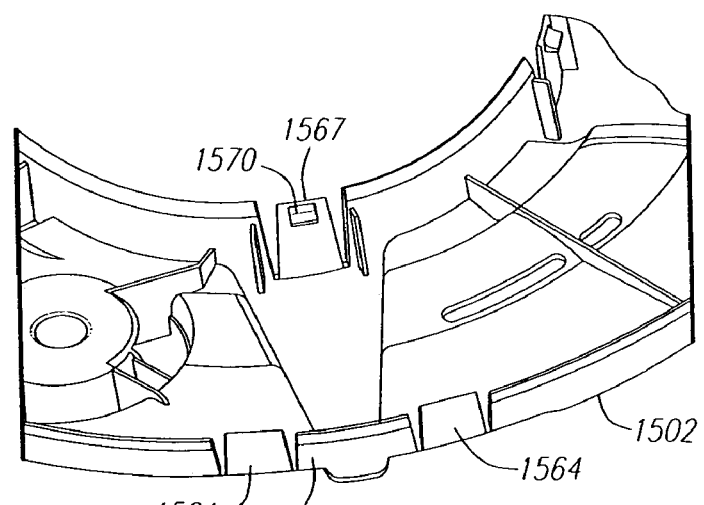
Figure 16E:
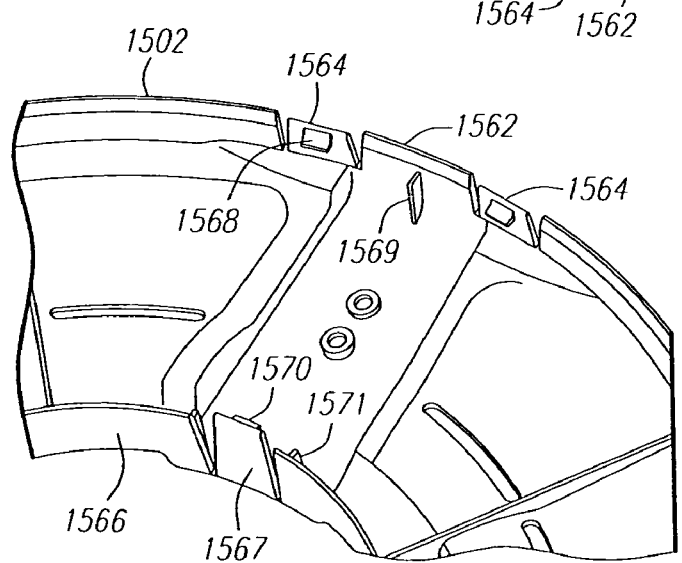

Additional details of the particular lighting frame portion 1501 of FIGS. 15A and 15B are illustrated in FIGS. 16A through 16E. FIGS. 16A and 16B, for example, are diagrams showing an oblique view and a top view, respectively, of the backside of the lighting frame portion 1501 illustrated in FIGS. 15A and 15B. In FIGS. 16A and 16B can more clearly be seen, for example, the interior locking tabs 1567 and exterior locking tabs 1564 that can be used to secure the lighting frame portion 1501 to its corresponding half, as previously described with respect to FIG. 15C. In FIG. 16C is depicted a close-up illustration of the backside of the mounting assembly receptor 1520 and electrical socket 1515 illustrated from the opposite side in FIGS. 15A and 15B. In FIGS. 16D and 16E can be seen additional details of both the mounting assembly receptor 1520 (FIG. 16D) and the interior locking tabs 1567 and exterior locking tabs 1564. As shown in FIGS. 16D and 16E, the interior locking tabs 1567 may include a protruding locking member 1570 for securing the lighting frame portion 1501 to its counterpart by, e.g., snapping it into place, and the exterior locking tabs 1564 may likewise include protruding locking members 1568 having a similar function. The frame wall 1562 between the two nearby exterior locking tabs 1564 may be reinforced with a supporting rib 1569, to provide added counter-force when the lighting frame assembly is put together.

The camera mounting assemblies shown in FIGS. 18, 23, 27, 28 and 29 are merely examples of camera mounting assemblies that may be utilized in various embodiments described herein. Other camera mounting assemblies may be specifically adapted to the particular camera of interest. The mounting assembly receptor 320 (or 1520) may in one aspect be viewed as a universal receptor, allowing different camera mounting assemblies to be connected to the lighting frame, provided that they are compatible with the mounting assembly receptor (such as the example shown in FIGS. 15A-15BB and elsewhere). A single lighting frame may thus be used with any of a variety of different cameras or other image capture devices. Although examples have been explained with respect to certain camera types (that is, a Panavision® camera or an Arri® camera), the camera may be of any type, whether for film or still photograph, and may be based upon either analog or digital imaging techniques. Moreover, while preferred dimensions are illustrated in some of the figures, the mounting assemblies and components thereof may be of any appropriate size and shape.

Figure 9:
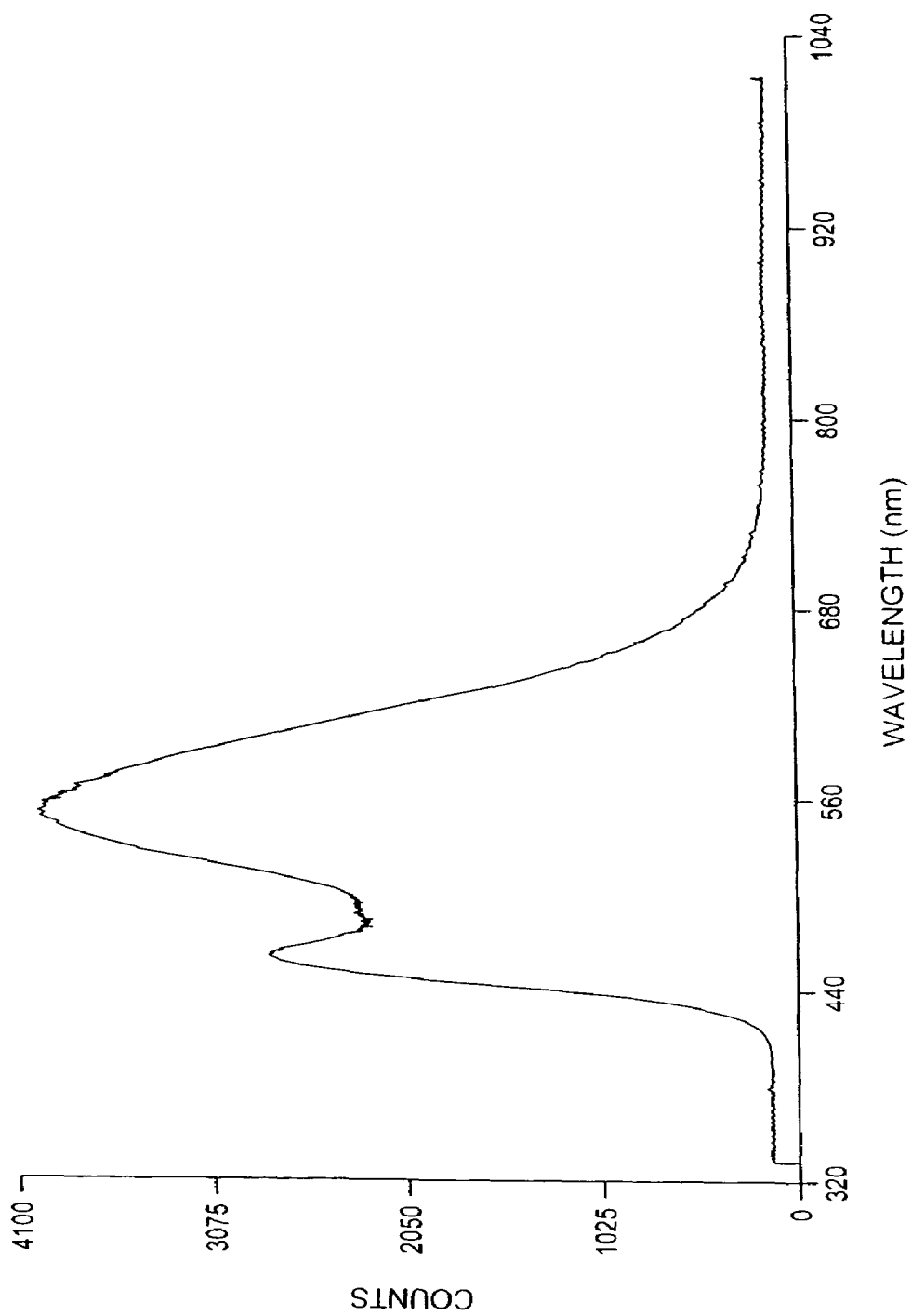
FIG. 9 is a graph illustrating a frequency distribution of light in accordance with one lighting effects system embodiment as disclosed herein.
Figure 17:
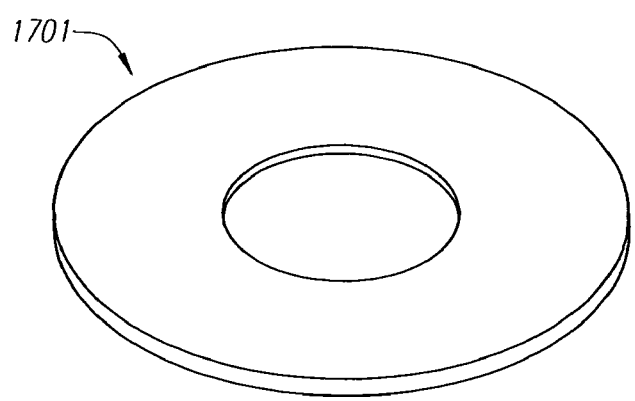
FIG. 17 is a diagram of a cover as may be used in connection with the lighting effects system of FIG. 2 or the frame assembly of FIG. 4.

Further description will now be provided concerning various preferred light elements as may be used in connection with one or more embodiments as disclosed herein. While generally discussed with reference to FIG. 3, the various light elements described below may be used in other embodiments as well. When embodied as LEDs, the low power lamps 305 typically will emit light at approximately 7400-7500K degrees when at full intensity, which is white light approximating daylight conditions. However, LEDs of a different color, or one or more different colors in combination, may also be used. FIG. 9 is an energy spectrum graph showing a typical frequency distribution (in terms of light wavelength) of light output from white-light, low voltage LEDs, and illustrating a main peak at about 600 nanometers. A color correction mechanism, such as a color correction gel or lens filter, may be used to alter the color of the LED light. For example, the LED light could be converted to "tungsten daylight" (similar in hue to an incandescent bulb) by use of a color gel or colored lens. A diffusion lens or filter may also be used, by itself or in conjunction with a color gel or colored lens, to diffuse or soften the outgoing light. A diffusion lens or filter may be formed of, e.g., clear or white opaque plastic, and may be configured in a ring-shaped pattern of similar dimension to the light frame 302 to facilitate mounting thereon. FIG. 17, for example, shows a diagram of an opaque, ring-shaped cover 1701 as may be used in connection with the lighting frame assembly depicted in FIG. 3 or FIG. 4.

Figure 7:
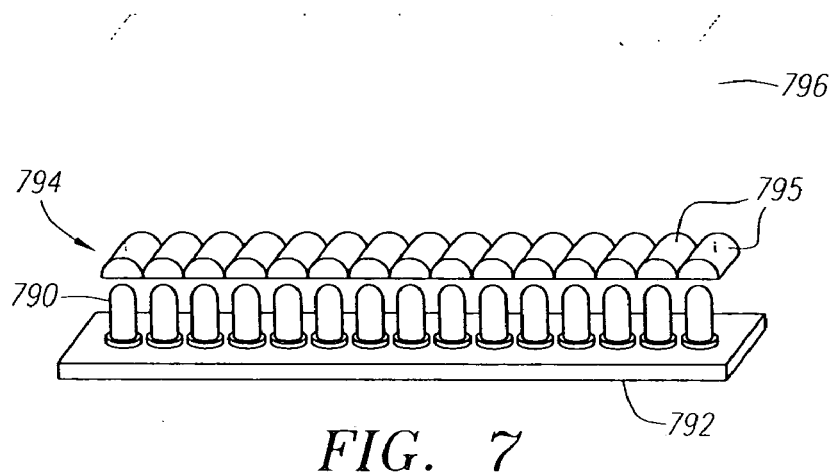
FIG. 7 is a diagram of a light segment as may be used, for example, with the lighting assembly of FIG. 4, along with filtering lens(es).

FIG. 7 is a more detailed diagram of a light segment 792 (e.g., an array) as may be used, for example, in connection with the lighting frame 302 shown in FIG. 4. The light segment 792 may correspond to each of the individual light segments 306 shown in FIG. 4, and the various light elements (i.e., LEDs) 790 in FIG. 7 may correspond to the individual low power lamps 305 shown in FIG. 3. FIG. 7 illustrates a straight row of LEDs 790 as may comprise the lighting segment 790. Although fifteen LEDs 790 are illustrated in the example shown in FIG. 7, any number of LEDs 790 may be used, subject to physical space limitations and lighting intensity requirements. In addition, a set of filtering lenses 794 (which are preferably formed as a single, collective lens comprised of individual lens elements 795 connected together) may be placed over the light segment 792 as shown, such that each lens element 795 is positioned in the light path of one of the LEDs 790. The overall effect can be, for example, to focus or spread the light according to a specifically desired pattern, such as the exemplary light pattern 796 shown in FIG. 7. A variety of other light filtering techniques may also be used.

Figure 8:
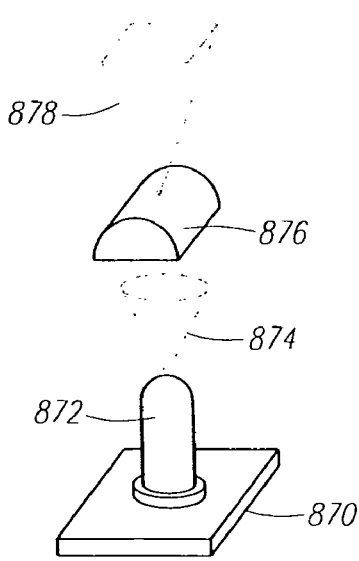
FIG. 8 is a diagram illustrating the effect of a filtering lens on an individual light element.

FIG. 8 is a diagram illustrating the effect of a filtering lens element (e.g., wave guide) 876 on an individual light element (e.g., LED) 872. As shown in FIG. 8, light 874 emanates from the LED 872 in a generally even pattern, but can be focused or otherwise filtered by the filtering lens element 876. FIG. 7 illustrates an example of collectively filtering all of the LEDs 790 of the light segment 792.

Various embodiments of lighting apparatus as described herein utilize different color lamp elements in order to achieve, for example, increased versatility or other benefits in a single lighting mechanism. Among the various embodiments described herein are lamp apparatuses utilizing both daylight and tungsten lamp elements for providing illumination in a controllable ratio. Such apparatuses may find particular advantage in film-related applications where it can be important to match the color of lighting with a selected film type, such as daylight or tungsten.

Alternatively, or in addition, lamp elements of other colorations may be utilized. It is known, for example, to use colored lamp elements such as red, green, and blue LEDs on a single lighting fixture. Selective combinations of red, green, and blue ("RGB") lamp elements can generally be used to generate virtually any desired color, at least in theory. Lighting systems that rely upon RGB lamp elements can potentially used as primary illumination devices for an image capture system, but suffer from drawbacks. One such problem is that the red, green, and blue colors generated by the light elements do not necessary mix completely. The discrete RGB lamp elements (e.g., LEDs) each project a localized "pool" of its individual primary color. This manifests as spots of color, or bands of individual or partially mixed colors. One of the only presently available solutions to correct for this problem is mixing the colors using a diffusion technique. Diffusion mixing can be accomplished by adding detractors, gratings, or white opal-appearing filters, for example. Unfortunately, these techniques end up reducing the overall output of the lighting apparatus and, more importantly, severely reduce the ability of the LEDs to "project" light in a direct fashion. Another problem for illumination systems which rely upon RGB color mixing is that not all of the LEDs are generally used at full power for most lighting situations. One or two of the LED color groups typically have to be dimmed in order for the desired color to be generated, which can further reduce the overall light output. When these factors are considered in combination, RGB based lighting apparatus may not be well suited for providing primary illumination for image capture applications (such as film).

While the foregoing discussion has principally focused on RGB based lighting apparatus, similar problems and drawbacks may be experienced when employing lamp elements in other color combinations as well.

In various embodiments as disclosed herein, a lighting apparatus is provided which utilizes two or more complementary colored lamp elements in order to achieve a variety of lighting combinations which, for example, may be particularly useful for providing illumination for film or other image capture applications. A particular example will be described with respect to a lighting apparatus using lamp elements of two different colors, herein referred to as a "bi-color" lighting apparatus. In a preferred embodiment, the bi-color lighting apparatus utilizes light elements of two different colors which (unlike red, green, and blue) are separated by a relatively small difference in their shift or color balance. When reference is made herein to light elements of two different colors, the light elements may, for example, include a first group which provide light output at a first color and a second group which provide light output at a second color, or else the light elements may all output light of a single color but selected ones of the light elements may be provided with colored LED lenses or filtering to generate the second color. In a preferred embodiment, as will be described, the bi-color lighting apparatus uses lamp elements having daylight and tungsten hues (for example, 5200° K and 3200° K color temperatures, respectively). Other bi-color combinations may also be used and, preferably, other combinations of colors which are closely in hue or otherwise complementary in nature.

One possible advantage of a bi-color lighting system as will be described in certain embodiments below is the ability to more easily blend two similar colors (e.g., 5500 K and 3200 K color temperature hues), particularly when compared to a tri-color (e.g., RGB) lighting system that relies upon opposing or widely disparate colors. The blending process of two similar colors is not nearly as apparent to the eye, and more importantly in certain applications, is a more suitable lighting process for film or video image capture devices. In contrast, attempting to blend 3 primary or highly saturated (and nearly opposite colors) is much more apparent to the eye. In nature one may visually perceive the blending of bi-colors, for example, from an open sky blue in the shade, to the warmth of the direct light at sunset. Such colors are generally similar, yet not the same. Their proportion in relation to each other is a naturally occurring gradient in most every naturally lit situation. This difference is the basis of most photographic and motion picture lighting hues. These hues give viewers clues as to time of day, location and season. Allowing separate control of the two different color lamp elements (such as LEDs), through two separate circuit/dimmer controls or otherwise, provides the ability to easily adjust (e.g., cross-fade, cross-dim, etc.) between the two colors because they do not have significant color shifts when dimmed and blend in a visually pleasing manner, allowing the type of color gradients that occur in nature. In addition, virtually all still and motion picture film presently used in the industry is either tungsten or daylight balanced, such that various combinations of daylight and tungsten (including all one color) are well matched directly to the most commonly used film stocks. These features make various of the lighting apparatus described herein particularly well suited for wide area still, video, and motion picture usage, especially as compared to RGB-based or other similar lighting apparatus. The above principles may also be extended to lighting systems using three or more lamp element colors.

Figure 33:
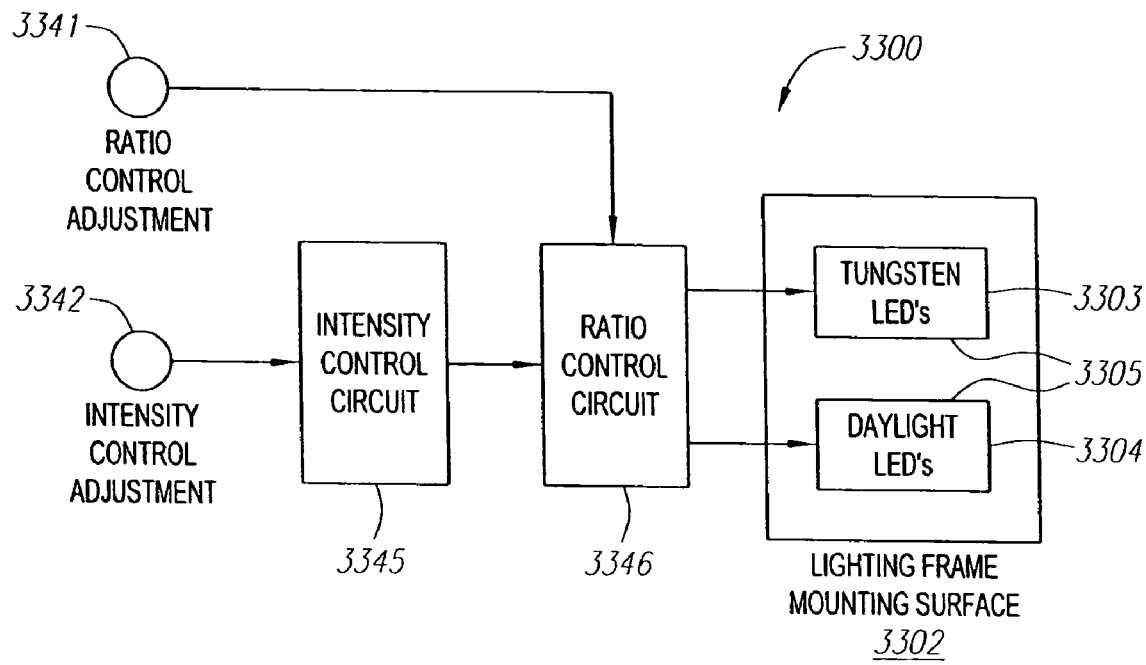
FIG. 33 is a diagram of one embodiment of a lighting effects system having at least two different lamp colors.

FIG. 33 is a diagram of one embodiment of a lighting effects system 3300 having at least two different lamp element colors. As illustrated in FIG. 33, the lighting effects system 3300 comprises a lighting frame mounting surface 3302 having a plurality of lamp elements 3305 which, in this example, include daylight LEDs 3304 and tungsten LEDs 3303, although different lamp elements and/or different colors could be chosen. The lighting effects system 3300 further comprises various control electronics for controlling the illumination provided by the lamp elements 3305. In particular, the lighting effects system 3300 comprises an intensity control adjustment 3342, an intensity control circuit 3345, a ratio control adjustment 3341, and a ratio control circuit 3346. The intensity control adjustment 3342 and ratio control adjustment 3341 may each be embodied as, e.g., manual control knobs, dials, switches, or other such means, or alternatively may be embodied as a digital keypad, a set of digital buttons, or the like. A visual display (not shown) such as an LCD display may be provided to allow the operator to view the settings of the intensity control adjustment 3342 and ratio control adjustment 3341. Alternatively, the ratio control adjustment 3341 and/or intensity control adjustment 3342 may comprise digital commands or values received from a computer or similar device.

In operation, setting the intensity control adjustment 3342 selects the illumination level for the lamp elements 3305, while setting the ratio control adjustment 3341 selects the relative intensities between, in this example, the daylight LEDs 3304 and the tungsten LEDs 3303. The intensity control circuit 3352 and ratio control circuit 3346 may comprise analog and/or digital circuitry, and the output of the ratio control circuit 3346 modifies the incoming power supply separately for the daylight LEDs 3304 and the tungsten LEDs 3303 in a manner dictated by the setting of the ratio control adjustment 3341. Accordingly, by use of the ratio control adjustment 3341, the operator may select more daylight illumination by increasing the relative intensity of the daylight LEDs 3304 or may select more tungsten illumination by increasing the relative intensity of the tungsten LEDs 3303. To increase or decrease the overall light output intensity, the operator may adjust the intensity control adjustment 3342. The lighting effects system 3300 thereby may provide different combinations of daylight/tungsten coloration to match a wide variety of settings and circumstances, with the two colors being generally complementary in nature and thus providing a balanced, well blended illumination effect.

Figure 34:
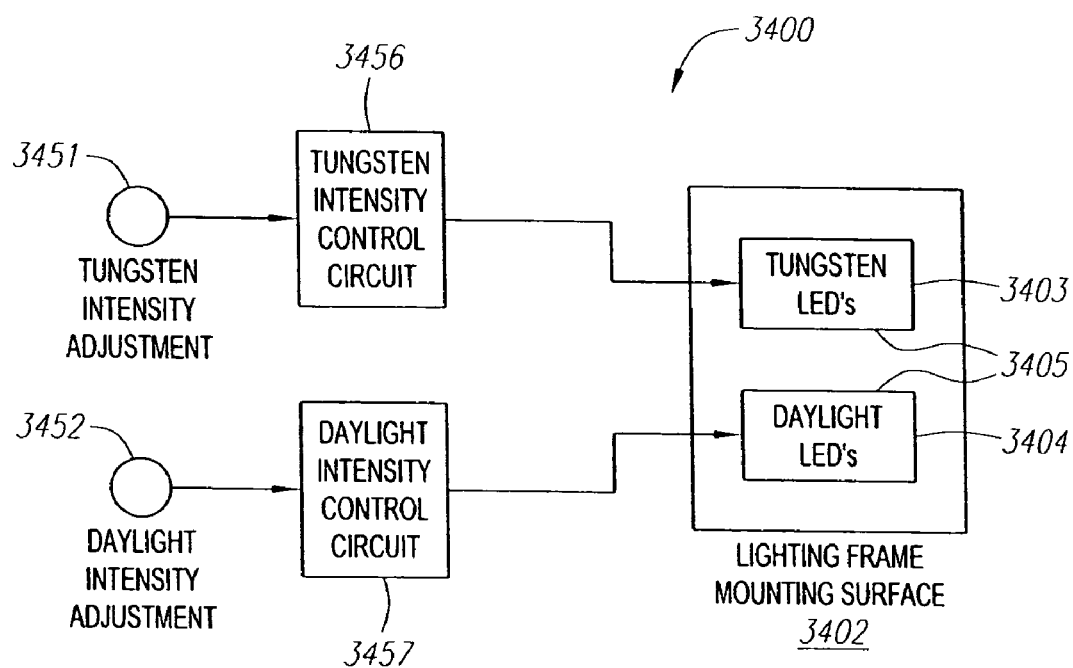
FIG. 34 is a diagram of another embodiment of a lighting effects system having at least two different lamp colors.

FIG. 34 is a diagram of another embodiment of a lighting effects system having at least two different lamp colors. As illustrated in FIG. 34, and similar to FIG. 33, the lighting effects system 3400 comprises a lighting frame mounting surface 3402 having a plurality of lamp elements 3405 which, in this example, include daylight LEDs 3404 and tungsten LEDs 3403, although different lamp elements and/or different colors could be chosen. The lighting effects system 3400, as with that of FIG. 33, further comprises various control electronics for controlling the illumination provided by the lamp elements 3405. In particular, the lighting effects system 3400 comprises individual intensity control adjustments 3451, 3452 for daylight and tungsten lamp elements (e.g., (LEDs) 3403, 3404, and individual intensity control circuits 3456, 3457 also for the daylight and tungsten LEDs 3403, 3404. The tungsten intensity control adjustment 3451 and daylight intensity control adjustment 3452 may, similar to FIG. 33, each be embodied as, e.g., manual control knobs, dials, switches, or other such means, or alternatively may be embodied as a digital keypad, a set of digital buttons, or the like. A visual display (not shown) such as an LCD display may be provided to allow the operator to view the settings of the two intensity control adjustments 3451, 3452. Alternatively, the intensity control adjustments 3451, 3452 may comprise digital commands or values received from a computer or similar device.

In operation, setting the tungsten intensity control adjustment 3451 selects the illumination level for the tungsten LEDs 3403 via the tungsten intensity control circuit 3456, and setting the daylight intensity control adjustment 3452 selects the illumination level for the daylight LEDs 3404 via the daylight intensity control circuit 3457. The relative settings of the tungsten intensity control adjustment 3451 and the daylight intensity control adjustment 3452 generally determine the relative intensities between, in this example, the daylight LEDs 3404 and the tungsten LEDs 3403. The intensity control circuits 3456, 3457 may comprise analog and/or digital circuitry, and the relative outputs of the tungsten intensity control circuit 3456 and the daylight intensity control circuit 3456 generally determine the illumination level and composition. The operator may select more daylight illumination by increasing the relative intensity of the daylight LEDs 3304 or may select more tungsten illumination by increasing the relative intensity of the tungsten LEDs 3303. The lighting effects system 3400 thereby may provide different combinations of daylight/tungsten coloration to match a wide variety of settings and circumstances, as with the FIG. 33 embodiment.

Because the two different colors of LEDs (e.g., daylight and tungsten) can be controlled separately (through common or separate circuitry), and because these particular LEDs, or other similar complementary colors, do not have significant color shifts when dimmed, it would be relatively straightforward to adjust (e.g., cross-fade, cross-dim) between the two colors and, for example, provide a variety of natural light illumination effects for various types of common film stock.

Figure 35:
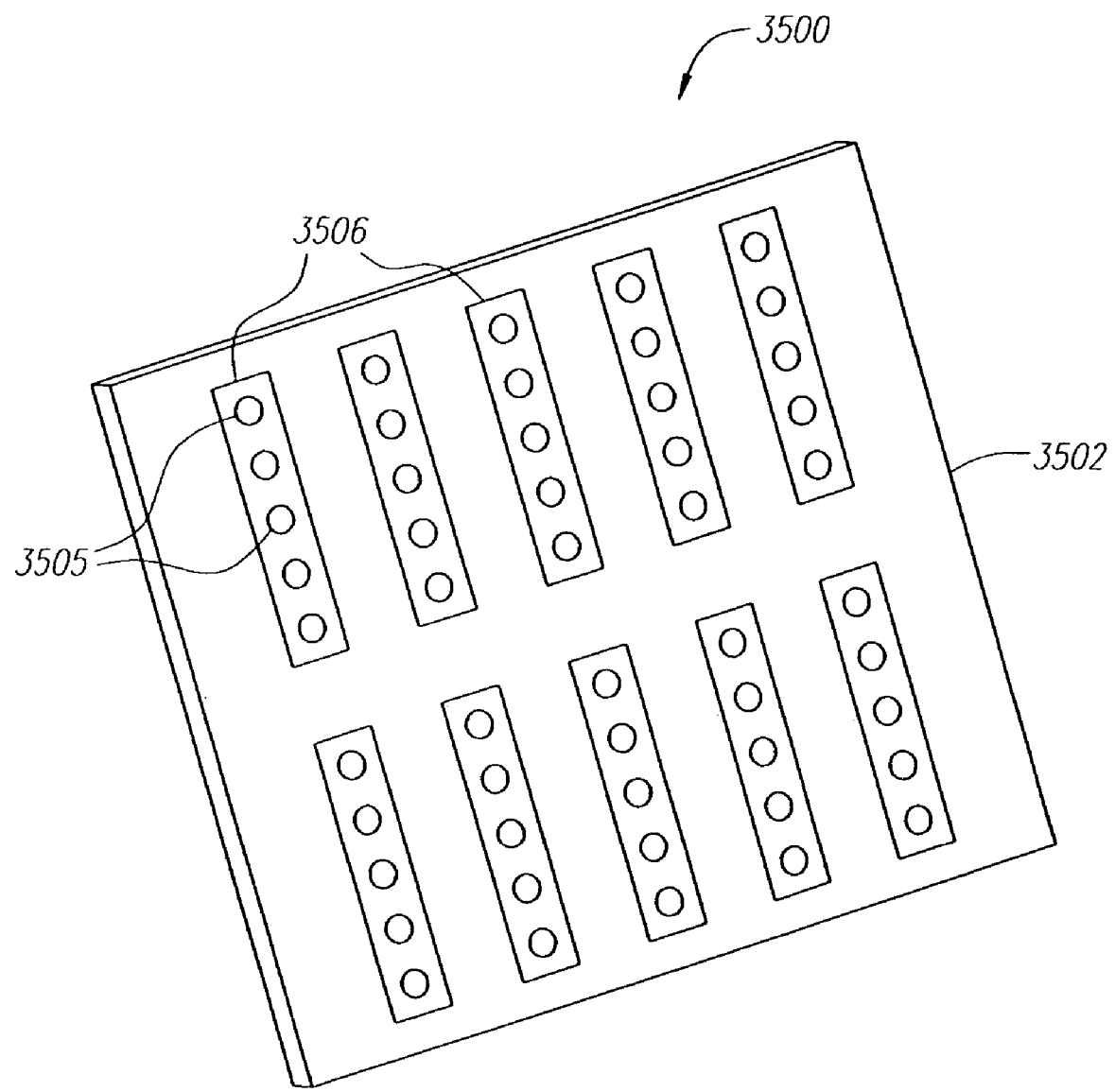
FIG. 35 is a diagram of a lighting apparatus embodied as a panel having lighting arrays mounted thereon.

The lighting apparatuses of FIGS. 33 and 34 may, if desired, be physically embodied in a manner as described elsewhere herein; for example, the lighting apparatus may be embodied with a generally ring-shaped lighting frame as illustrated in and/or described with respect to FIG. 4, or with a portable frame such as generally illustrated in and/or described with respect to FIG. 35. The principles and underlying concepts associated with the embodiments of FIGS. 33 and 34 may be extended to support more than two colors of lamp elements 3305 or 3405. Moreover, the lighting apparatuses of FIGS. 33 and 34 may utilize any number of lamp elements in a bi-color or other multi-color arrangement, in any desired pattern.

Returning now to the general diagram of a lighting effects system 201 illustrated in FIG. 2 (although the following comments will apply to various other embodiments such as the lighting frame assembly shown in FIGS. 3 and 4), the LEDs or other low power lamps 205 may be operated at a standard direct current (DC) voltage level, such as, e.g., 12 volts or 24 volts, and may be powered by a power source 210 controlled by a power controller 212 such as generally shown in FIG. 2. The power source 210 can generally comprise a standard electrical outlet (i.e., nominal 110 volt AC power line), although in various embodiments the power source 210 could also be a battery having sufficient current to drive the LEDs or other low power lamps 205. In some embodiments, the power controller 212 may be omitted, and the lighting frame 202 may be connected directly to the power source 210.

Figure 10A:
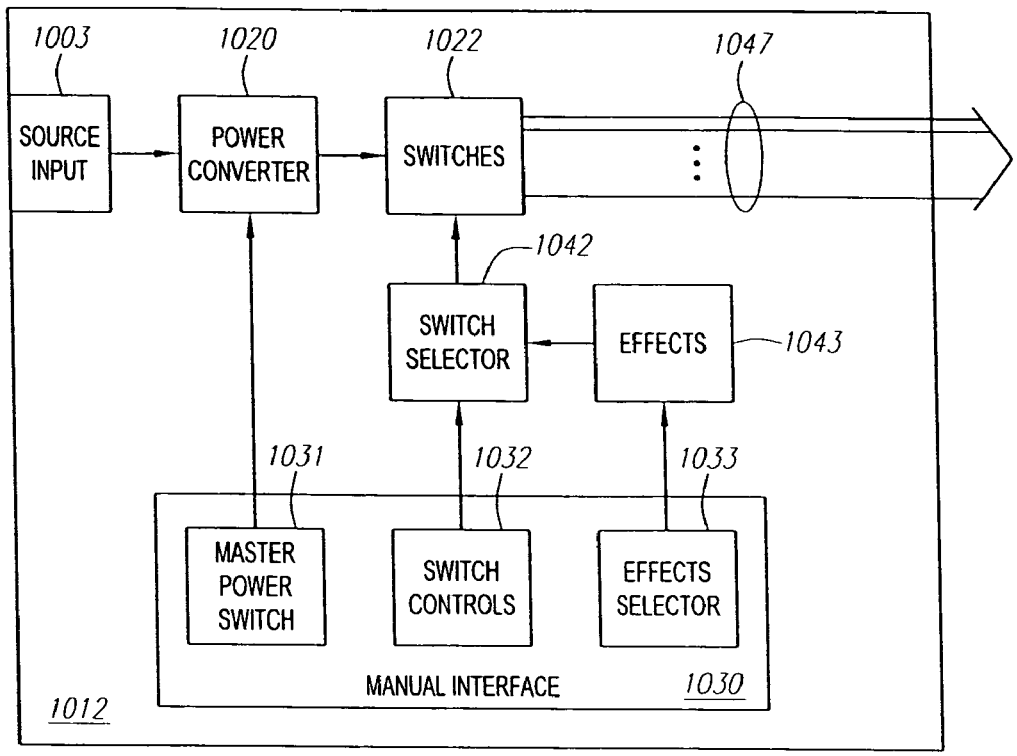
FIGS. 10A and 10B are a block diagrams of two different types of electronic controllers as may be employed, for example, in the lighting effects system illustrated in FIG. 2.
Figure 10B:
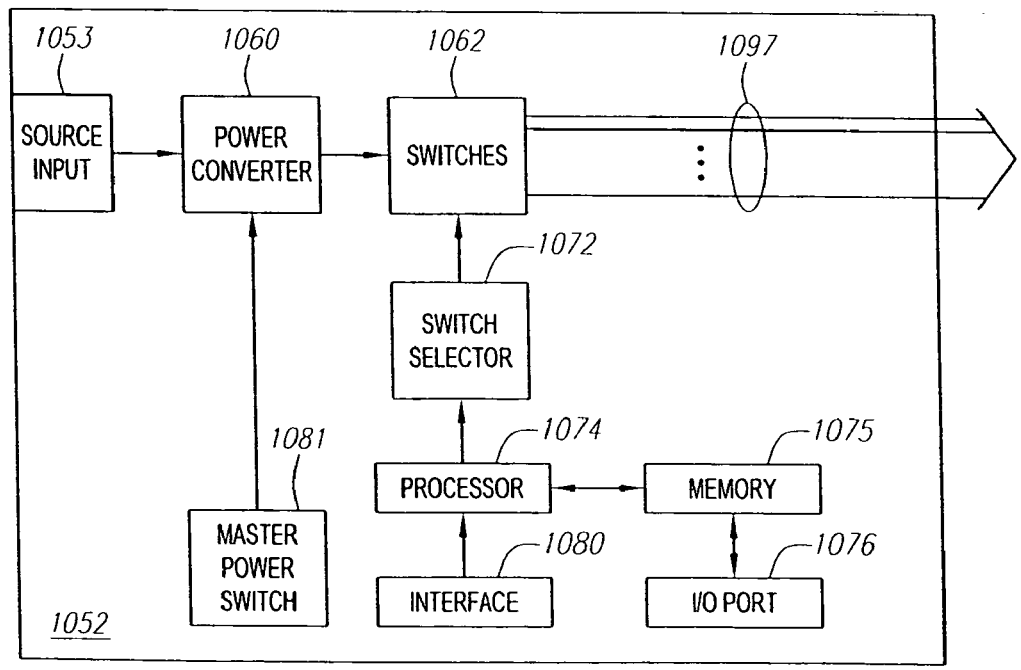

Block diagrams of two different types of power controllers 212 as may be used in various embodiments as described herein are illustrated in FIGS. 10A and 10B, respectively. With reference to FIG. 10A, a first type of power controller 1012 has an input for receiving an AC power source 1003, and outputs a plurality of power wires 1047 preferably through a cable (e.g., cable 213 shown in FIG. 2) for connection to the lighting frame 202. The power controller 1012 may further comprise a power converter 1020, the nature of which depends upon the type of power source 210. If the power source is an AC source, the power converter 1020 may comprise an AC-to-DC converter and appropriate step-down power conversion circuitry (e.g., a step-down transformer). On the other hand, if the power source is a DC source (e.g., a battery), the power converter 1020 may comprise a DC-to-DC converter, if necessary. The design and construction of power converters is well known in the field of electrical engineering, and therefore is not be described herein in detail.

The power converter 1020 is preferably connected to a plurality of switches 1022, which may be solid state devices (e.g., transistors) or analog devices (e.g., relays), each switch controlling power delivered by the power converter 1020 to one of the wires 1047 output by the power controller 1012. A switch selector 1042 controls the on/off state each switch (or group) in the set of switches 1022. A manual interface 1030 is provided to allow operation of the switches 1022 according to manual selection. The manual interface 1030 may include a master power switch 1031, switch controls 1032, and, optionally, an effects selector 1033. The switch controls 1032 may include an individual manual switch, button or other selection means for each individual switch provided in the set of switches 1022, or else may comprise a control mechanism (such as knob or reduced number of manual switches, buttons or other selection means) for selecting groups of switches 1022 according to predesignated arrangements. As but one example, assuming a light arrangement such as shown in FIG. 4, a knob provided as part of the switch controls 1032 could have a first setting to select all of the light segments 306, a second setting to select every other light segment 306, and a third setting to select every fourth light segment 306, thus providing options of 100%, 50% and 25% total light output. The switch selector 1042 would then convert each knob setting to a set of control signals to the appropriate switches 1022, which in turn would control power to the wires 1047 supplying power to the light segments 306.

As another example, the switch controls 1032 could include an individual manual switch, button or other selection means for each light segment 306 or group of light segments 306 in the lighting arrangement.

An effects generator 1043 may optionally be included in the power controller 1012, along with an effects selector 1033 which forms part of the manual interface 1030. The effects generator 1043 may provide the ability to create various lighting effects, such as, e.g., dimming, strobing, pulsation, or pattern generation. The effects selector 1043 may affect all of the switches 1022 simultaneously, or else may affect individual switches or groups of switches 1022, depending upon the desired complexity of the lighting effects. Dimming may be accomplished, for example, through a manual control knob or multi-position switch on the effects selector 1033. The dimming control may be electronically implemented, for example, in an analog fashion through a variable resistive element, or in a digital fashion by detecting the selected manual setting and converting it to selecting power setting through, e.g., selected resistive elements in a resistive ladder circuit. Where the switches 1022 are implemented, for example, as controllable variable amplifiers, the selectable resistance may be used to control the output of each amplifier and thereby the light output by the amplifier's respective light segment 306 (or group of light segments 306). In other embodiments, the dimming control may optionally be applied to the output of switches 1022. Where dimming control is applied collectively, it may be implemented by applying the selected dimming control level to the incoming signal from the power converter 1020, which is supplied to all of the switches 1022 collectively. Other variations for implementing dimming control are also possible and will be apparent to those skilled in the art of electrical engineering.

Strobing may be accomplished by generating an oscillating signal and applying it as a control signal either upstream or downstream from the switch selector 1042. The frequency of oscillation may be selectable via a manual knob, switch or other selection means as part of the effects selector 1033.

Pattern generation may be accomplished by, e.g., manual selection from a number of predefined patterns, or else through an interface allowing different pattern sequencing. Patterns may include, for example, strobing or flashing different groups of light segments 306 (given the example of FIG. 3) in a predefined sequence (which may be a pseudo-random sequence, if desired), strobing or flashing different low power lamps 305 of the light segments 306 in a predefined (or pseudo-random) sequence, gradually dimming or brightening the light segments 306 (individually, in groups, or collectively), or various combinations of these effects.

Alternatively, rather than providing a separate effects selector 1033, certain effects may be combined with the switch controls 1032. For example, a dimmer switch (knob) could be used to both activate a light segment 306, or group of light segments 306, and also control light output via rotation of the dimmer switch (knob).

FIG. 10B is a block diagram showing another example of a power controller 1052 as may be used, for example, in the lighting effects system 200 of FIG. 2 or other embodiments described herein. Like the power controller 1012 shown in FIG. 10A, the power controller 1052 shown in FIG. 10B includes a power source input 1053 connected to a power converter 1060. It further includes a set of switches 1062 receiving power from the power converter 1060, and providing power to individual wires 1097 which are conveyed, preferably by cable, to the lighting frame assembly 201 of the lighting effects system 200. The power controller 1052 also includes a switch selector 1072, which may comprise, for example, a set of registers which provide digital signals to the switches 1062 to control their on/off state.

The power controller 1052 includes a processor 1074 which may be programmed to provide various lighting effects by manipulating the switch selector 1072 (for example, by changing values in registers which control the on/off states of the switches 1062). The processor 1074 may interface with a memory 1075, which may comprise a volatile or random-access memory (RAM) portion and a non-volatile portion (which may comprise, e.g., ROM, PROM, EPROM, EEPROM, and/or flash-programmable ROM), the latter of which may contain programming instructions for causing the processor 1074 to execute various functions. The memory 1075 may be loaded through an I/O port 1076, which may include an electrical serial or parallel interface, and/or an infrared (IR) reader and/or bar code scanner for obtaining digital information according to techniques well known in the field of electrical engineering and/or electro-optics. An interface 1080 may also be provided for programming or otherwise interfacing with the processor 1074, or manually selecting various lighting effects options through selectable knobs, switches or other selection means, as generally explained previously with respect to FIG. 10A. The processor-based control system illustrated in FIG. 10B may also include other features and components which are generally present in a computer system.

In operation, the processor 1074 reads instructions from the memory 1075 and executes them in a conventional manner. The instructions will generally cause the processor 1074 to control the switch selector by, e.g., setting various digital values in registers whose outputs control the switches 1062. The programming instructions may also provide for various lighting effects, such as dimming, strobing, pulsation, or pattern generation, for example. To accomplish dimming, the processor 1074 may be programmed select binary-encoded values to load into registers of the switch selector 1072, which in turn select a variable resistance value which controls the output from each individual or group of switches 1062. To accomplish strobing, the processor 1074 may be programmed to turn the switches 1062 on and off according to a predesignated pattern dictated by the programming instructions. The processor 1074 may make use of one or more electronic timers to provide timing between on and off events. The programming instructions may provide that the switches 1062 are turned on and off according to designated sequences, thus allowing the capability of pattern generation via the processor 1074. As mentioned before, patterns may include, for example, strobing or flashing different groups of light segments 306 (given the example of FIG. 3) in a predefined (or pseudo-random) sequence, strobing or flashing different low power lamps 305 of the light segments 306 in a predefined (or pseudo-random) sequence, gradually dimming or brightening the light segments 306 (individually, in groups, or collectively), or various combinations of these effects.

Although the lighting frame 302 and lighting arrangement illustrated in FIG. 3 provides various advantages, other lighting frames and other lighting arrangements may also be used in a lighting effects system, and may be employed in connection with various techniques as described herein.

Figure 11:
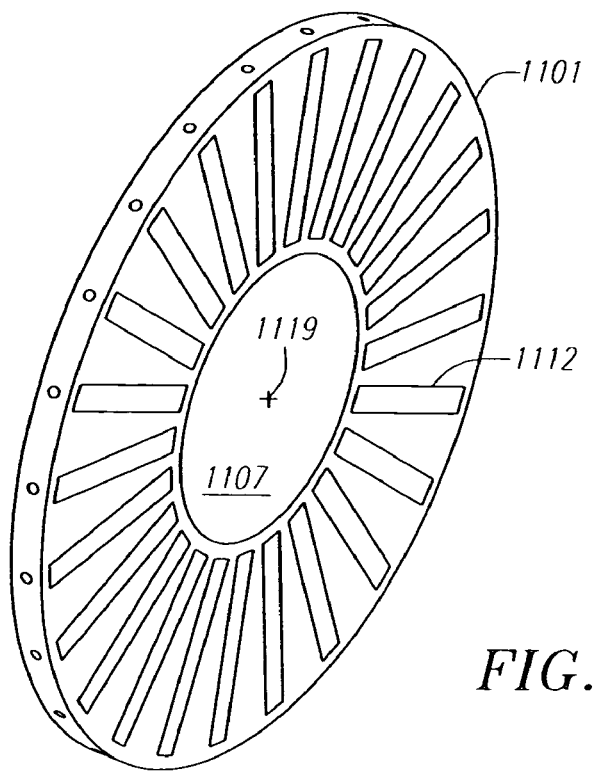
FIG. 11 is an oblique view diagram of another embodiment of a lighting assembly frame as disclosed herein.
Figure 14:
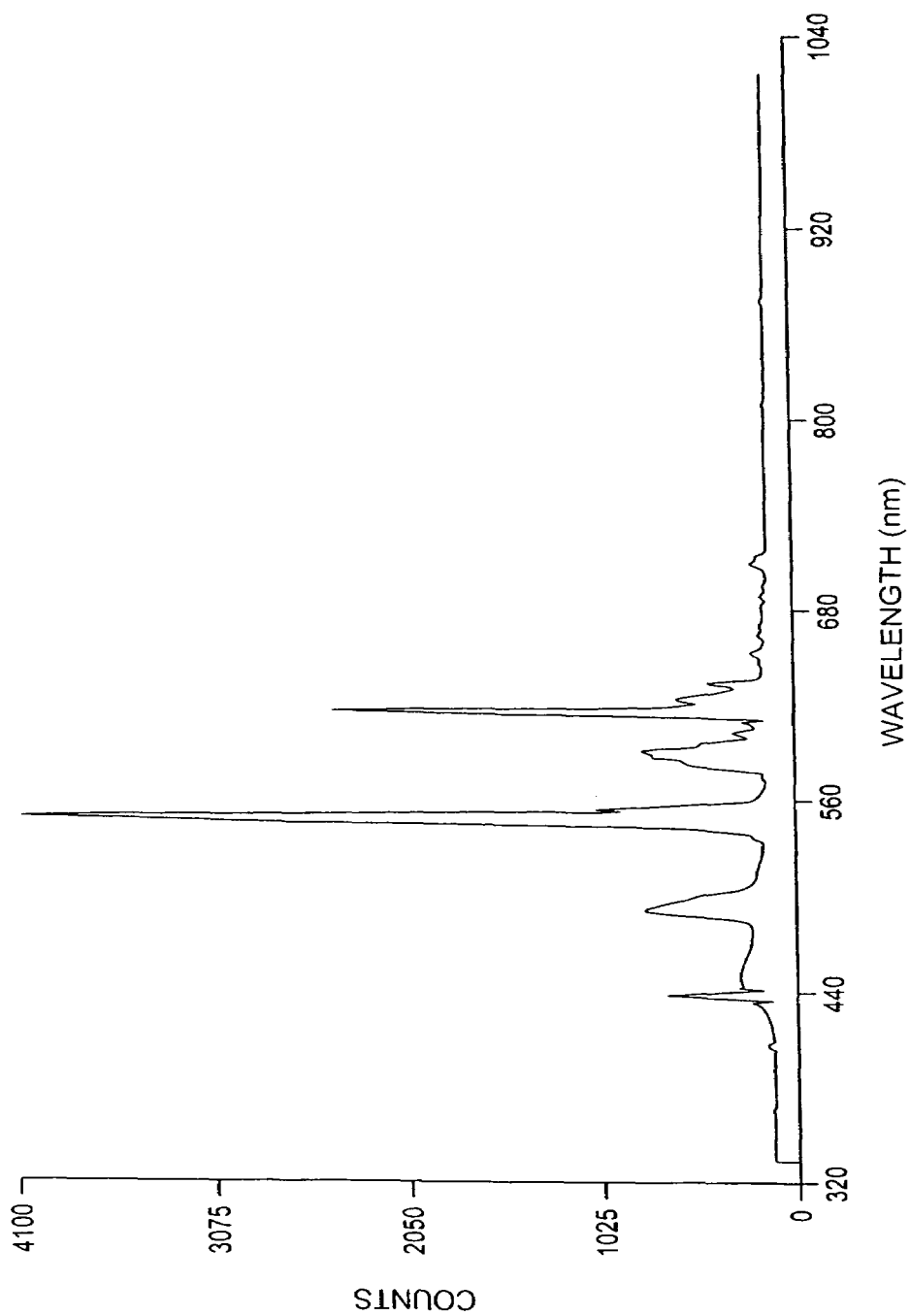
FIG. 14 is a graph illustrating a frequency distribution of light in accordance with another lighting effects system embodiment as disclosed herein.

Another embodiment of a lighting frame 1101, for example, is illustrated in FIG. 11. The lighting frame 1101 shown in FIG. 11 may be used in connection with a lighting effects system 201 such as shown in and previously described with respect to FIG. 2, and may be constructed according to general principles described previously with respect to FIGS. 15A-15C and 16A-16E. As shown in FIG. 11, a lighting frame 1101 is generally ring-shaped and has an opening 1107 through which a camera or other image capture device can view. On the lighting frame 1101 may be mounted a plurality of lamps 1112 or in some instances even a single lamp 1112. In the embodiment shown in FIG. 11, the lamps 1112 may be embodied as slim, narrow fluorescent "cold cathode" tubes with an internal phosphorous coating emitting visible light of certain wavelength (for example, a color temperature of around 3200 deg. K or 5500 deg. K, both of which temperatures are commonly used in film and photography applications). FIG. 14 is a graph illustrating an example of a spectral distribution of light (in terms of light wavelength) in accordance with such a lighting effects system. The lamps 1112 are preferably oriented as illustrated in FIG. 11—that is, in a radial pattern, emanating from a centerpoint 1119 of the opening 1107 in the middle of the lighting frame 1101. Where embodied as cold cathode tubes, the lamps 1112 may be of any suitable size, such as, e.g., 3 to 10 millimeters in diameter and 25 to 250 millimeters in length.

Figure 13:
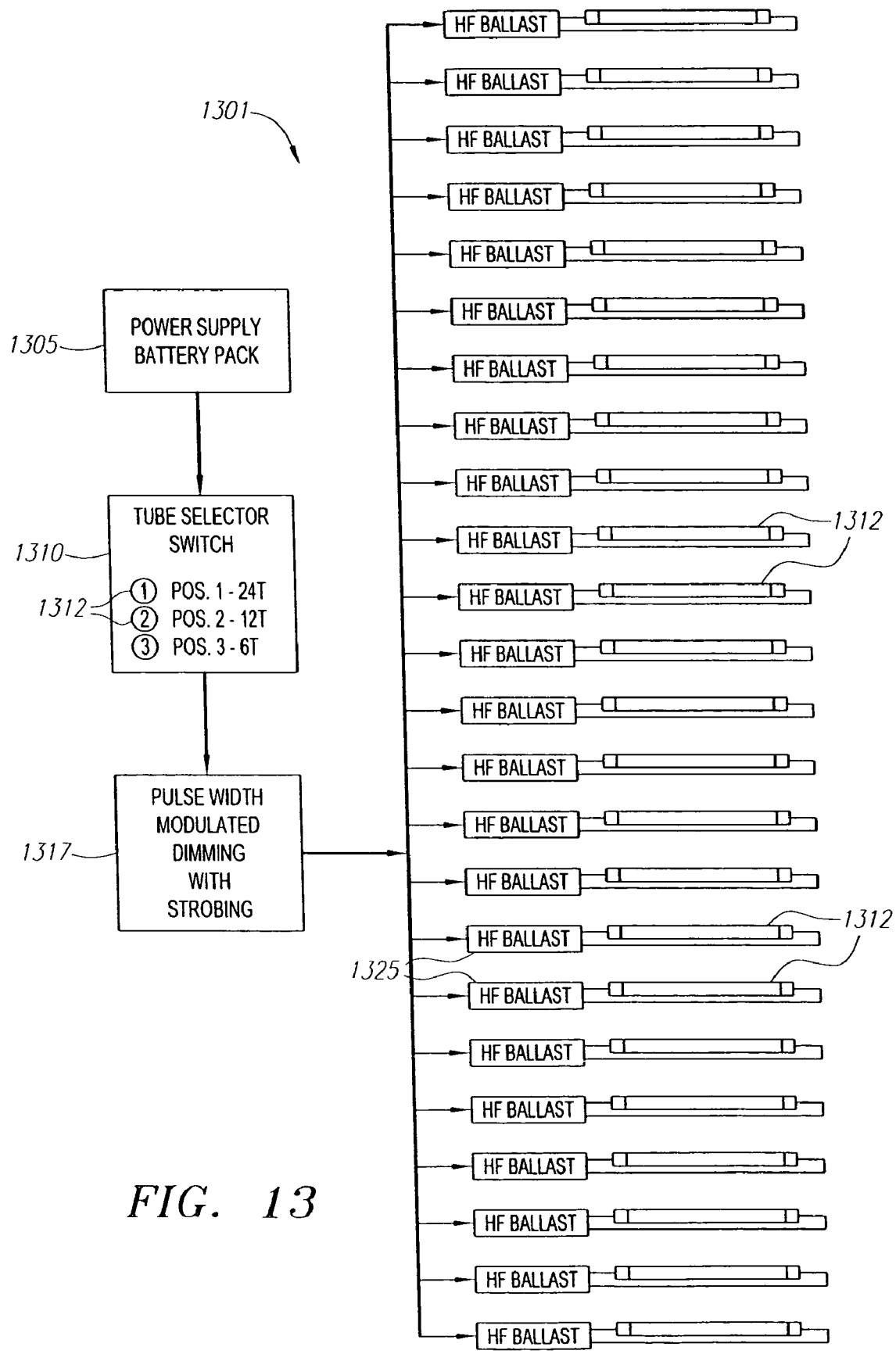
FIG. 13 is a diagram of electronic control circuitry as may be employed, for example, with the lighting effects system illustrated in FIG. 11.

Preferably, the lamps 1112 are controllable such that they can produce higher intensity or lower intensity light, and/or can be turned on or off in selected groups to adjust the overall light level provided by the lighting system. One possible means for controlling the light intensity of lamps 1112 is illustrated in FIG. 13. As shown therein, a light control system 1301 includes a selector switch 1310 which has a plurality of settings 1312, each of the settings 1312, in this example, providing a different combination of lamps 1112 (shown as elements 1322 in FIG. 13). By way of illustration, a first setting may illuminate all of the lamps 1322; a second setting may illuminate every other lamp 1322; and a third setting may illuminate every fourth lamp 1322, in each case providing a relatively even distribution of light but of a different overall intensity. For example, if 24 lamps were used, then the first setting would illuminate all 24 lamps, the second setting would illuminate 12 of the 24 lamps, and the third setting would illuminate six of the 24 lamps. The settings may correspond to any desired combination of lamps 1112. For example, each setting may be designed to control an equal number of lamps 1112, but in a different combination. The settings may be selected by any type of analog or digital input means (e.g., a manual knob, a set of switches or buttons, or a programmable interface), and any number of settings or programmable patterns may be offered.

Power for the lighting control system 1301 may be supplied by a battery 1305, which may have a voltage rating of, e.g., 12 volts. The battery 1305 may be rechargeable in nature. Alternatively, or in addition, power may be provided from an alternating current (AC) source, such as a standard 120 volt electrical outlet, connected to an AC-to-DC power converter. The output of the battery 1305 may be controlled by a dimmer switch (not shown), to allow the light intensity level of lamps 1312 to be reduced. Alternatively, or in addition, dimming and/or pulsing can be controlled through a pulse width modulation (PWM) circuit 1317. A first control means (e.g., a manual switch or knob, or programmable interface) (not shown) may be provided for dimming the lamps 1322. For example, a manual knob may control the conductance of a variable resistor, thus allowing more power or less power to reach the lamps 1322. In this way, the selected lamps 1322 may be brightened or dimmed, down to around 20% of their total light output. The PWM circuit 1317 may also, through a second control means (e.g., a manual switch or knob, or a programmable interface) allow pulsing of the light (i.e., a strobing effect) by adjustment of a pulse width modulation frequency. For example, a manual knob may control a variable resistive element, which in turn controls the width of pulses being generated by the PWM circuit 1317. Various techniques for generating pulses of different widths using a variable resistive element to control the selection of the width are well known in the electrical arts.

Energy is preferably delivered to the various lamps 1322 in FIG. 13 through a plurality of high frequency (HF) ballasts 1325, which are capable of converting low DC voltage of the battery 1305 to high DC voltage (e.g., 800 to 1500 volts) for starting the lamp, and mid-level voltage (e.g., 170 to 250 volts) for sustaining lamp operation. Other techniques may also be used to deliver energy to the lamps 1322.

Figure 46:
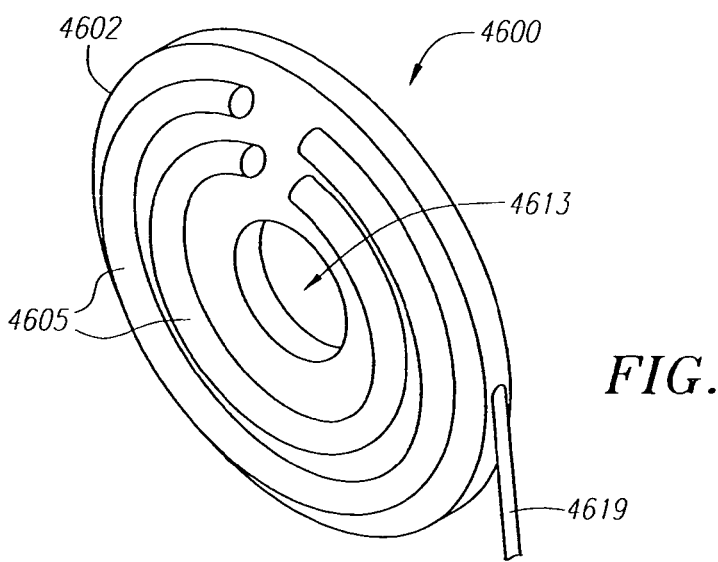
FIG. 46 is a diagram of a ring-shaped lighting frame assembly with multiple fluorescent lights.
Figure 53A:
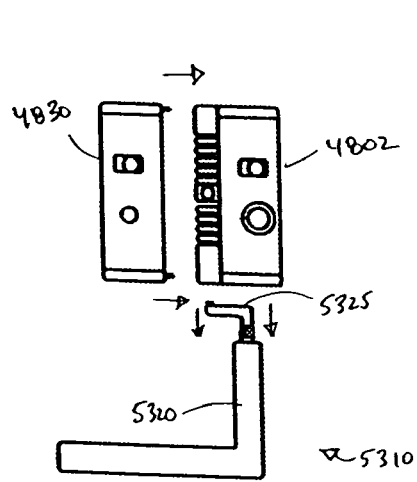
FIGS. 53A through 53D are diagrams showing different views of an integrated LED light panel and battery apparatus mounted on a stand.
Figure 53B:
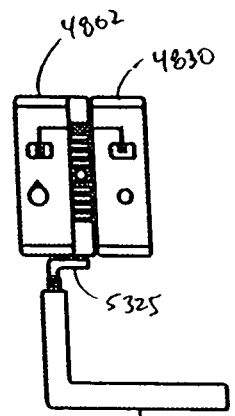
Figure 53C:
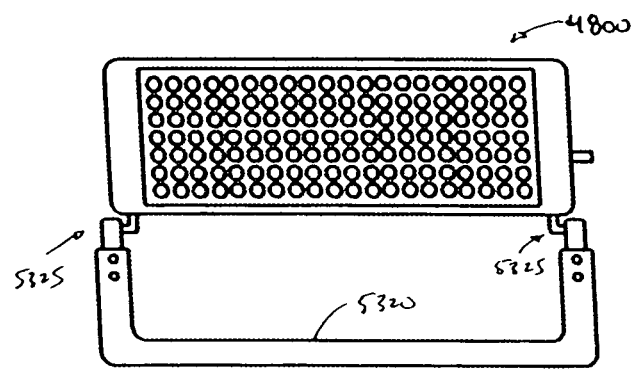
Figure 53D:
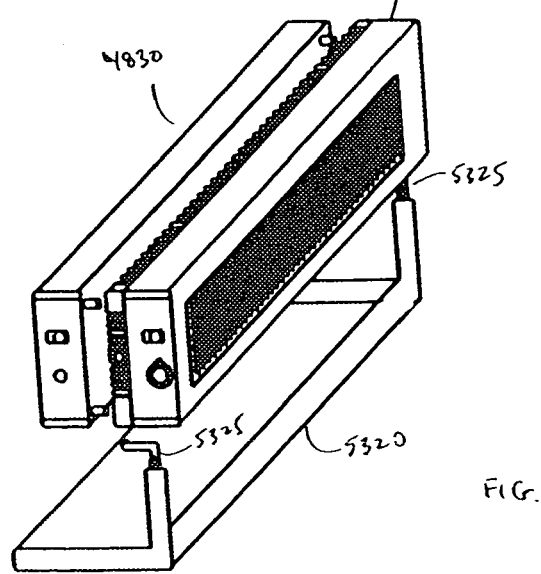

While shown in a radial pattern in FIG. 13, the lamps 1322 (e.g., fluorescent tubes) may also be arranged in other patterns, such as patterns similar to those depicted, for example, in FIGS. 30A, 30B and 30C. FIG. 46 illustrates one example of a pattern of arranging fluorescent tubes (in this case, circular fluorescent tubes) on a lighting frame 4602. In FIG. 46, a lighting assembly 4600 includes a ring-shaped lighting frame 4602 with two fluorescent lamps 4605, an inner (small circumference) fluorescent lamp and an outer (larger circumference) fluorescent lamp. Additional fluorescent lamps (circular or otherwise) may also be added to the lighting frame 4202, or else a single fluorescent lamp may in some cases be utilized. The lighting frame 4602 may, as previously described, be constructed of a lightweight, durable material, and it may have a bracket or other mounting mechanism for mounting to a camera frame or lens (with the camera lens preferably viewing through the generally central hole 4613 in the lighting frame 4602), and/or a bracket or other mounting mechanism for allowing the lighting frame 4602 to be connected to a yoke or stand (such as conceptually represented by arm 4619 in FIG. 46). Energy for the fluorescent lamps 4605 may be provided as previously described herein, such that the lighting assembly 4600 can provide continuous light or, if applicable, various lighting effects.

Figure 12:
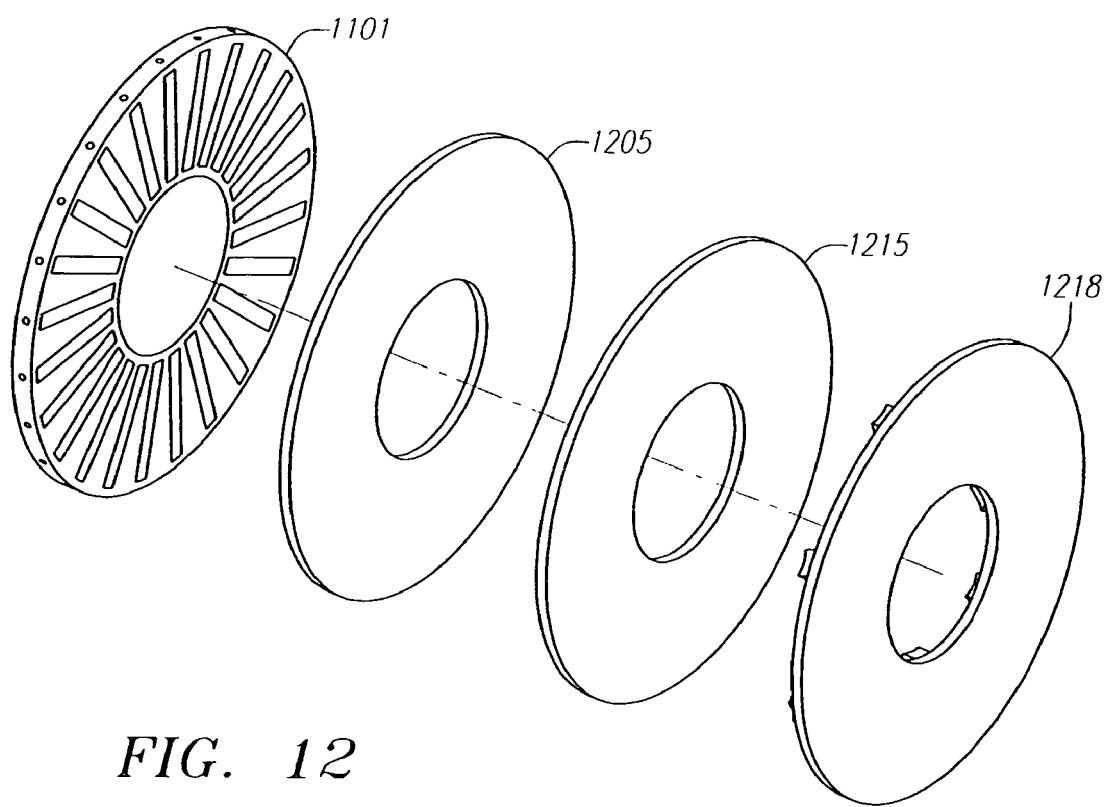
FIG. 12 is a diagram illustrating various options and accessories as may be used in connection with the lighting assembly frame depicted in FIG. 11.

FIG. 12 is a diagram illustrating various options and accessories as may be used in connection with the lighting assembly frame depicted in FIG. 11. As shown in FIG. 12, the lighting frame 1101 may be augmented with a diffusion filter 1205 and/or a color filter 1215, which may, if desired, be secured into place through a cover 1218 (e.g., a clear plastic cover) which locks or snaps onto the lighting frame 1101. Similar accessories may be utilized, for example, in connection with the lighting frame 302 illustrated in FIGS. 3 and 4. Illustrations of filtering techniques, through the use of waveguides and other means, are described, for example, in U.S. Pat. Nos. 6,272,269 and 6,270,244, both of which are incorporated by reference herein in their entirety.

Figure 44:
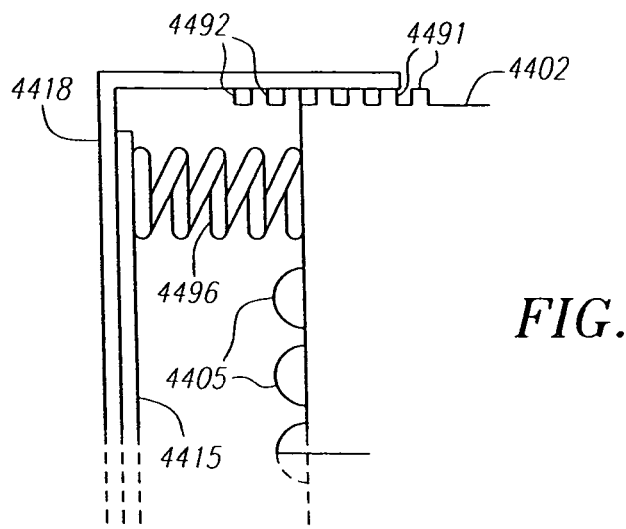
FIG. 44 is a cross-sectional diagram illustrating an adjustable lens cover of the type shown in FIG. 12, and an optional mechanism for securing interiorly positioned color gel(s) and/or lens filter(s).

FIG. 44 illustrates, among other things, an adjustable lens cover 4418 similar in general nature to the cover 1218 shown in FIG. 12. In the particular example illustrated in FIG. 44, threading 4491 is provided on the outer surface of the lighting frame 4402 (which may be generally analogous to lighting frame 1101 shown in FIG. 12), and matching threading 4492 is provided on the interior surface of the adjustable lens cover 4418. The adjustable lens cover 4418 may be formed of clear plastic or a similar material and may be constructed with lenslike attributes (e.g., focal, diffusion) and/or may also be colorized if desired. The adjustable lens cover 4418 is secured to the lighting frame 4402 by twisting the cover 4418 onto the lighting frame 4402 in a screw-like fashion, thereby causing the threadings 4491, 4492 to interlock. By the number of rotations of the lens cover 4418 with respect to the lighting frame 4402, the distance of the "top" surface of the lens cover 4418 to the lighting elements 4405 on the lighting frame 4402 may be varied, thus allowing different lens effects. As further illustrated in FIG. 44, one or more coiled springs 4492 or other similar elements may be provided atop the lighting frame 4402, to secure one or more color gels 4415 or other filtering objects against the inner "top" surface of the adjustable lens frame 4418, when such objects are placed within the cover 4418 in the manner shown, for example, in FIG. 12.

As an alternative to the complementary threading provided on the lens cover 4418 and the lighting frame 4402, other adjustment means may be provided. For example, the lens cover 4418 may be secured to the lighting frame 4402 by one or more adjustable screws which dictate the distance of the "top" surface of the lens cover 4418 from the lighting frame 4402. Also, slide-and-lock mechanisms may be used as well.

It will be appreciated that, in various embodiments, a flexible, lightweight and functional lighting effects system is provided, whereby relatively uniform light may be used in illumination of a subject or area. The lighting effects system may, in various embodiments, allow a lighting frame to be secured to a camera or other image capture device, so as to permit the lighting system to be mobile and move in tandem with the camera or other image capture device, if desired. Also, in various embodiments, the lighting effects system may provide a variety of lighting patterns, including programmable patterns by which individual or groups of lights can be controlled for different lighting effects. The lighting frame may, in certain instances, be formed in multiple sections and hinged to allow the lighting frame to fold, or else snapped apart section by section, for ease of transport.

In various alternative embodiments, the lighting frame need not be ring-shaped in nature, as shown in FIGS. 3 and 4, for example, but could have other shapes as well. For example, the lighting frame may be square, hexagonal, octagonal, or other polygonal, or could, for instance, have a partially polygonal shape. Preferably, the lighting frame is relatively thin, as compared to its overall size, although it need not be. Also, the lighting frame preferably has a hole generally centered therein to allow a camera or other image capture device to view through the frame, although in some embodiments a viewing hole may not be present. The exterior portion of the lighting frame, or at least the exterior portion thereof, is preferably made of a lightweight, durable material such as plastic and/or lightweight metal (e.g., aluminum), optionally anodized, although in various embodiments it can be made of other materials as well, including any type of metal, wood, plastic, or combination thereof. The interior lighting frame portion may advantageously comprise a printed circuit board.

Other variations may pertain to the manner of attaching the lighting frame to a camera or other image capture device. Rather than using a single mounting bracket or assembly, for example, multiple mounting brackets or assemblies may be used. Also, the mounting bracket or assembly may be permanently attached or affixed to the lighting frame, and may be, for example, retractable or foldable for convenience of transportation. The lighting frame may attach either to the camera body or to the lens portion of the camera. The lighting frame may attach to the camera lens through any of a variety of means, such as by engaging an outer camera lens threading through a threading on the interior circular hole of the lighting frame, engaging an inner camera lens threading by providing a complementary threaded extension for that purpose, by a strap means to secure the lighting frame to the camera and/or stand, or by a "hose-clamp" type strap which grips the outer cylinder of the camera lens. Also, rather than attaching to the camera, the lighting frame may be portable, and may be outfitted with handles for lighting crew to manually carry or hold the lighting frame, or may be adapted to attach to a stand or fixture for providing stationary illumination. The lighting frame may also be adapted to attach to a machine arm or other contrivance for allowing the lighting effects system to be moved as needed for filming or other desired purposes.

Further embodiments, variations, and modifications pertain to the type of lamp elements that may be utilized in a lighting effects system and/or the manner of constructing a lighting frame particularly well suited for placing numerous lamp elements thereon. One method of construction involves the use of surface mount LEDs of the type illustrated, for example, in FIG. 31. As shown therein, a surface mount LED 3100 comprises a body 3104 having a thermal shoe on the bottom surface 3103 and a pair of soldering tabs 3102 for securing the surface mount LED 3100 to a circuit board (e.g., an aluminum core circuit board) or other suitable surface. A lens 3101 atop the body 3104 directs the light generated by the surface mount LED 3100 outwards. While the body 3104 and the lens 3101 of the surface mount LED 3100 radiate heat, the soldering tabs 3102 as well as the thermal shoe on the bottom surface 3103 assist in conducting heat to the mounting surface (e.g., circuit board) and thus may provide advantageous heat dissipation capabilities, particularly as compared to non-surface mount LEDs which tend to dissipate heat typically through their leads. Use of surface mount LEDs provides a larger and more direct heat conduction path to the mounting surface (e.g., circuit board), and may also provide advantages in ease of fabrication and improved durability.

In various embodiments as described herein, the lamp elements used in a lighting effects system or lighting apparatus may comprise high output semiconductor lights such as, for example, high output LEDs. Such high output LEDs are available from Lumileds Lighting, LLC of San Jose, Calif. under the product brand name Luxeon™. High output LEDs are presently available in white as well as colors such as green, blue, red, amber, and cyan, are fully dimmable, and generally operate at about one to several Watts (e.g., 5 Watts), outputting in certain devices approximately 24 lumens per Watt. The high output LEDs may be mounted upon, e.g., a metal printed circuit board (PCB) such as an aluminum core circuit board. High output LEDs may be used in connection with any of the embodiments previously described herein, and may provide advantages of increased lighting output with fewer lamp elements and, hence, reduced cost of construction in certain cases. However, the driving circuitry for the high output LEDs would generally need to have a higher output rating than the circuitry used for lower power LEDs.

Figure 36A:
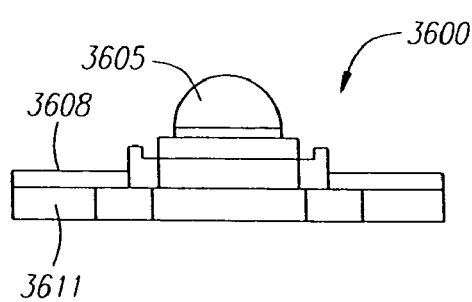
FIGS. 36A and 36B are side-view diagrams of two different types of surface-mount LEDs.
Figure 36B:
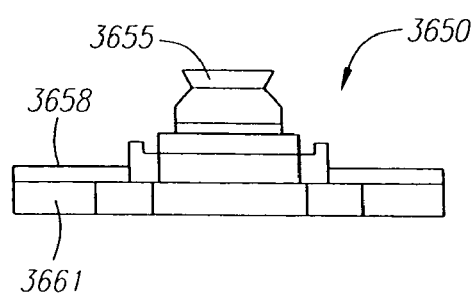
Figure 36C:
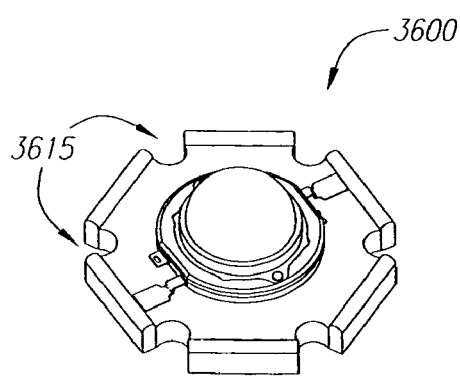
FIG. 36C is an oblique image of the LED shown in FIG. 36A.

FIGS. 36A and 36B are diagrams of two other types of high output surface-mount LEDs, both of which are commercially available from Lumileds Lighting, LLC under the brand name Luxeon™. In FIG. 36A, the surface mount LED 3600 comprises an aluminum bottom plate 3611 atop of which is a printed circuit board (PCB) 3608 (e.g., a fiberglass board such as a standard FR4 board). A high output light source 3605 is mounted atop the PCB 3608. The aluminum bottom plate 3611 acts as a thermal conveyance which assists in conduction of heat to a mounting surface (e.g., circuit board) for thermal dissipation. FIG. 36C shows an oblique view of the surface mount LED 3600 shown in FIG. 36A, illustrating, in this example, the relatively wide bottom plate 3611 relative to the size of the light source 3605. The bottom plate 3611 and PCB 3608 preferably have notches 3615 through which screws may be placed to secure the surface mount LED 3600 to a mounting surface. FIG. 36B illustrates another surface mount LED 3650 that is similar in certain respects to the surface mount LED 3650 shown in FIG. 36A, with an aluminum bottom plate 3661 and printed circuit board 3658 (e.g., fiberglass board such as a standard FR4 board). However, in contrast to the surface mount LED 3600 shown in FIG. 36A, which is Lambertian (domed) in nature, the high output light source 3655 of surface mount LED 3650 is a side emitting light source. Other alternative types of surface mount LEDs, with similar or alternative mounting mechanisms, may also be utilized in various embodiments described herein.

Figure 37A:
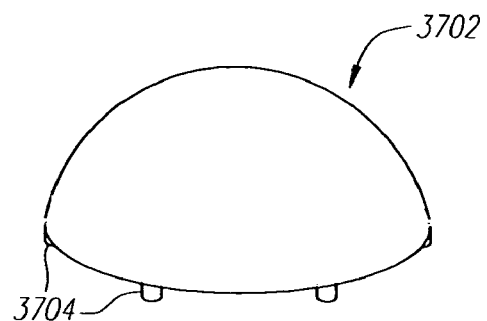
FIG. 37A is a diagram of one embodiment of a lens cap for an LED.
Figure 37B:
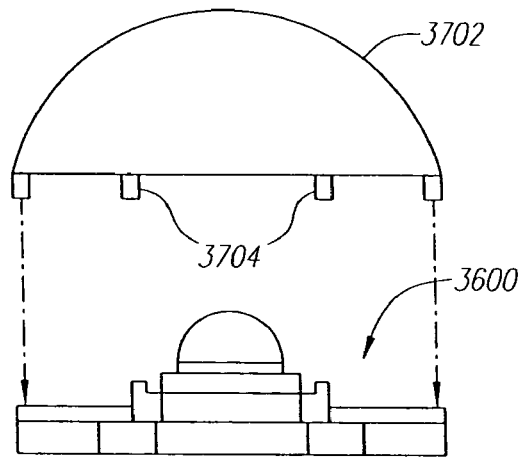
FIGS. 37B and 37C are diagrams illustrating placement of the lens cap with respect to a particular type of LED.
Figure 37C:
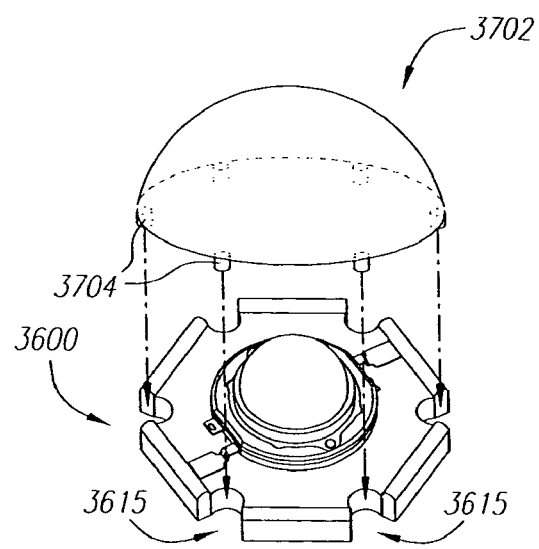

FIG. 37A is a diagram of one embodiment of a lens cap 3702 for a single LED. The lens cap 3702 may act as a focusing lens to direct the light output from an LED in a forward (or other) direction. FIG. 37B and 37C illustrate placement of the lens cap 3702 with respect to the surface mount LED 3600 of FIG. 36A. As illustrated, the protruding tabs 3704 on the base of the lens cap 3702 may be used to lock the lens cap 3702 into place by snugly residing in the holes 3615 of the base of the surface mount LED 3600. A similar type of lens cap may be used for other types of LEDs. While six tabs 3704 are shown in the example of FIGS. 37A-37C, the number of tabs, or the nature and/or shape of other alternative securing means, may depend upon the particular size, shape, and configuration of the LED base. Also, fewer tabs may be used if there is a desire leave some holes 3615 in the LED base available for receiving securing screws to hold the LED to a mounting surface. In such a case, the lens cap 3702 may be indented or otherwise shaped to allow relatively convenient access to the holes 3615 needed for attaching screws. The lens cap 3702 is illustrated as domed, but may be of any suitable shape for focusing light in a desired manner.

The lens cap 3702 may have an advantage in providing local effects on an individual basis for LEDs. Also, where different color lighting elements are placed within a single high output LED 3600, the lens cap 3702 may be configured to provide local blending of the different colors according to a desired mix.

Figure 37D:
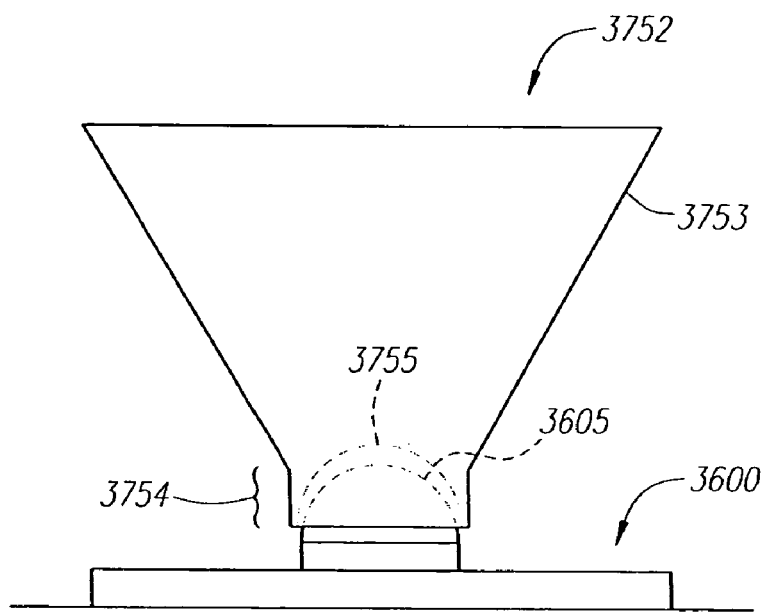
FIGS. 37D and 37E are diagrams illustrating another embodiment of a lens cap for an LED, and placement thereof with respect to a particular type of LED.
Figure 37E:
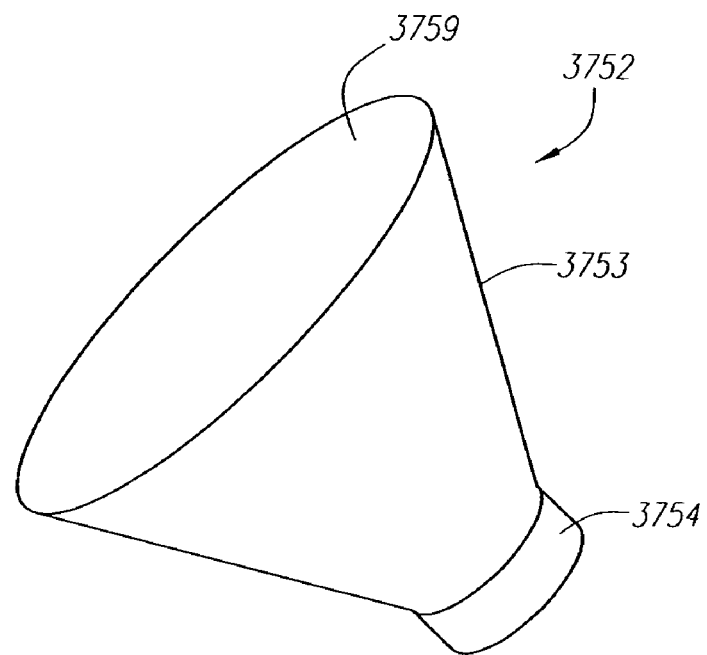

FIGS. 37D and 37E are diagrams illustrating another embodiment of a lens cap 3752 for an LED, and placement thereof with respect to a particular type of LED 3600. With reference first to FIG. 37E, an illustrated embodiment of lens cap 3752 is shown from an oblique viewpoint in a generally funnel shape, with a cone-like or tapered portion 3753 and a short cylindrical portion 3754 at the apex (i.e., narrow end) of the tapered portion 3753. The lens cap 3752, including the cone-like tapered portion 3753, is preferably transmissive in nature such that light travels through it substantially unimpeded. FIG. 37D, which is a side profile diagram, illustrates preferred placement of the lens cap 3752 with respect to a particular type of LED (that is, the LED 3600 illustrated in FIGS. 36A and 36C). The cylindrical portion 3754 of the lens cap 3752 rests atop the LED 3600, with the tapered portion 3753 gradually widening away from the LED 3600. A concave recess 3755 within the cylindrical portion 3754 may be provided, and is adapted to receive the curved lens 3605 of the LED 3600, as illustrated in FIG. 36D. Light from the LED 3600 enters through the short cylindrical portion 3754 of the lens cap 3752, and exits through the top surface 3759 (see FIG. 37E) thereof. The particular shape of the lens cap 3752 in FIGS. 37D and 37E serves to collect light from the LED 3600 that would otherwise emanate omnidirectionally, and focus the light in a generally conical beam emanating from the top of the lens cap 3752, thus providing a light source with greater directivity.

The lens cap 3752 may be formed of, e.g., glass, plastic, or other suitable material or compound/layers of material, with any desired refractive index(es). One type of lens cap is commercially available, for example, from Lumileds Lighting, LLC.

Figure 31:
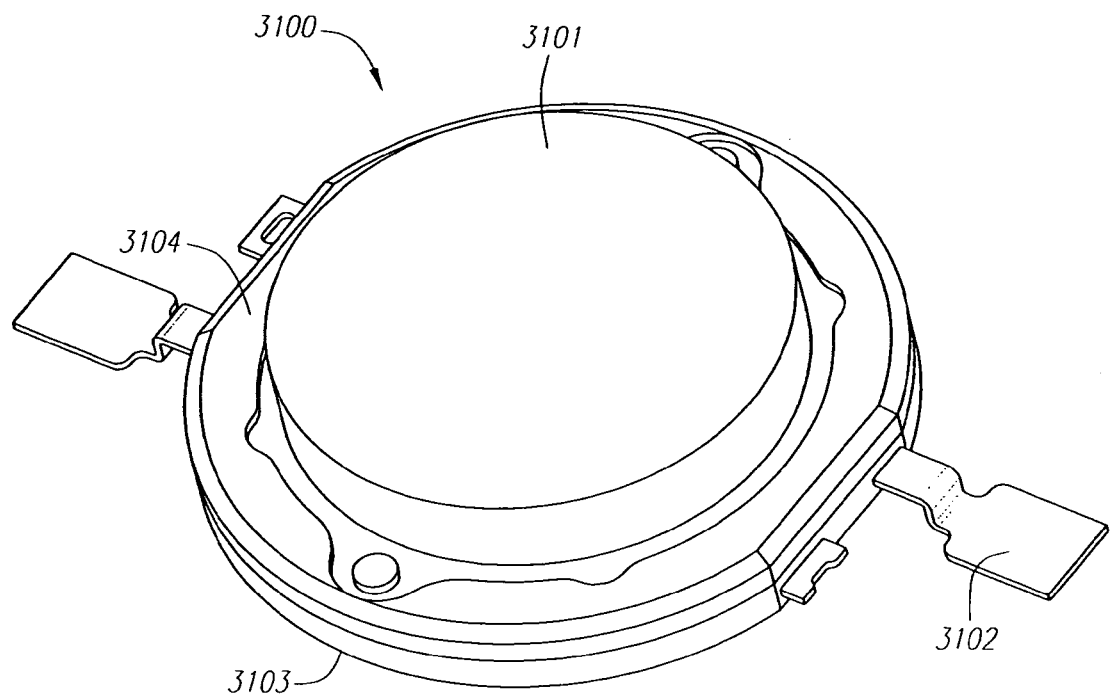
FIG. 31 is a diagrams of an LED suitable for surface mounting.
Figure 32:
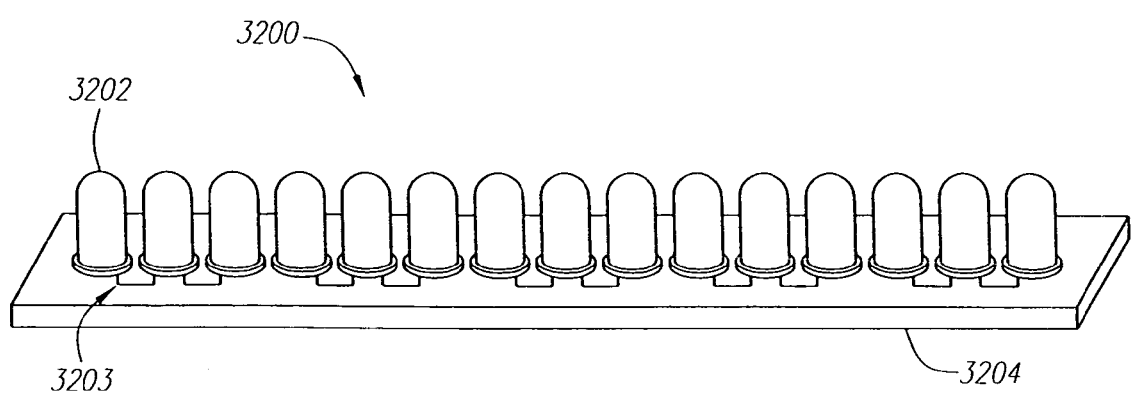
FIG. 32 is a diagram of a lighting array mounted atop a circuit board.

FIG. 32 is a generalized diagram of an array of surface mount LEDs 3202 (of the type such as shown, for example, in FIG. 31, 36A, or 36B) mounted atop a circuit board 3204, as may be used in various embodiments as described herein (for example, the lighting effects system illustrated in FIG. 4). The circuit board 3204 may comprise rigid fiberglass or phenolic planes with electrically conductive tracks etched on them, and/or may be metallic in nature (such as aluminum core PCBs). The term "circuit board" as used herein is meant to encompass the foregoing structures as well as various other types mounting apparatus, including flexible electrical interconnects such as conductive membranes made on thin Mylar, silicone, or other similar materials. The surface mount LEDs 3202 may be connected together in series and/or in parallel by electrical traces 3203 on the circuit board 3200. While the LEDs 3202 are illustrated in FIG. 32 as being in a straight line array, other LED patterns may also be utilized. As previously mentioned, the soldering tabs and thermal shoe on the bottom each of the surface mount LEDs 3202 generally assist in conducting heat to the circuit board 3204, thus providing advantageous heat dissipation capabilities.

FIG. 35 is a diagram of a lighting apparatus 3500 embodied as a panel 3502 having lighting arrays mounted thereon or therewith, in accordance with various embodiments as described herein. As illustrated in FIG. 35, the lighting apparatus 3500 comprises a panel 3502 which is preferably flat and provides suitable surface area for mounting a set of lamp elements, such as lamp elements 3505 on circuit board assemblies 3506. The circuit board assemblies 3506 may generally be constructed in accordance with the principles described with respect to FIG. 32 above, and the lamp elements 3505 may comprise, for example, surface mount LEDs such as illustrated in FIG. 31. In the example shown, the lamp elements 3505 are generally arranged in series in a straight array formation, but the lamp elements 3505 may be arranged in other patterns as well. Likewise, the circuit board assemblies 3606 are illustrated in FIG. 35 as being arranged in a symmetrical pattern of rows thus providing relatively even illumination in many scenarios, the circuit board assemblies 360 may be arranged in other symmetrical or non-symmetrical patterns, and may be grouped or clustered as well. Furthermore, while the panel 3202 is shown in FIG. 35 as being generally rectangular in shape, the panel 3202 may take any suitable shape, including, for example, hexagonal, octagonal, or other polygonal or semi-polygonal, or round, oval, or ring-shaped (such as illustrated in FIG. 4 for example).

Surface mount technology for the LEDs used in various embodiments as disclosed herein may simplify replacement of the LEDs (allowing "drop in" replacements for example) or else may allow easy replacement of an entire row or array of LEDs should it be desired to change the color of a particular group of LEDs. Also, the LED arrays may be constructed such that the LEDs have screw-in bases or other similar physical attachment means, such that the LEDs can be easily removed and replaced.

Various controls, power supply, and camera mounting means are not shown in FIG. 35, but may be employed in a manner similar to the various other embodiments as described herein. It will be appreciated that the control electronics, power supply, and other electrical components may be part of the panel 3202 or else may be separate therefrom. Furthermore, the lighting apparatus described with respect to FIG. 35 may be embodied as a bi-color or other multi-color lighting system, as described with respect to, e.g., FIGS. 33 and 34.

The lighting apparatus 3500 of FIG. 35 or other various lighting effects systems and apparatuses as described herein may include means for directing light at different angles. Such means may include, for example, pivotable light arrays which physically alter the angle of the lamp elements with respect to the frame (e.g., mounting) surface. The pivoting light arrays may be either manually controllable (via, e.g., a rotatable knob or crank) or electronically controllable through standard electronic input means (e.g., buttons or control knob). Such means may alternatively include adjustable lens elements (either individual or collective for an entire lens array or other group of lamp elements) for redirecting the illumination in a desired direction. Such means may further alternatively include, for example, groups of lamp elements wherein each group has a predetermined angle or range of angles with respect to the frame surface. Each group of lamp elements may be separately controllable, so that different groups can be separately activated or de-activated, or separately intensified or dimmed. With the ability to vary the angle of the lamp elements, the lighting effects system may, for example, allow the abrupt or gradual switching from one angle of illumination to another, or from a more targeted to a more dispersive illumination pattern (or vice versa).

Figure 38A:
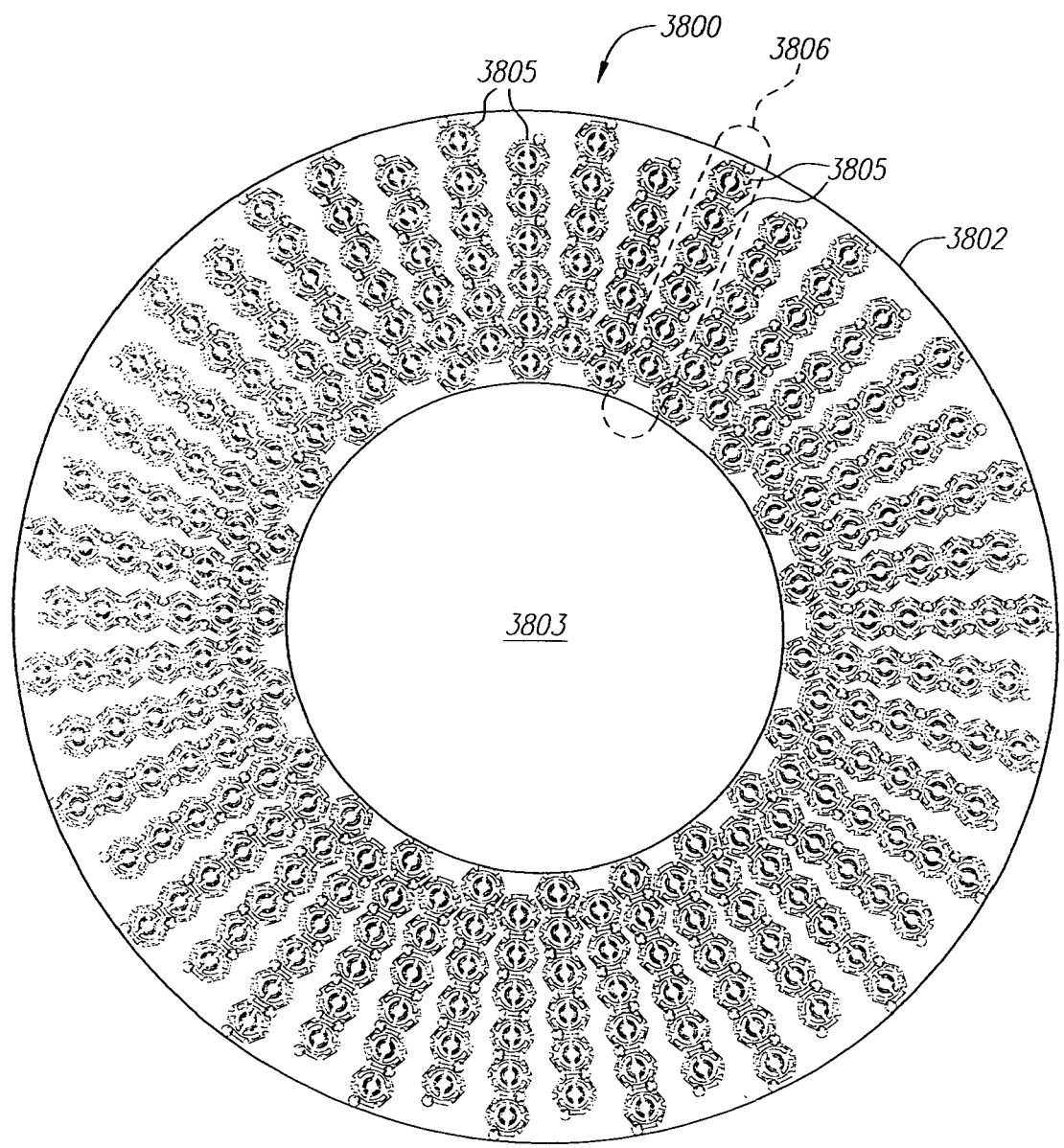
FIG. 38A is a front view diagram of a ring-shaped lighting frame assembly with surface-mount LEDs arranged on the lighting frame.
Figures 38B, 39:
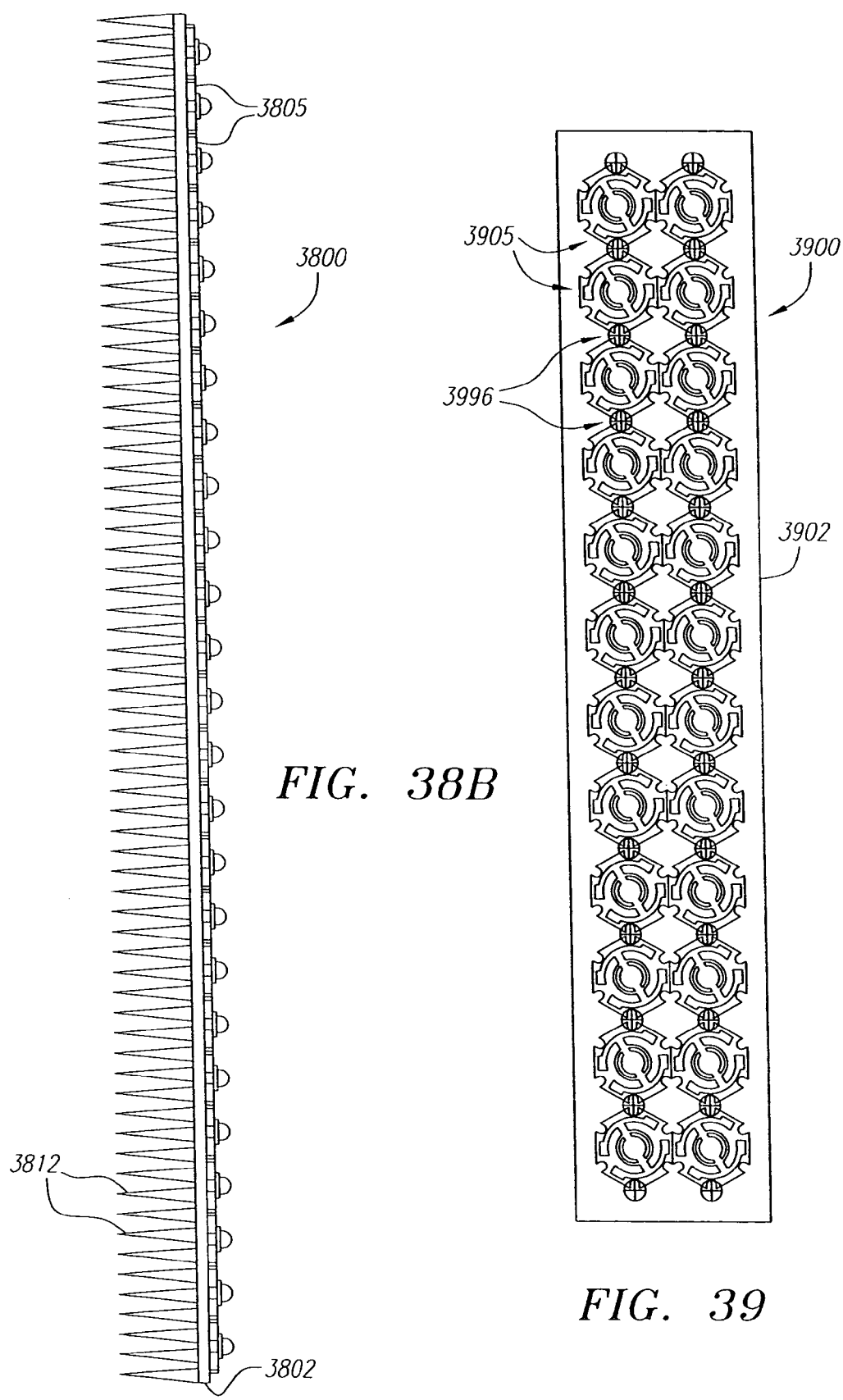
FIG. 38B is a side view diagram of one embodiment of the lighting frame assembly illustrated in FIG. 36A, showing backside fins for heat dissipation.
FIGS. 39 and 40 are diagrams illustrating examples of a panel light with surface mount LEDs.
Figure 40:
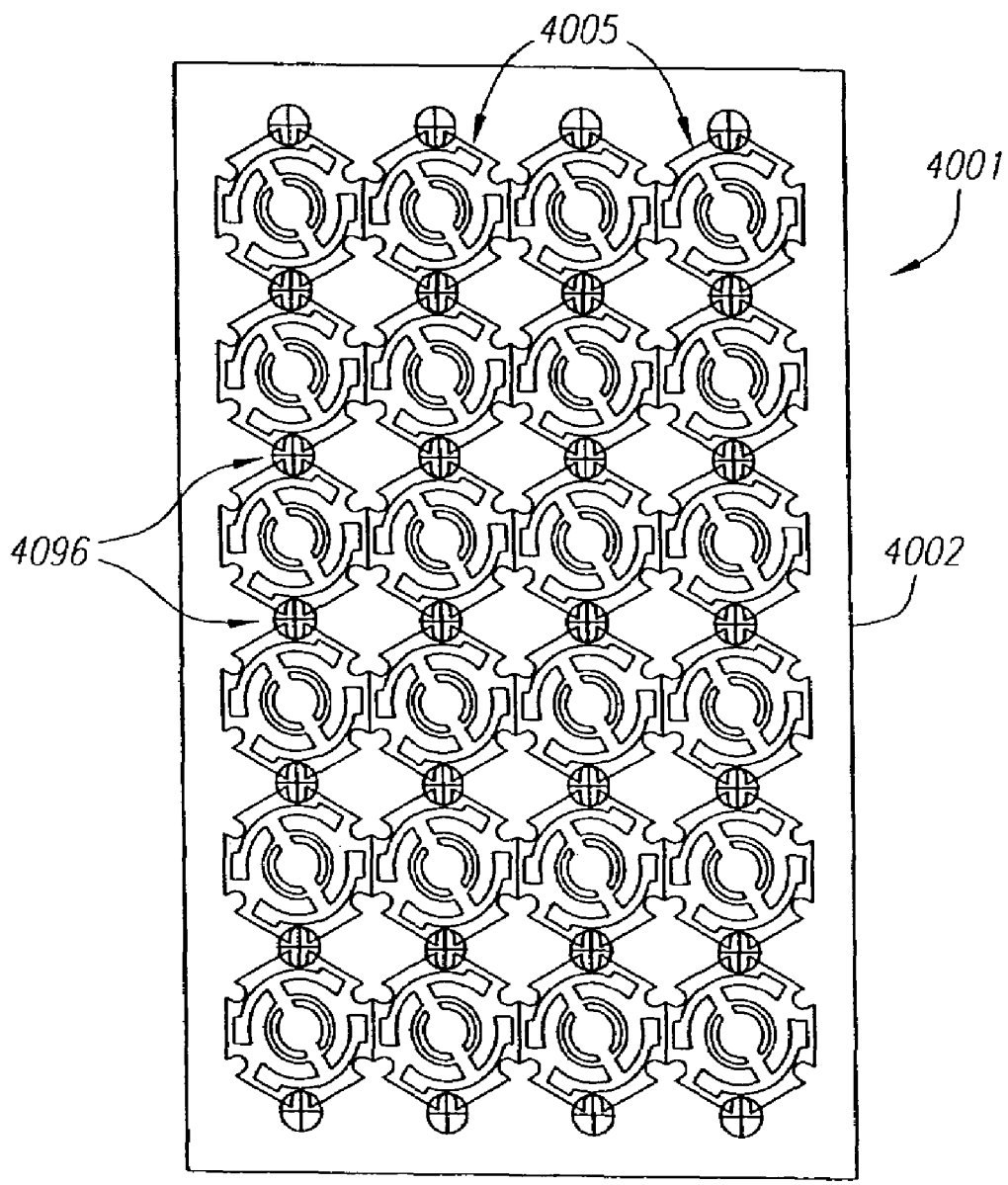

FIGS. 39 and 40 illustrate various panel light embodiments using surface mount LEDs. In FIG. 39, a panel light 3900 comprises one or more rows or arrays (in this example, two rows or arrays) of surface mount LEDs 3905 secured to a mounting surface 3902. Screws 3996 are used in this example to secure the bases of the surface mount LEDs 3905 to the mounting surface 3902. FIG. 40 is similar, with a panel light 4001 having, in this example, four rows or arrays of surface mount LEDs 4005 securing to a mounting surface 4002 with, e.g., screws 4096. The mounting surfaces 3902 or 4002 may comprise a circuit board, and thus LEDs 3905 or 4005 may be mounted directly to a circuit board type mounting surface. The circuit board may be attached to an outer frame of aluminum or another preferably lightweight material, to provide a solid structural support for the circuit board. Panel lights 3900 or 4001 such as shown in FIGS. 39 and 40 may be used as relatively lightweight, portable lighting fixtures that generate less heat than incandescent lighting fixtures, and may be provided with handles for manual manipulation or with brackets or other means to connect to a yoke, stand, or other mechanical contraption. The panel lights 3900 and 4001 may use a ballast to supply power or, in some instances, may be directly connected to an AC electrical outlet (e.g., wall socket).

FIG. 41A illustrates a panel light 4100 of the general type shown, for example, in FIGS. 39 and 40, further illustrating a number of heat conductive fins 4112 which serve to assist with heat dissipation. The panel light 4100 may optionally include a means for facilitating attachment to a single- or multi-panel lighting assembly. In the present example, the panel light 4100 has a pair of T-shaped cutouts 4116 located in each of the fins 4112, such that the T-shaped cutouts 4116 form a pair of straight line, T-shaped grooves through the series of fins 4112. The T-shaped cutouts 4116 may be slid over a T-shaped bar to attach the panel light 4100 to a lighting assembly.

FIG. 41B is a diagram of an example of a multi-panel lighting assembly 4150, illustrating attachment of a panel light 4100 as shown in FIG. 41A to the lighting assembly 4150. In the example of FIG. 41B, the lighting assembly 4150 includes a pair of T-shaped bars 4165 which protrude from a lighting assembly frame 4160, and which are matched to the T-shaped cutouts 4116 in the lighting panel 4100 of FIG. 41A. Once the lighting panel 4100 is slid into place along the T-shaped bars 4165, they securely hold the lighting panel 4100 in place. Insulated caps (not shown), made of rubber or plastic for example, or other such means may be place on the ends of the T-shaped bars 4165 to prevent the lighting panel 4100 from sliding out of place. In the particular example shown, the multi-panel lighting assembly 4150 is configured to receive up to two lighting panels 4100 of the type shown in FIG. 41A, although such an assembly may be configured to receive any number of lighting panels 4100 depending upon the particular needs of the application. The multi-panel lighting assembly 4150 also has another lighting panel 4167 that may be "permanently" attached to or integral with the multi-panel lighting assembly 4150, or else may likewise be attachable and detachable in the manner of lighting panel 4100. The multi-panel lighting assembly 4150 thereby provides a lighting operator with a variety of lighting configurations in a single unit. Other similar modular multi-panel lighting assemblies may be constructed according to the same or similar principles, having any number of panel lights in a variety of different sizes and/or shapes. The multi-panel lighting assembly 4150 may, in certain embodiments, be used in connection with a lighting stand such as illustrated, for example, in FIG. 43 and described elsewhere herein.

Attachment of panel lights (such as, e.g., panel lights 4100) to a of a multi-panel lighting assembly (such as, e.g., multi-panel lighting assembly 4150) may be accomplished by a variety of means. For example, rather than using complementary bars 4165 and cutouts 4116, the panel light 4100 may drop down and lock into an opening in the multi-panel lighting assembly 4150. In such a case, the housing or frame of the multi-panel lighting assembly 4150 may have a molded beam with traverses the outer edge of the opening in which the panel light 4100 would be positioned. Locking tabs, for example, or other such means may be used to secure the dropped-in panel light 4100 within the opening if the multi-panel lighting assembly 4150.

FIG. 38A is a diagram of ring-shaped lighting panel 3800 having surface mount LEDs 3805 (such as, e.g., the high output surface mount LEDs shown in FIG. 36A or 36B) attached to a mounting surface of a frame 3802 which, as with the panel lights described before, may comprise a circuit board. The ring-shaped lighting panel 3800 may have a camera mounting bracket (not shown in FIG. 38A) and generally be utilized in a manner similar to the ring-shaped lighting assembly shown in FIG. 4 and described in various places herein. The surface mount LEDs 3805 in the example of FIG. 38A are arranged in a plurality of rows or arrays 3806 emanating from the center of the hole or cutout region 3803 of the lighting panel 3800. While a relatively dense pattern of LEDs 3805 is illustrated in FIG. 38A, the pattern may be less dense, and the LEDs 3805 need not necessarily be deployed in rows or arrays. Because the LEDs 1305 in this example are high output, the lighting panel 3800 outputs a greater total amount of light than with ordinary LEDs. Also, fewer LEDs need to be physically mounted on the lighting panel 3800, which can reduce cost of construction.

FIG. 38B is a cross-sectional view of the lighting panel 3800 showing the inclusion of optional fins 3812 on the backside of the frame 3802, to assist with heat dissipation. The fins 3812 are shown in cross-section, and form a set of parallel members similar to the fins 4112 shown in FIG. 41A.

FIG. 42A illustrates an integrated lens cover 4200 which can be placed atop, e.g., a panel light 4202 for providing focusing for a plurality of LEDs simultaneously. The panel light 4202 has rows of LEDs 4205, similar to FIGS. 39 and 40, and the integrated lens cover 4210 may be placed atop the panel light 4202 and, e.g., snapped into place by taps 4212, or otherwise secured to the frame of the panel light 4202. FIG. 42B shows additional detail of the integrated lens cover 4210. The integrated lens cover may be formed of any suitable lightweight, durable material (such as plastic) and preferably has a number of focal lens portions 4219 which, when the unit is placed atop the panel light 4202, act as focal lenses for LEDs 4205 which are positioned directly beneath the focal lens portions 4219. The integrated focal lens 4210 may thus allow the panel light 4202 to provide more directed, focused light (e.g., in a forward direction), rather than allowing the light to diffuse in an omnidirectional fashion. Alternatively, the integrated focal lens 4210 may provide other focusing effects that can be done with lenses. The focal lens portions 4219 may be domed or semi-domed, or else any other shape sufficient to serve their intended purpose.

Figure 42C:
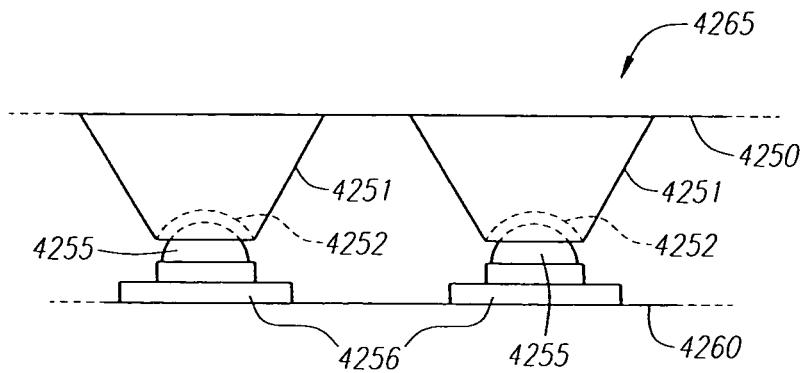
Figure 42D:
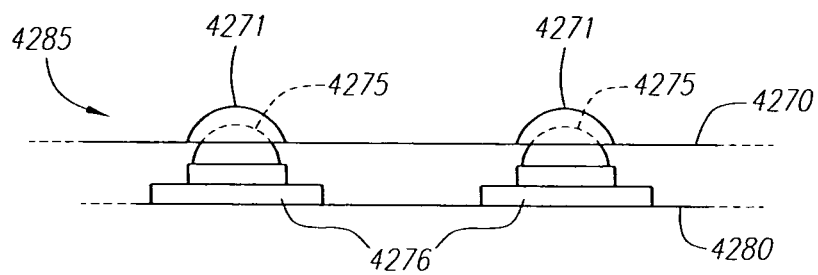

FIGS. 42C and 42D are side profile diagrams illustrating further details of alternative embodiments of an integrated focal lens. FIG. 42C illustrates an integrated focal lens 4265 with tapered focal lenses 4251 emanating from the underside of the sheet-like surface 4250 of the integrated focal lens 4265. In the instant example, the tapered focal lenses 4251 appear as inverted cone-like projections, with small concave recesses 4252 for receiving the dome-like lenses 4255 of LEDs 4256, which are mounted to a mounting surface 4260. The tapered focal lenses 4251 may be constructed in a manner as generally described previously with respect to FIGS. 37D and 37E, and may also have a short cylindrical portion 3754 such as illustrated in those figures, for resting atop the LEDs 4256 and providing added support to the top surface 4250 of the integrated focal lens 4265. Alternatively, separate struts (not shown) may be molded to the underside of the integrated focal lens 4265 to provide such support. The integrated focal lens 4265 may, in certain embodiments, be constructed by attaching (using glue or solvent) individual, tapered focal lenses of the type illustrated in FIGS. 37D and 37E to the underside of a clear plastic sheet, and then providing securing means for the overall resulting lens device to allow it to secure to, e.g., a panel lighting fixture.

FIG. 42D illustrates an alternative embodiment of an integrated focal lens 4285, with bubble-shaped or domed focal lenses 4271 on the topside of the sheet-like surface 4250 of the integrated focal lens 4285. The focal lenses 4271 may be constructed in a manner as generally described previously with respect to FIGS. 37A-37C, and may also have one or more projecting members or struts (not shown) on the underside of the integrated focal lens 4285 to provide support for the top surface 4270 thereof. Other shapes and styles of integrated focal lenses (or other lenses) may also be utilized for an integrated focal lens.

Figure 43:
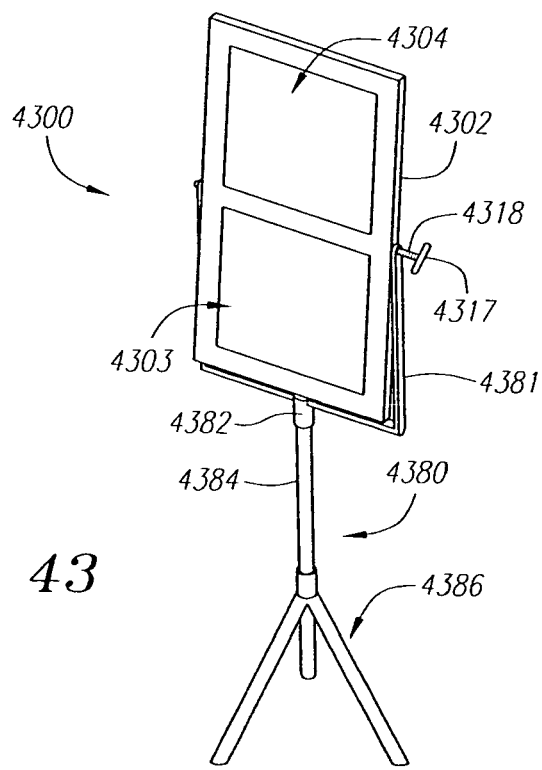
FIG. 43 is a diagram of a multi-panel lighting assembly employed on a lighting stand.

FIG. 43 illustrates a panel lighting assembly 4300 in which a panel light frame 4302 is attached to a stand 4380. The panel light frame 4302 may include multiple panel light sections 4303, 4304, or may be a single unitary panel light. The stand 4380 may be of a conventional nature, with a C-shaped yoke 4381 for securing the panel light frame 4302 crossbar and allowing it to tilt for directional lighting. A twisting handle 4317 may be used to lock the panel light frame 4302 at a particular tilting angle. The C-shaped yoke 4381 may be rotatable or pivotable by placement atop a fluid head 4382, which in turn is positioned atop a stem 4384 and tripod 4386. The panel lighting assembly 4300 thus conveniently provides a variety of directional lighting options for the panel light frame 4302.

In alternative embodiments, a ball-and-socket mechanism may be used to rotate/pivot an attached lighting panel, using socket joints similar to those used for, e.g., computer monitors. Likewise, in any of the foregoing embodiments, motorization may be employed to control the movement of the lighting yokes or stands. Motorized control is well known in the art for lighting apparatus (particularly in the performing arts field), and the motorized control may be either automated or manual in nature.

Figure 45:
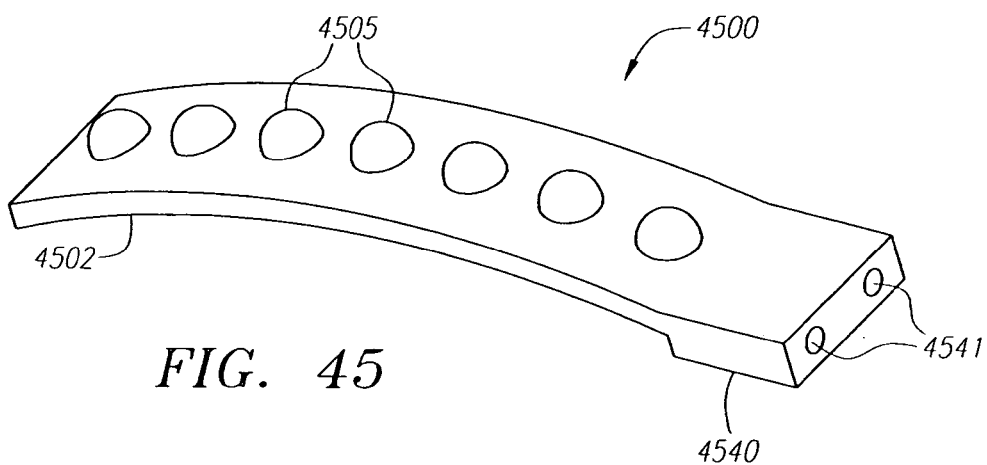
FIG. 45 is a diagram of a flexible LED strip with surface mount LEDs.

FIG. 45 is a diagram of another embodiment of a lighting fixture 4500 employing semiconductor light elements. In FIG. 45 is shown a flexible strip 4502 with an array of surface mount LEDs 4505 mounted on the flexible strip 4502. The flexible strip 4502 preferably comprises a circuit board that may be comprised, for example, of a material such as mylar or composite material, of sufficient thinness to allow the circuit board to be bent and/or twisted. The circuit board may be at least partially encased in an insulated (e.g., rubberized) material or housing that is likewise flexible and thin. Heat dissipating fins (not shown in FIG. 45) may protrude from the backside of the flexible strip 4502, to assist with cooling of the surface mount LEDs 4505. While a single array of surface mount LEDs 4505 is illustrated in the example of FIG. 45, two or more arrays of LEDs 4505 may be used, and may be positioned, e.g., side by side. An electrical connector 4540 with electrical contact receptacles 4541 is also illustrated in the example of FIG. 45, for receiving an electrical cord (not shown) supplying power for the LEDs 4505. Other alternative means for providing electrical power, such as a battery located in an integrated battery housing, may also be used.

According to one or more embodiments as disclosed herein, a versatile lighting apparatus in the form of an LED-based light panel is provided, preferably having a variety of mounting options or configurations, an attachable or integrated battery unit, and alternative means for receiving a power supply input. In a preferred embodiment, the versatile LED-based light panel includes a panel frame, and a plurality of LEDs or other light elements secured to the panel frame. A self-contained battery unit securably attaches to the outside of the panel frame. The light panel may have a dimmer switch, and may also be capable of receiving power from a source other than the self-contained battery unit. The lighting apparatus can be mounted to a camera or a stand through adapters. Diffusion lenses or color gels can be integrated with or detachable from the light panel. The lighting apparatus may conveniently be provided in the form of a kit, with one or more of a light panel, self-contained battery unit, compact stand, connecting cable(s), adapter(s), lenses or color gels, and so on, provided in a single package.

FIGS. 47A and 47B are diagrams of a lighting apparatus 4700 in accordance with one or more embodiments as disclosed herein. The lighting apparatus 4700 is preferably portable and versatile in nature, as further described herein. The lighting apparatus 4700 in this example includes a panel, fixture or frame (hereinafter "panel") 4702 having a plurality of semiconductor light elements (such as LEDs or LECs) 4705 mounted on a mounting surface 4704 of the panel 4702. As illustrated in FIG. 47A, the semiconductor light elements 4705 may be disposed in uniform arrays to provide a broad light source. The mounting surface 4704 may includes one or more circuit board assemblies, generally constructed in accordance with the principles described previously with respect to FIG. 32. Although the semiconductor light elements 4705 are illustrated as being arranged in uniform arrays, they may be arranged in other patterns as well. Furthermore, while the panel 4702 is shown in FIG. 47A as being generally rectangular in shape, the panel 4702 may alternatively be of any suitable shape, including, for example, hexagonal, octagonal, or other polygonal or semi-polygonal, or round, oval, square, or ring-shaped (such as illustrated in FIG. 4, for example).

The semiconductor light elements 4705 may be surface mounted (e.g., surface mount LEDs), which may have the advantage, for example, of simplifying replacement of the LEDs (allowing "drop in" replacements for example) or else may allow easy replacement of an entire row (e.g., interconnect set, etc.) or array of LEDs should it be desired, for example, to change the color, size, shape, or other characteristics of a particular group of LEDs. The light elements or LEDs may have screw-in bases or other similar physical attachment means, such that the LEDs can be easily removed and replaced.

The panel 4702 may further include an integrated dimmer control 4726, in the form of a knob, switch, or other mechanism, to allow the intensity of the semiconductor light elements 4715 to be adjusted. As one example of an implementation, a dimmer control 4726 in the form of a manual knob may control the conductance of a potentiometer or variable resistor (similar to 5735 in FIG. 57), to adjust the amount of current reaching the semiconductor light elements 4705. More than one dimmer control 4726, and/or switches, may optionally be provided, so as to control groups of semiconductor light elements 4705, for example, or to turn on or off certain groups of the semiconductor light elements 4705. An example of electronic circuitry as may be used in connection with dimmer control 4726 is described with respect to FIG. 57.

As illustrated in FIG. 47B, the panel 4702 preferably further includes a socket 4724 or other input for receiving a power connection (e.g., cable) to provide electrical power to the semiconductor light elements 4705. The panel 4702 may also include various heat dissipating fins 4712, which may be arranged, for example, in arrays of metal or heat conductive rods, integrated on the back side of the panel 4702, in order to efficiently dissipate heat generated by the semiconductor light elements 4705. The heat dissipating fins 4712 may generally be similar to those described elsewhere herein, for example, with respect to FIG. 38A or 41A. The heat dissipating fins 4712 may be of any suitable size or shape, and may be extended, for example, to accommodate higher wattage LEDs or light elements. Other types of heat dissipation mechanisms may also be used.

The lighting apparatus 4700 of FIGS. 47A and 47B may be particularly adapted to receive an attachable/detachable battery unit, so as to provide a self-contained unit having its own power source. FIGS. 48A and 48B are diagrams of a panel-based lighting apparatus 4802 such as illustrated in FIGS. 47A-B, together with an attachable battery unit 4830, to form a self-contained, self-powered lighting apparatus 4800. The battery unit 4830 may be attachable to the panel 4802 in any of a variety of manners. In the particular example shown in FIGS. 48A and 48B, the battery unit 4830 comprises a set of struts 4832 that attach to corresponding receptacles 4836 of the panel 4802. FIG. 48A shows a perspective view of the light panel 4802 and battery unit 4830 slightly separated, while FIG. 48B shows a side view of them attached to one another, with the struts 4832 inserted in the receptacles 4836 of the panel 4802. FIGS. 49A and 49B are diagrams showing attachment of the light panel 4802 to the attachable battery unit 4830. FIG. 49A in particular is a simplified diagram omitting certain details such as the heat dissipating fins.

A wide variety of alternative means may be used to attach the battery unit 4830 to the panel 4802; by way merely of example, the battery unit 4830 may slidably attach and engage with the panel 4802, or may have external tabs that grip the panel 4802, or may have pins or screws that engage with the panel 4802.

The battery unit 4830 preferably delivers power to the light panel 4802 through an electrical connector 4840, which may take the form of, e.g., a jumper cord, and may insert into electrical sockets 4834 (in the battery unit 4830) and 4824 (in the panel 4802). Alternatively, the front side of the battery unit 4830 and backside of the panel 4802 may be provided with a mating male/female electrical plug and socket, which automatically engage when the battery unit 4830 is attached to the panel 4802. As with the lighting apparatus 4700 of FIGS. 47A-B, a dimmer switch 4826 may be provided in a convenient location on the panel 4802, to adjust the light intensity. One or more batteries, possibly replaceable, may be integrated with battery unit 4830. The battery, or batteries, may have a nominal voltage rating of appropriate level, such as 12 volts. The battery, or batteries, of battery unit 4730 is/are preferably rechargeable in nature.

A diffusion lens or filter may also be used, by itself or in conjunction with a color gel or colored lens, to diffuse or soften the outgoing light. A diffusion lens or filter may be formed of, e.g., clear or white opaque plastic, and may be configured in a shape of similar dimension to the panel 4702 or 4802 to facilitate mounting thereon. One such diffusion filter 5029 is shown in FIG. 50A. A preferred diffusion filter/lens would be a Light Shaping Diffusor material (e.g., holographic, etc.). A color correction mechanism, such as a lens filter and/or color gel, may be used to alter the color of the light elements of a lighting apparatus such as depicted in FIGS. 47A-B or 48A-B. For example, LED light sources could, if necessary, be converted to "tungsten daylight" (similar in hue to an incandescent bulb) by use of a color gel and/or colored lens.

The lighting apparatuses 4700 and 4800 are preferably adapted to be utilized in conjunction with various lenses and/or color gels, to increase their versatility. FIG. 50A is a diagram illustrating one embodiment having a lens 5010 and optional color gel 5029 used with the lighting apparatus 4800 illustrated in FIGS. 48A-B, and FIG. 50B is a side view diagram illustrating the lens 5020 in place. The lens 5010 is preferably readily attachable to the panel 4802 of the lighting apparatus 4800, by fastening means such as complementary Velcro patches 5022, 5012. Alternatively, the lens 5010 could snap or slide on to the panel 4802, or be attached using screws, nuts/bolts, pins, or other such means. The filter/lens 5010 (as with 6327, described later herein) may comprise, e.g., a Fresnel lens, a holographic lens, or any other type of lens, or combinations thereof. The color gel 5029 is preferably inserted beneath the lens 5010 and is secured beneath it. As depicted in FIG. 50A, the color gel 5029 has cutouts on each of the corners so as not to interfere with the Velcro patches 5022, 5012.

The lighting apparatus 4700 is preferably portable in nature and can be adapted for use in a variety of ways. To facilitate mounting of the lighting apparatus 4700 (whether or not attached to a battery unit, as depicted in FIGS. 48A-B), the lighting apparatus 4700 may be provided with one or more adapters. FIG. 59 is a diagram illustrating an example of a lighting apparatus 4700 in the form of a panel 4702 with one or more adapters 5906, 5907 for mounting or affixing the panel 4702 to a camera, stand, or other object or surface. In the example depicted in FIG. 59, the adapters 5906, 5907 are in the form of receptacles suitable for receiving a mechanical pin (or a similar fastener such as a screw or bolt), allowing convenient and rapid deployment of the lighting apparatus 4700 on, e.g., a camera or stand. Other adapters or fastening means (e.g., hinged tabs, sliding/coupling members, etc.) may also be used.

Examples of ways in which the light apparatus 4700 can be mounted on a camera, stand or other object or surface are illustrated in FIGS. 51 through 55, and 60 through 63B. For example, the lighting apparatus 4700 may be mounted to a camera, directly to the camera housing or to an arm attached to the camera housing. FIG. 51 is a diagram showing one possible mechanism for mounting a lighting apparatus 4700 in the form of a light panel to a camera 5107. While the description below is explained in terms of lighting apparatus 4700, it also applies to the lighting apparatus 4800 having an attachable battery unit, as well as other possible lighting apparatuses as well. In FIG. 51, the camera 5107 includes or is configured with an attachment arm 5110 which may be used for mounting the lighting apparatus 4700. The attachment arm 5110 may, for example, be an articulated arm system of the type commercially available from, e.g., Noga of Israel, sold under the trade name "Hold-It." The attachment arm 5110 comprises a ball joint 5120 attached to the housing (or hot shoe) of the camera 5107, a second ball joint 5125 attached to the lighting apparatus 4700 (via, e.g., an adapter 5906 such as shown in FIG. 59), and a pair of arms 5121, 5124 meeting at an adjustable knob interface 5129. A hot shoe is a receptacle on a camera housing that provides power to an external accessory such as a flash unit. The knob 5129 in this particular example allows the ball joints 5120, 5125 to loosen so that the arms 5121, 5124 can be positioned as desired, and again tightened with the knob 5129. In this example, the lighting apparatus 4700 preferably includes a pin receptacle for receiving a threaded pin from the ball joint 5125 of the attachment arm 5110.

Figure 55:
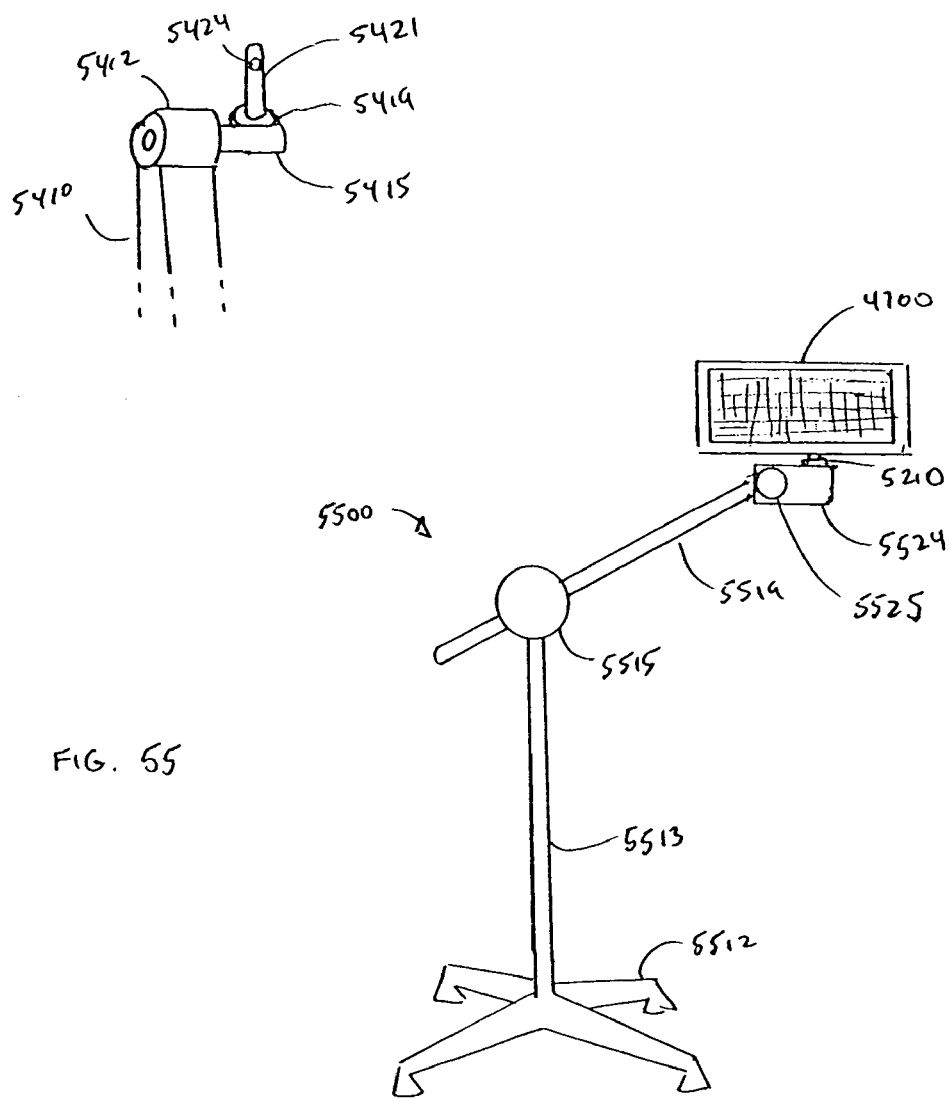
FIG. 55 is a diagram of a light panel attached to a stand.

FIGS. 52A through 52C are diagrams illustrating other attachment options, using various mounting pins, in connection with the lighting apparatus 4700 of FIGS. 47A-B. FIG. 52A, for example, illustrates a mounting pin 5210 that may be used to allow the lighting apparatus 4700 to attach to a stand or tripod. The mounting pin 5210 in this example includes a threaded pin 5219, a cylindrical body 5212, and a grooved depression 5223 for providing a gripping region for a clamp or other attachment mechanism. The lighting apparatus includes a threaded receptacle (of the type shown in, e.g., FIG. 59, as adapter 5906) for receiving the threaded pin 5219. FIG. 55 depicts the lighting apparatus 4700 attached to a stand 5500 using a mounting pin such as 5210. The stand 550 has a base 5512, a main arm 5512 (possibly telescoping in nature), and an adjustable swing arm 5519 connected to a clamp member 5514. The clamp member 5524 in this example comprises a knob 5525 which loosens and tightens two opposing plates that grip the mounting pin 5210 between them. Alternatively, or in addition, the lighting apparatus 4700 may have a threaded receptacle on its shorter side instead of, or in addition to, a threaded receptacle on its longer side, to provide an alternative mounting option.

FIG. 52C illustrates attachment of the lighting apparatus 4700 to a mounting pin 5210 similar to that shown in FIG. 52A, but in this instance being coupled to an adapter on the narrow side of the lighting apparatus 4700 instead of its long side (i.e., using an adapter 5907 such as shown in FIG. 59).

In FIG. 52B, the lighting apparatus 4700 is attached to a stand or camera using a mounting pin 5250. The mounting pin 5250 in this example also includes a threaded pin 5269 and a cylindrical body 5262. In this case, the mounting pin 5250 may have a T-bar 5259 that is securably attached to the cylindrical body 5262, or else fits into a hollow receptacle to secure it to the cylindrical body 5262 of the mounting pin 5250, thereby allowing it to slide onto a camera having curved fins or other members for receiving the wings of the T-bar 5259. The mounting pin 5250 may alternatively have a pin, receptacle, or other member for mounting into a camera shoe or a stand, thus securing the lighting apparatus 4700 to the camera or stand.

The lighting apparatuses 4700 or 4800 may also be adapted to be placed on a compact stand. FIGS. 53A through 53D are diagrams showing different views of the lighting apparatus 4800 mounted on one possible type of stand 5310. In this example, the stand 5310 comprises a base plate 5320 with mounting arms 5325, one on each side, attached to L-shaped struts on the base plate 5320. The mounting arms 5325 preferably allow the lighting apparatus 4800 (comprised of the panel 4802 and battery unit 4830 in this example, although the same principles would apply to a lighting apparatus 4700 having only a panel 4702) to tilt forward and backward, thus allowing rapid adjustment of the angle of light provided. The stand 5310 is preferably of sufficient weight or bulk to keep the entire unit stable, and to prevent it from falling over regardless of the angle of tilt.

Figure 54:
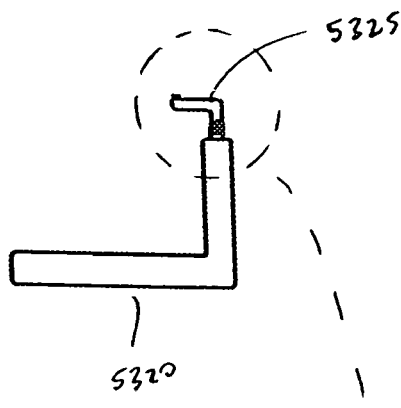
FIG. 54 is a diagram showing details of one possible mounting arm configuration for the stand illustrated in FIGS. 53A-D.

FIG. 54 is a diagram showing details of one possible mounting arm 5325 configuration for the stand 5310 illustrated in FIGS. 53A-D. As shown in FIG. 54, the mounting arm 5320 is attached to the top of the L-shaped strut 5410 of the base plate, and includes a rotatable rod 5415 having a pin 5421 mounted on a base 5419 attached to the rotatable rod 5415. The pin 5421 in this example includes a spring-loaded ball bearing 5424. The lighting apparatus 4700 or 4800 preferably has a pin receptacle complementary to the pin 5421 with ball bearing 5425, on each side of the base plate, allowing the lighting apparatus 4700 or 4800 to be slid down the pin(s) 5421, with the spring-loaded ball bearings 5424 allowing the pins 5421 to lock into place within the pin receptacles. The lighting apparatus 4700 or 4800 can be removed by pulling it firmly while holding the base plate 5320 in place. Of course, other attachment means can be used to allow the lighting apparatus 4700 or 4800 to be attached to a stand, including mounting pins, screws, nuts/bolts, sliding tabs, snapping fasteners, and so on.

The lighting apparatuses 4700 or 4800 in certain embodiments may also be stackable to allow convenient expansion of the lighting source area. FIG. 62 illustrates an example of a stackable panel light 6200, shown mounted on a stand 6220 (similar to stand 5320 of FIGS. 53A-D). In FIG. 62, two panel-type lighting apparatuses 4700 are vertically stacked, being held together by one or more front brackets 6205, 6206 and/or one or more side brackets 6225, which can conveniently be secured to adapters of the type shown in FIG. 59 (i.e., adapters 5906, 5907) using pins or screws 6226. In the example of FIG. 62, a side bracket is only placed on one side because of the presence of dimmer switches on the opposite side. The front bracket(s) 6205, 6206 may be placed anywhere along the border between the two lighting apparatuses 4700 so long as they sufficiently secure them together (for example, a single bracket may be centered). Also the brackets may be placed on the backside rather than the front. In any of the embodiments using stacked light panels, power may be provided to both of the lighting apparatuses 4700 using, for example, a split cable or Y-cable that emanates from a single power source.

The lighting apparatuses 4700 or 4800 may also be adapted to be placed on a tripod type stand. FIGS. 60 and 61 are diagrams showing different types of tripod configurations. In FIG. 60, the lighting apparatus 4700 is placed on a compact tripod stand 6013 having a ball joint 6016 allowing flexible tilting and angling of the lighting apparatus 4700. In FIG. 61, a tripod 6113 supports an arm (in this example, a telescoping arm 6122) which in turn supports a ball joint 6116 similar to that of FIG. 60, thereby allowing flexible tiling and angling of the lighting apparatus 4700.

Figure 63A:
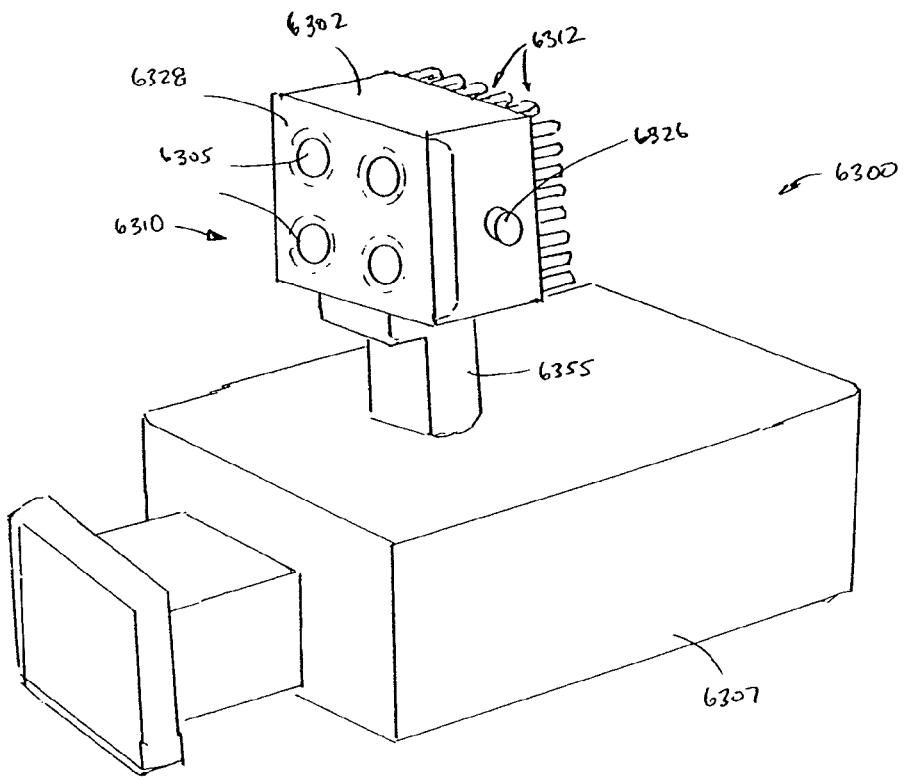
FIGS. 63A and 63B are diagrams of an embodiment of a camera-mountable lighting apparatus.
Figure 63B:
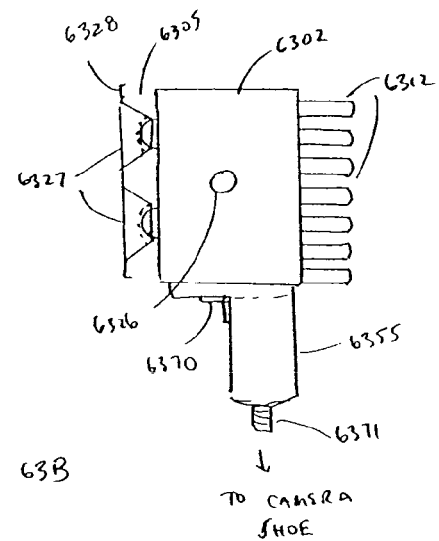

FIGS. 63A and 63B are diagrams illustrating another embodiment of a camera-mountable lighting apparatus 6310. In FIGS. 63A-B, the camera-mountable lighting apparatus 6310 includes a lighting frame or housing 6302 in the general nature of a panel light, and is attachable to a camera 6307 using, e.g., a mounting bracket 6355. The lighting apparatus 6310 may include a number of semiconductor light elements 6305 arranged in a suitable pattern on a front mounting surface of the panel 6302. The panel 6302 may, as described previously, be configured with heat dissipating fins 6312 to allow cooling of the light elements 6305 and any other resident electronics. A dimmer switch 6326 having functionality as previously described herein may optionally be provided. A lens cover 6328, of the type generally described with respect to FIGS. 42A through 42D, may be placed in front of the light elements 6305. The lens cover 6328 may be comprised of individual lenses 6327, as illustrated in FIG. 63B, of a type similar to that described with respect to FIG. 43C (i.e., generally conical in shape). The lenses 6327 may be a focusing lens, such as a Fresnel lens, and may be positioned so as to abut one another, thereby providing a more contiguous light source as generated from the various light elements 6305.

The mounting bracket 6355 may be hinged to allow the panel 6302 to tilt backward or forward, and may also allow the panel 6302 to swivel right or left. A mounting pin 6371 may be provided to allow it to affix to the camera 6355, or else a T-bar may be used similar to that shown in FIG. 52B.

A lighting apparatus may conveniently be packaged in the form of a kit that includes a number of components providing increased convenience, flexibility, and adaptability to operators in the field. For example, a lighting apparatus kit may include one or more lighting panels 4702, as well as one or more battery units 4830 (and/or battery adapters such as described with respect to FIG. 58), power jumper cable (for connecting the power between the panel(s) 4702 and battery unit(s) 4830), an AC adapter and power/recharging cable, one or more lenses 5010, a set of colored or diffusion gels 5029 of various tints and hues, or providing light shaping or diffusion (such as with a Fresnel lens or holographic lens), and/or one or more compact mounting stands 5310 (or other accessories described herein), all of which can be packaged conveniently in a portable case. The colored or diffusion gels 5029 may be integrated with the panel 4802, or else detachable as depicted in the example of FIGS. 50A-B.

Figure 56:
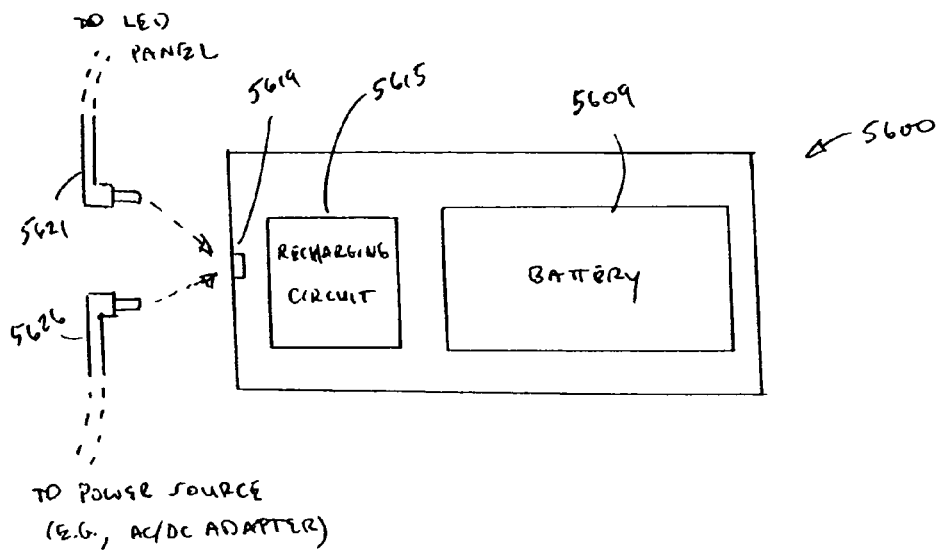
FIG. 56 is a simplified block diagram illustrating components of a battery unit in accordance with one embodiment as disclosed herein.

The lighting apparatus and/or battery unit may have electronics which also provide increased performance, versatility, and/or flexibility. FIG. 56 is a simplified block diagram illustrating, for example, components of one possible embodiment of a battery unit 5600, which may be physically constructed in accordance with the battery unit 4830 of FIGS. 48A-B or otherwise. The battery unit 5600 illustrated in FIG. 56 includes a recharging circuit 5615 in addition to one or more batteries 5609. A socket 5619 is provided for either receiving an output electrical connector 5612 intended to be connected to a light panel (e.g., 4802), or an input electrical connector 5626 which provides a DC voltage source. In the latter case, the input electrical connector 5626 may be connected to a wall source via, e.g., an AC-to-DC adapter. The battery or batteries 5609 may be of any suitable type, for example, Lithium-ion, Nickel-metal-hydride (NIMH), Nickel-cadmium, or any other suitable type. The kit may also include a DC-to-DC adapter to provide a more suitable voltage (e.g., 7.2 V to 12V), which may be attached between the camera and its battery).

The battery unit 5600 may optionally include one or more LED indicators for indicating the state of charging (e.g., when the battery or batteries 5609 is/are being recharged), and/or act as a meter to indicate the remaining battery charge. For example, the battery unit 5600 may have five LED indicators—two green (e.g., full or almost full), one amber (e.g., warning), and two red (e.g., approaching empty and virtually empty), to indicate the amount of remaining battery charge as it gradually depletes.

Figure 57:
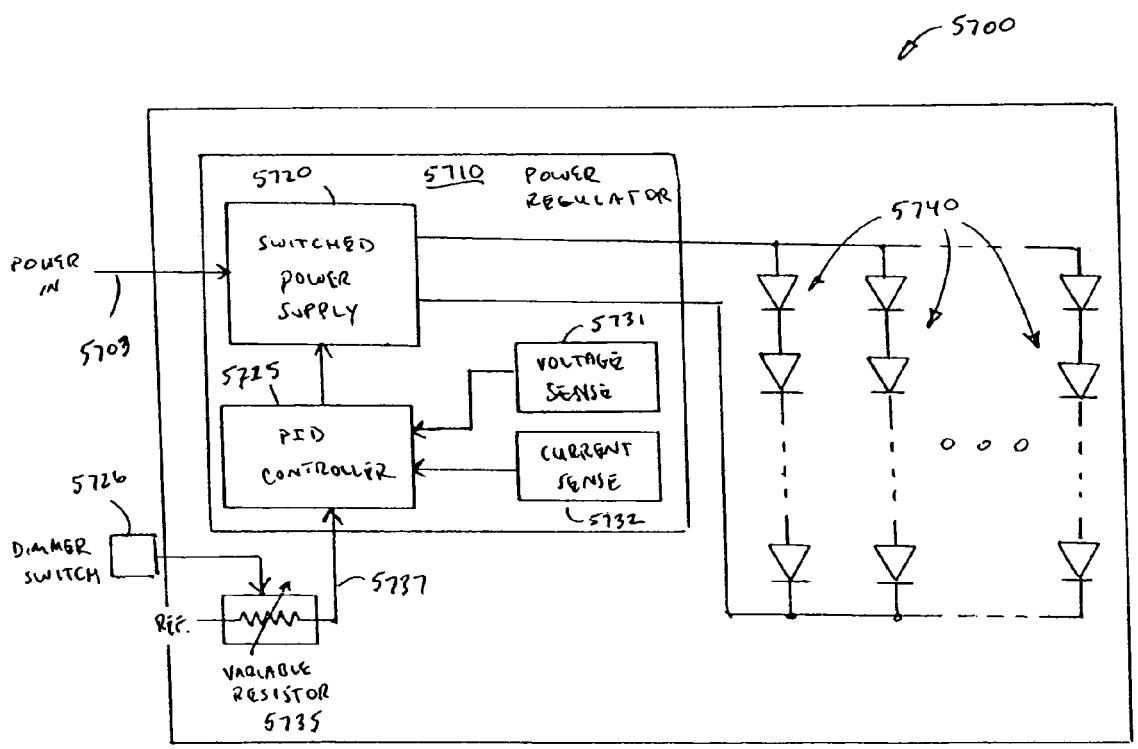
FIG. 57 is a functional block diagram illustrating circuits or components of an LED light panel in accordance with one embodiment as disclosed herein.

FIG. 57 is a functional block diagram illustrating an example of circuits or components of an LED-based light panel 5700, as may be constructed in accordance with, e.g., light panel 4702 or 4802 described elsewhere herein. The LED-based light panel 5700 in this example includes a power regulator 5710 which preferably provides a relatively constant or stabilized current output to one or more arrays or series of LEDs 5740 (or other semiconductor light elements). Details of possible embodiments of a power regulator 5710 are described in copending U.S. application Ser. No. 10/708, 717 filed Mar. 19, 2004, entitled "Omni-Voltage Direct Current Power Supply," hereby incorporated by reference as if set forth fully herein. The power regulator 5710 preferably includes a switched power supply 5720 under control of a control circuit 5725, such as a PIC microcontroller 5725. The switched power supply 5720 may be a buck/boost power supply, or else simply a buck or boost power supply, or other type of power supply. A buck/boost power supply allows the most flexibility, in that the input voltage could vary over a relatively wide range; a particular example is described in application Ser. No. 10/708,717 referred to above. A voltage sense circuit 5731 and current sense circuit 5732 provide feedback information to the PIC microcontroller 5725, which information is used in maintaining the output current to the LEDs 5740 at a stable level, and thereby reducing undesirable artifacts such as flicker.

In FIG. 57, a dimmer switch 5726 adjusts a potentiometer or variable resistor 5735, which in turn provides a dimming control input signal 5737 to the power regulator 5710. In a preferred embodiment, the dimmer control input signal 5737 adjusts the level of gain in a feedback loop for the PIC microcontroller 5725, thus allowing adjustment of the amount of output current for the LEDs 5740. The circuitry of FIG. 57 can allow, for example, the adjustment of light intensity without a substantial change in the output color temperature of the light source (i.e., the LEDs), and again, without flicker even at relatively low light output levels. These can be significant advantages to those working in the field.

Figure 58:
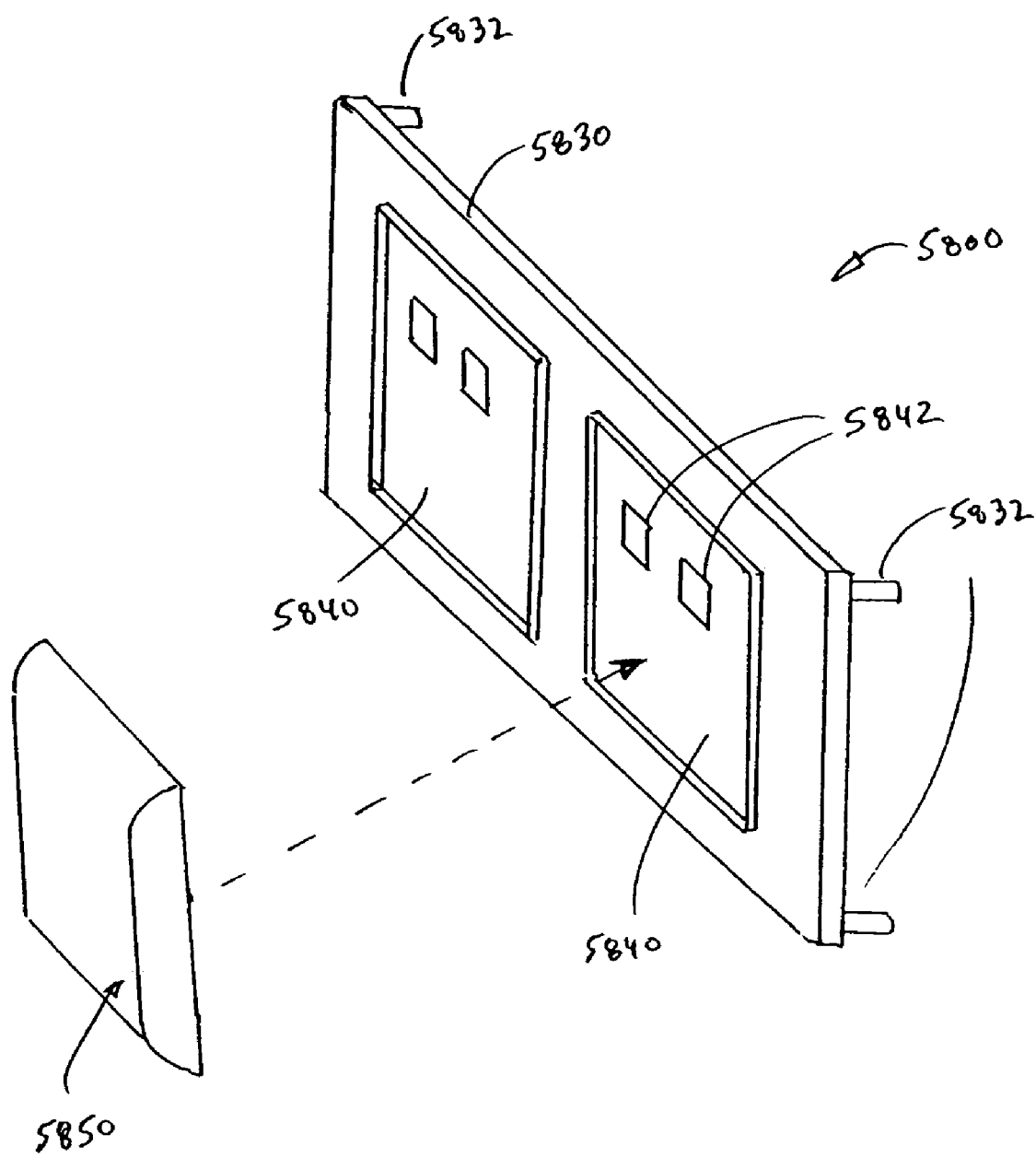
FIG. 58 is a diagram of an alternative embodiment of a battery unit, including an adapter panel and at least one attachable battery.

The battery unit 4830 described previously herein may take on various different forms and configurations. In alternative embodiments, for example, the battery unit 4830 may, for example, comprise one or more "standard" or conventional camera batteries, as may be obtained by companies such as, e.g., Sony, Panasonic, Canon, and the like. FIG. 58 is a diagram of an embodiment of a battery unit 5800, including an adapter panel 5830 for receiving at least one attachable battery 5850, such as a DV ("digital video") battery. A DV type battery typically has a battery casing designed to be snapped directly into the camera, although DV batteries may differ from camera manufacturer to manufacturer. The adapter panel 5830 is preferably constructed to mate to a particular type or brand of battery, and thus different adapter panels 5830 may be made available, each suited to a particular battery or family of batteries. At least some DV batteries output less than 12 volts—for example, a typical output voltage is 7.2 volts. The battery unit 5800 may, as illustrated in FIG. 58, comprise two receptor plates 5840 each adapted to securably attach a battery 5850 to the adapter panel 5830. Electrical contacts 5842 provide electrical connection from the battery 5830 to downstream electronics or a power output source. The two batteries 5850 may be electrically connected in series via electronics integrated in the adapter panel 5830, thus doubling the voltage to, e.g., 14.4 volts. Alternatively, the adapter panel 5830 could include a transformer of other type of DC-DC conversion circuitry to step up the voltage to 12 volts or some other appropriate level.

The battery unit 5800 preferably includes struts 5832 or other attachment means similar to those of battery unit 4830, in order to allow the battery unit 5800 to readily attach to, e.g., an LED based light panel 4802, in a manner similar to the way in which battery unit 4830 may connect to the panel 4802.

Certain embodiments have been described with respect to the placement of lamp elements (e.g., LEDs) on a "mounting surface" or similar surface or area. It will be appreciated that the term "mounting surface" and other such terms encompass not only flat surfaces but also contoured, tiered, or multi-level surfaces. Further, the term covers surfaces which allow the lamp elements to project light at different angles.

Various embodiments have been described as having particular utility to film and other image capture applications. However, the various embodiments may find utility in other areas as well, such as, for example, automated manufacturing, machine vision, and the like.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. An illumination system adapted for lighting a subject for film, photography or video, comprising:
    a light panel, said light panel having a plurality of semiconductor light elements secured thereto so as to provide continuous forward-projected illumination suitable for image capture in motion picture, film or television, and over an area wider than said light panel, said light panel adapted to be readily attached to and detached from a camera apparatus; and
    a dedicated self-contained battery unit releasably attachable to an external portion of said light panel, said self-contained battery unit comprising a housing encasing a battery, such that power from the self-contained battery unit is provided to said semiconductor light elements and is not provided to the camera apparatus; and
    a standalone electrical connector electrically connecting said light panel and said self-contained battery unit and being releasably insertable into a first receptor on said light panel and a second receptor on said self-contained battery unit, such that power is supplied from said self-contained battery unit to the semiconductor light elements of said light panel, wherein said portable case is further configured to hold said electrical connector.

2. The illumination system of claim 1, further comprising a second light panel independent and separate from said first light panel and a bracket for securing said first light panel and second light panel in a stacked arrangement, said second light panel having a plurality of semiconductor light elements secured thereto so as to provide continuous illumination over an area.

3. A kit for transporting individual pieces of a ready-to-assemble illumination system adapted for lighting a subject for film, photography or video, the kit comprising:
    a light panel, said light panel having a plurality of semiconductor light elements secured thereto so as to provide continuous forward-projected illumination over an area wider than said light panel, said light panel adapted to be readily attached to and detached from a camera apparatus;
    a self-contained battery unit releasably attachable to an external portion of said light panel, said self-contained battery unit comprising a housing encasing a battery, such that power from the self-contained battery unit is provided to said semiconductor light elements;
    a portable case for holding said light panel and said self-contained battery unit for transport; and
    an electrical connector for electrically connecting said light panel and said self-contained battery unit and releasably insertable into a receptor on said light panel, such that power is supplied from said self-contained battery unit to the semiconductor light elements of said light panel;
    wherein said electrical connector comprises a jumper cable releasably insertable into both said light panel and said self-contained battery unit, such that power is supplied from said self-contained battery unit to the semiconductor light elements of said light panel.

4. An illumination system adapted for lighting a subject for film, photography or video, comprising:
a light panel, said light panel having a plurality of semiconductor light elements secured thereto so as to provide continuous forward-projected illumination suitable for image capture in motion picture, film or television, and over an area wider than said light panel, said light panel adapted to be readily attached to and detached from a camera apparatus; and
a dedicated self-contained battery unit releasably attachable to an external portion of said light panel, said self-contained battery unit comprising a housing encasing a battery, such that power from the self-contained battery unit is provided to said semiconductor light elements and is not provided to the camera apparatus; and
a second light panel independent and separate from said first light panel and a bracket for securing said first light panel and second light panel in a stacked arrangement, said second light panel having a plurality of semiconductor light elements secured thereto so as to provide continuous illumination over an area;
wherein said first light panel and said second light panel each have a front surface on which the semiconductor light elements are disposed and at least one side surface, and wherein said second light panel is adapted to be readily attachable to and releasably detachable from the first light panel along their respective side surfaces whereby, when attached together, said first light panel and said second light panel are maneuverable in tandem as a unit.

5. The illumination system of claim 4, wherein said self-contained battery unit provides power to both said first light panel and said second light panel.

6. The illumination system of claim 4, wherein said first light panel and said second light panel are substantially identical in shape.

7. A kit for transporting individual pieces of a ready-to-assemble illumination system adapted for lighting a subject for film, photography or video, the kit comprising:
a light panel, said light panel having a plurality of semiconductor light elements secured thereto so as to provide continuous illumination over an area, said light panel adapted to be readily attached to and detached from a camera apparatus;
a self-contained battery unit releasably attachable to said light panel, such that power from the self-contained battery unit is provided to said semiconductor light elements; and
a portable case for holding said light panel and said self-contained battery unit for transport;
wherein said light panel comprises a plurality of heat-dissipating fins, and wherein said self-contained battery unit is disposed adjacent to said heat-dissipating fins when attached to said light panel.

8. A kit for transporting individual pieces of a ready-to-assemble illumination system adapted for providing a continuous light source, the kit comprising:
an adjustable light frame having a front and rear, said light frame securing on its front a plurality of semiconductor light elements configured to provide continuous illumination over an area, said light frame adapted to be readily attached to and detached from a camera apparatus and being tiltable or positionally adjustable relative to the camera apparatus;
a self-contained battery unit detachably cooperative with a receptor on said light frame, said self-contained battery unit providing power for said semiconductor light elements;
a portable case for holding said light frame and said self-contained battery unit for transport; and
a standalone electrical connector releasably connectable to both said light frame and said self-contained battery unit, such that power is supplied from said self-contained battery unit to the semiconductor light elements of said light frame, and wherein said portable case is further adapted to hold said electrical connector.

9. The kit of claim 8, wherein said semiconductor light elements comprise light emitting diodes (LEDs).

10. The kit of claim 9, wherein said LEDs are arranged in a plurality of substantially parallel linear rows across the front of said light frame.

11. The kit of claim 8, further comprising a standalone base plate providing a stable platform, wherein:
said light frame comprises a baseplate attachment member whereby the light frame is adapted to be readily attachable to and detachable from said standalone base plate when said light frame is not mounted to a camera apparatus, thereby providing an off-camera continuous light source; and
said portable case is further adapted to hold said standalone base plate.

12. The kit of claim 8, further comprising a power adapter for providing an alternative means of electrical power to the semiconductor light elements of said light frame from an external power source in the absence of, or in addition to, said self-contained battery unit, wherein said portable case is further adapted to hold said power adapter.

13. The kit of claim 12, wherein said self-contained battery unit is rechargeable via said power adapter.

14. The kit of claim 8, wherein said light frame comprises a dimmer switch and a power regulator for providing a constant direct current to said semiconductor light elements, said dimmer switch allowing manual adjustment of the direct current provided to said semiconductor light elements and thereby an illumination intensity of said semiconductor light elements when powered by said self-contained battery unit.

15. The kit of claim 8, further comprising a releasably attachable focusing lens cover capable of being temporarily secured to said light frame for focusing light from said semiconductor light elements, wherein said portable case is further adapted to hold said focusing lens cover.

16. The kit of claim 15, wherein said lens cover comprises a plurality of discrete lens elements arranged to individually focus light from said semiconductor light elements.

17. The kit of claim 16, further comprising one or more color gels securably attachable to said light frame in immediate proximity to said lens cover, at least one color gel substantially conforming to the dimensions of said focusing lens cover, for altering the color characteristics of light from said semiconductor light elements.

18. The kit of claim 16, wherein said discrete lens elements are arranged in a plurality of substantially parallel linear rows across said lens cover.

19. The kit of claim 8, wherein said self-contained battery unit comprises a plurality of extending members attaching to the rear of said light frame.

20. The kit of claim 8, wherein said light frame comprises a fastener on a bottom portion thereof which securably attaches, directly or via an adapter, to a receptacle on top of the camera apparatus.

21. A kit for transporting individual pieces of a ready-to-assemble illumination system adapted for providing a continuous light source, the kit comprising:
   an adjustable light frame having a front and rear, said light frame securing on its front a plurality of semiconductor light elements configured to provide continuous illumination over an area, said light frame adapted to be readily attached to and detached from a camera apparatus and being tiltable or positionally adjustable relative to the camera apparatus;
   a self-contained battery unit detachably cooperative with a receptor on said light frame, said self-contained battery unit providing power for said semiconductor light elements;
   a portable case for holding said light frame and said self-contained battery unit for transport; and
   a second light frame, said second light frame having a plurality of semiconductor light elements secured thereto so as to provide continuous illumination over an area, wherein said portable case is further adapted to hold said second light panel;
   wherein said first light panel and said second light panel each have a front surface on which the semiconductor light elements are disposed and at least one side surface, and wherein said second light frame is adapted to be readily attachable to and detachable from the first light frame along their respective side surfaces whereby, when attached together, said first light panel and said second light panel are maneuverable in tandem as a unit.

22. A kit for transporting individual pieces of a ready-to-assemble illumination system adapted for lighting a subject for film, photography or video, the kit comprising:
   a light panel, said light panel having a plurality of semiconductor light elements secured thereto so as to provide continuous forward-projected illumination over an area wider than said light panel, said light panel adapted to be readily attached to and detached from a camera apparatus;
   a self-contained battery unit releasably attachable to an external portion of said light panel, said self-contained battery unit comprising a housing encasing a battery, such that power from the self-contained battery unit is provided to said semiconductor light elements;
   a portable case for holding said light panel and said self-contained battery unit for transport; and
   a releasably attachable diffusion filter capable of being temporarily secured to said light frame for altering light emitted from said semiconductor light elements, wherein said portable case is further adapted to hold said diffusion filter.

23. A kit for transporting individual pieces of a ready-to-assemble illumination system adapted for lighting a subject for film, photography or video, the kit comprising:
   a light panel, said light panel having a plurality of semiconductor light elements secured thereto so as to provide continuous forward-projected illumination over an area wider than said light panel, said light panel adapted to be readily attached to and detached from a camera apparatus;
   a self-contained battery unit releasably attachable to an external portion of said light panel, said self-contained battery unit comprising a housing encasing a battery, such that power from the self-contained battery unit is provided to said semiconductor light elements;
   a portable case for holding said light panel and said self-contained battery unit for transport; and
   a stand adapter bracket for allowing said light panel to be mounted to and readily disengaged from a stand, wherein said portable case is further adapted to hold said stand adapter bracket.

24. An illumination system adapted for lighting a subject for film, photography or video, comprising:
   a light panel, said light panel having a plurality of semiconductor light elements secured thereto so as to provide continuous forward-projected illumination suitable for image capture in motion picture, film or television, and over an area wider than said light panel, said light panel adapted to be readily attached to and detached from a camera apparatus;
   a dedicated self-contained battery unit releasably attachable to an external portion of said light panel, said self-contained battery unit comprising a housing encasing a battery, such that power from the self-contained battery unit is provided to said semiconductor light elements and is not provided to the camera apparatus; and
   a hot shoe adapter whereby said light panel mounts to the camera apparatus.

25. The illumination system of claim 24, wherein said semiconductor light elements comprise light emitting diodes (LEDs).

26. The illumination system of claim 25, wherein said LEDs are arranged in a plurality of substantially parallel linear rows across a face of said light panel.

27. The illumination system of claim 24, further comprising:
   a power adapter for providing an alternative means of electrical power to said light panel from an external power source in the absence of, or in addition to, said self-contained battery unit, and
   a portable case for holding said light panel, said self-contained battery unit, and said power adapter.

28. The illumination system of claim 27, wherein said light panel comprises a dimmer switch and a power regulator for providing a constant direct current to said semiconductor light elements, said dimmer switch allowing manual adjustment of the direct current provided to said semiconductor light elements and thereby an illumination intensity of said semiconductor light elements when powered either by said self-contained battery unit or said external power source.

29. The kit of claim 27, wherein said self-contained battery unit is rechargeable via said power adapter.

30. The illumination system of claim 27, wherein said power adapter comprises an AC-to-DC power converter.

31. The illumination system of claim 27, wherein said power adapter comprises a DC-to-DC power converter.

32. The illumination system of claim 24, further comprising a releasably attachable, light permeable focusing lens cover capable of being temporarily secured to said light panel for focusing light from said semiconductor light elements.

33. The illumination system of claim 24, wherein said light panel comprises integrated electronics for providing a constant direct current to said semiconductor light elements, and wherein said integrated electronics includes a feedback path to sense the current provided to said semiconductor light elements and regulate said constant direct current.

34. The illumination system of claim 24, wherein said self-contained battery unit comprises a plurality of struts, and wherein said light panel comprises a plurality of receptors for receiving and locking said struts.

35. The illumination system of claim 24, further comprising one or more color filters or color gels securably attachable to said light panel, at least one color gel substantially conforming to the dimensions of said focusing lens cover, for altering the color characteristics of light from said semiconductor light elements.

36. The illumination system of claim 24, further comprising a plurality of releasably attachable focusing lens covers each having different focal properties and capable of being temporarily secured to said light panel for focusing light from said semiconductor light elements.

37. The illumination system of claim 24, wherein said semiconductor light elements comprise high output light emitting diodes (LEDs).

38. The illumination system of claim 37, wherein said high output LEDs have a power rating of about 1 Watt or more.

39. The illumination system of claim 24, further comprising an articulated arm supporting said light panel, whereby said light panel tilts or pivots such that an angle of illumination from said semiconductor light elements is altered.

* * * * *